United States Patent
Washington et al.

(10) Patent No.: US 11,403,919 B2
(45) Date of Patent: Aug. 2, 2022

(54) FIRST PERSON SHOOTER, RPG AND SPORTS THEMED HYBRID ARCADE-TYPE, WAGER-BASED GAMING TECHNIQUES

(71) Applicant: AKKADIAN ENTERPRISES, Las Vegas, NV (US)

(72) Inventors: Georg Washington, Rancho Mirage, CA (US); Joe Serra, Bermuda Dunes, CA (US); Tom Stankevich, Stevensville, MI (US); Justin MacAuley, Palm Desert, CA (US)

(73) Assignee: AKKADIAN ENTERPRISES, Las Vegas, NV (US)

( * ) Notice: Subject to any disclaimer, the term of this patent is extended or adjusted under 35 U.S.C. 154(b) by 0 days.

(21) Appl. No.: 16/425,880

(22) Filed: May 29, 2019

(65) Prior Publication Data

US 2021/0150861 A1 May 20, 2021

Related U.S. Application Data

(63) Continuation of application No. 14/831,823, filed on Aug. 20, 2015, now Pat. No. 10,311,679.

(60) Provisional application No. 62/127,821, filed on Mar. 3, 2015, provisional application No. 62/091,451, filed on Dec. 12, 2014.

(51) Int. Cl.
*A63F 13/00* (2014.01)
*G07F 17/32* (2006.01)
*A63F 13/837* (2014.01)
*A63F 13/69* (2014.01)
*A63F 13/822* (2014.01)
*A63F 13/352* (2014.01)

(52) U.S. Cl.
CPC ........ *G07F 17/3288* (2013.01); *A63F 13/352* (2014.09); *A63F 13/69* (2014.09); *A63F 13/822* (2014.09); *A63F 13/837* (2014.09); *G07F 17/3223* (2013.01); *G07F 17/3244* (2013.01); *G07F 17/3267* (2013.01); *G07F 17/3269* (2013.01)

(58) Field of Classification Search
CPC .. G07F 17/3244; G07F 17/34; G07F 17/3295; G07F 17/326
See application file for complete search history.

(56) References Cited

U.S. PATENT DOCUMENTS

| | | | | |
|---|---|---|---|---|
| 2002/0016200 A1* | 2/2002 | Baerlocher | ......... | G07F 17/3244 463/20 |
| 2002/0147042 A1* | 10/2002 | Vuong | ................ | G07F 17/3232 463/40 |
| 2004/0204243 A1* | 10/2004 | de Mello Costa | .. | G07F 17/3279 463/42 |

* cited by examiner

*Primary Examiner* — Omkar A Deodhar
*Assistant Examiner* — Eric M Thomas
(74) *Attorney, Agent, or Firm* — Lewis Roca Rothgerber Christie LLP

(57) ABSTRACT

Various aspects described for implementing hybrid arcade/wager-based gaming techniques via computer networks, including one or more casino gaming networks. The hybrid arcade/wager-based game may include a non-wager based gaming portion and a wager-based gaming portion. One or more players are able to concurrently engage in continuous game play of the non-wager based gaming portion during execution of wager-based gaming events which are automatically triggered based on events which occur during play of the non-wager based gaming portion. In some embodiments, the outcomes of the wager-based gaming events are predetermined (before triggering of the wager-based game events) using a random number generator (RNG).

11 Claims, 44 Drawing Sheets

| Spoils: | | |
|---|---|---|
| | Ivy | Brom | Madjoff |
| | 1127/39042 EXP | 1412/4700 EXP | 858/31488 EXP |
| | Level: 9 | Level: 10 | Level: 8 |

| Spoils: | | |
|---|---|---|
| Battle Points Earned: | 75 | |
| Credits Won: | 0 | |

| Totals: | |
|---|---|
| Battle Points: | 1075 |
| Credits: | 99 |

Items Found:

| Healing Potion | x2 | Raven Feather | x7 | Cheese Wheel | x5 |
| Water | x4 | Goblin Skull | x1 | Cat's Eye Wine | x1 |
| Blue Gem | x1 | Fairy Dust Pouch | x1 | Raw Meat | x3 |
| Green Gem | x2 | Strange Key | x1 | Wood | x13 |
| Red Gem | x1 | Ectoplasm | x6 | | |

Fig. 35

| RPG HAWG Example | move/ability based wager selection | | | | |
|---|---|---|---|---|---|
| Slot Type | 3 reels 1 line Symbols must appear in consecutive reels beginning with the far left reel | | | | |
| Wager Amounts | 1x, 2x, 3x, 5x, 10x | | | | |

| Characters | 1x moves/abilities | 2x moves/abilities | 3x moves/abilities | 5x moves/abilities | 10x moves abilities |
|---|---|---|---|---|---|
| Knight | quick sword jab | double stab attack | 360 slash | pounding smash | overhead strike |
| Archer | single arrow shot | power charge short | rapid shot burst | power charge long | raining arrows |
| Wizard | etheral burst | lightning bolt | fire ball | whirlwind fury | bolide shower |

| Reel Symbols | X2 payout | X3 payout |
|---|---|---|
| red potion | 5 | 10 |
| blue potion | 10 | 20 |
| green potion | 15 | 30 |
| crystal | 20 | 30 |
| loot chest | 25 | 50 |
| war hammer | 30 | 60 |

Fig. 38

| First Person HAWG Example A | mercenary based wager selection | | | |
|---|---|---|---|---|
| Slot Type | 3 reels 1 line — Symbols must appear in consecutive reels beginning with the far left reel | | | |
| Wager Amounts | 1x, 2x, 3x, 5x, 10x | | | |
| Characters | 1x merc/firearm | 2x merc/firearm | 3x merc/firearm | 5x merc/firearm | 10x merc/firearm |
| Mercenaries | scout/9mm pistol | flanker/357 magnum | runner/UZI 9mm | ranger/assault rifle | heavy riot/shotgun |

| Reel Symbols | X2 payout | X3 payout |
|---|---|---|
| brain | 5 | 10 |
| ammunition | 10 | 20 |
| body part/gib | 15 | 30 |
| biohazard sign | 20 | 30 |
| med kit | 25 | 50 |
| zombie | 30 | 60 |

Fig. 39

| First Person HAWG Example B | move/ability based wager selection | | | |
|---|---|---|---|---|
| Slot Type | 3 reels 1 line | Symbols must appear in consecutive reels beginning with the far left reel | | |
| Wager Amounts | 1x, 2x, 3x, 5x, 10x | | | |

| Characters/firearm | 1x moves/abilities | 2x moves/abilities | 3x moves/abilities | 5x moves/abilities | 10x moves abilities |
|---|---|---|---|---|---|
| Scout/9mm pistol | single shot | hilt smash w/1 shot | ninja kick w/1 shot | double shot | multi-burst shot |
| Ranger/assault rifle | single shot | hilt smash w/1 shot | ninja kick w/1 shot | double shot | multi-burst shot |
| Heavy Riot/shotgun | single shot | hilt smash w/1 shot | ninja kick w/1 shot | double shot | multi-burst shot |

| Reel Symbols | X2 payout | X3 payout |
|---|---|---|
| brain | 5 | 10 |
| ammunition | 10 | 20 |
| body part/gib | 15 | 30 |
| biohazard sign | 20 | 30 |
| med kit | 25 | 50 |
| zombie | 30 | 60 |

Fig. 40

| Driving HAWG Example | "wager rings" - standard wager selection | | | | |
|---|---|---|---|---|---|
| Slot Type | 3 reels 1 line | Symbols must appear in consecutive reels beginning with the far left reel {4110} | | | |
| Wager Amounts | 1x, 2x, 3x, 5x, 10x | | | | |
| Vehicles | 1x wager selection | 2x wager selection | 3x wager selection | 5x wager selection | 10x wager selection {4120} |
| Ford GT | 1x per line | 2x per line | 3x per line | 5x per line | 10x per line |
| Chevrolet Corvette GTR | 1x per line | 2x per line | 3x per line | 5x per line | 10x per line |
| Dodge Challenger Hellcat | 1x per line | 2x per line | 3x per line | 5x per line | 10x per line |
| Reel Symbols | X2 payout | X3 payout {4130} | | | |
| tire | 5 | 10 | | | |
| helmet | 10 | 20 | | | |
| piston | 15 | 30 | | | |
| keys | 20 | 30 | | | |
| fuel can | 25 | 50 | | | |
| race car | 30 | 60 | | | |

Fig. 41

| Basketball HAWG Example | "wager rings" - standard wager selection | | |
|---|---|---|---|
| Slot Type | 3 reels 1 line | Symbols must appear in consecutive reels beginning with the far left reel | |
| Wager Amounts | 1x, 2x, 3x, 5x, 10x | | |

4210

| Actions | 1x wager selection | 2x wager selection | 3x wager selection | 5x wager selection | 10x wager selection |
|---|---|---|---|---|---|
| court interaction points | 1x per line | 2x per line | 3x per line | 5x per line | 10x per line |
| basket interaction point | 1x per line | 2x per line | 3x per line | 5x per line | 10x per line |
| ball interaction (steal, etc.) | 1x per line | 2x per line | 3x per line | 5x per line | 10x per line |

4220

| Reel Symbols | X2 payout | X3 payout |
|---|---|---|
| basket ball | 5 | 10 |
| shoe | 10 | 20 |
| sports bottle | 15 | 30 |
| whistle | 20 | 30 |
| basket | 25 | 50 |
| trophy | 30 | 60 |

FIRST PERSON SHOOTER, RPG AND SPORTS THEMED HYBRID ARCADE-TYPE, WAGER-BASED GAMING TECHNIQUES

RELATED APPLICATION DATA

This application is a continuation application, pursuant to the provisions of 35 U.S.C. § 120, of prior U.S. patent application Ser. No. 14/831,823, titled "FIRST PERSON SHOOTER, RPG AND SPORTS THEMED HYBRID ARCADE-TYPE, WAGER-BASED GAMING TECHNIQUES", naming Washington et al. as inventors, and filed 20 Aug. 2015, the entirety of which is incorporated herein by reference for all purposes.

U.S. patent application Ser. No. 14/831,823 claims benefit, pursuant to the provisions of 35 U.S.C. § 119, of U.S. Provisional Application Ser. No. 62/091,451, titled "HYBRID ARCADE-TYPE, WAGER-BASED GAMING TECHNIQUES", naming Washington et al. as inventors, and filed 12 Dec. 2014, the entirety of which is incorporated herein by reference for all purposes.

U.S. patent application Ser. No. 14/831,823 also claims benefit, pursuant to the provisions of 35 U.S.C. § 119, of U.S. Provisional Application Ser. No. 62/127,821, titled "RPG AND SPORTS THEMED HYBRID ARCADE-TYPE, WAGER-BASED GAMING TECHNIQUES", naming Washington et al. as inventors, and filed 3 Mar. 2015, the entirety of which is incorporated herein by reference for all purposes.

BRIEF DESCRIPTION OF THE DRAWINGS

FIGS. 10-13, 20, and 27-37 illustrate example screenshots of various GUIs which may be used for facilitating activities relating to one or more of the Hybrid Arcade/Wager-Based Gaming aspects disclosed herein. In at least one embodiment, at least a portion of the GUIs may be configured or designed for use at one or more mobile devices.

FIGS. 38-42 illustrate example tables of different types of wager-related parameters which may be used for implementing wager configuration/selection in different types of hybrid arcade/wager-based games.

DETAILED DESCRIPTION OF EXAMPLE EMBODIMENTS

Overview

Figure 1:
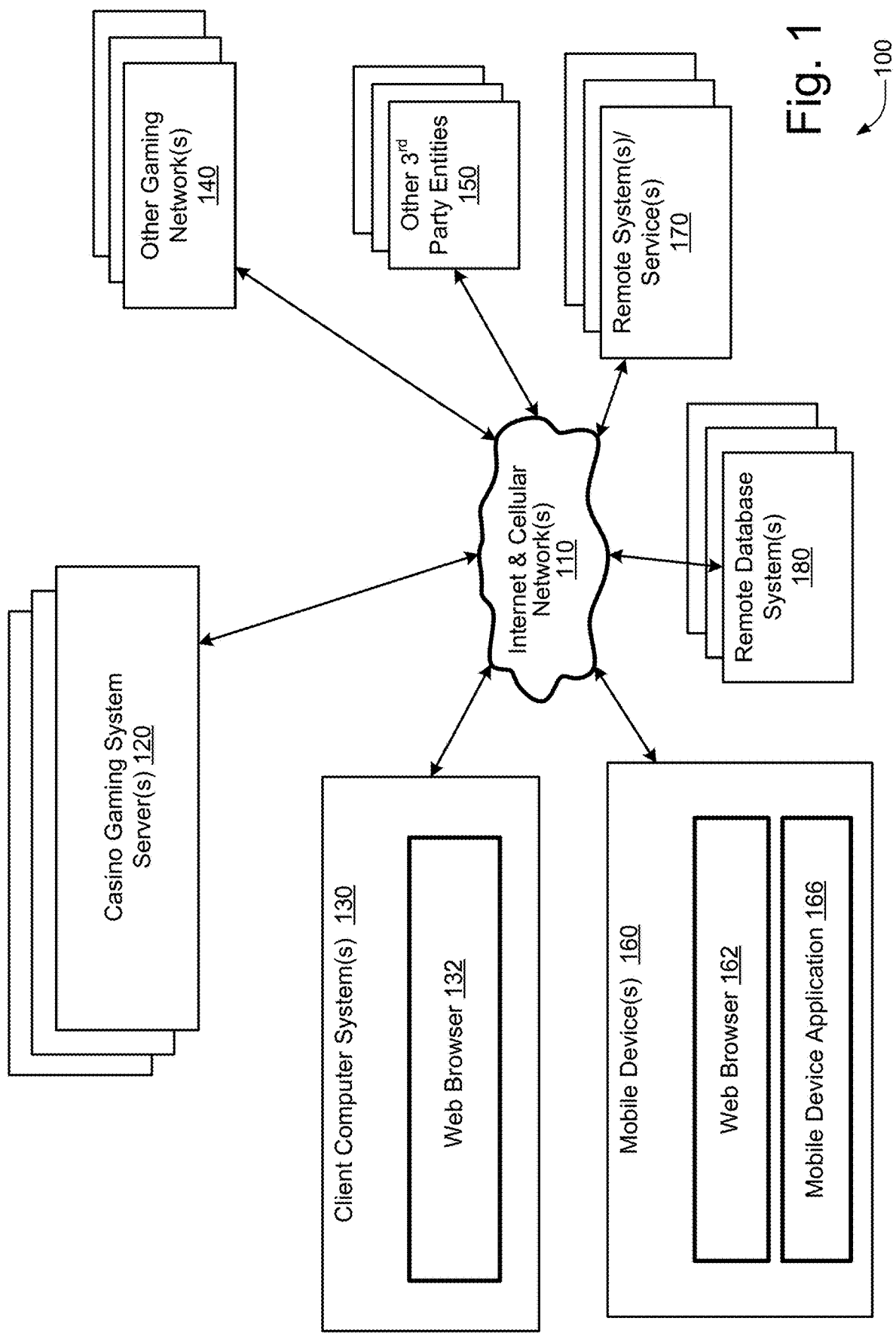
FIG. 1 illustrates a simplified block diagram of a specific example embodiment of a Gaming Network 100 which may be configured or designed to implement various hybrid arcade/wager-based gaming techniques described and/or referenced herein.

Various aspects described or referenced herein are directed to different methods, systems, and computer program products for implementing various hybrid arcade/wager-based gaming ("HAWG") techniques via computer networks, including one or more casino gaming networks.

In at least one embodiment, various method(s), system(s) and/or computer program product(s) may be operable to cause at least one processor to execute a plurality of instructions for: controlling an interactive, hybrid arcade/wager-based game conducted at a first gaming device, the hybrid arcade/wager-based game including a non-wager based gaming portion and a wager-based gaming portion; enabling a player to engage in interactive game play of the non-wager based gaming portion of the hybrid arcade/wager-based game via at least one input device; providing a first opportunity for the player to cause a first wager-based triggering event to occur during play of the non-wager based gaming portion, the first wager-based triggering event being associated with a first wager-based game event having a first wager-based game event outcome associated therewith; predetermining the first wager-based game event outcome prior to the occurrence of the first wager-based triggering event; detecting the occurrence of the first wager-based triggering event during play of the non-wager based gaming portion; automatically causing the wager-based gaming portion to execute the first wager-based game event in response to detecting the occurrence of the first wager-based triggering event; wherein the execution of the first wager-based game event includes wagering a first wager amount on the outcome of the first wager-based game event; wherein the execution of the first wager-based game event further includes displaying the predetermined first wager-based game event outcome; wherein the execution of the first wager-based game event further includes determining, using the first wager-based game event outcome, whether any payout amount is due to the player; and enabling the player to concurrently engage in continuous game play of the non-wager based gaming portion of the hybrid arcade/wager-based game during execution of the first wager-based game event.

In some embodiments, the first wager-based game event corresponds to a wager-based game of chance event; and the outcome of the first wager-based game event is determined using a random number generator (RNG).

Additional method(s), system(s) and/or computer program product(s) may be further operable to cause at least one processor to execute additional instructions for utilizing a random number generator (RNG) to generate the first outcome of the first wager-based game event first outcome of the first wager-based game event.

Additional method(s), system(s) and/or computer program product(s) may be further operable to cause at least one processor to execute additional instructions for: enabling the player to selectively configure a first set of wagering parameters relating to the first wager-based game event before the occurrence of the first wager-based triggering event; and determining the first wager amount using the first set of wagering parameters.

Additional method(s), system(s) and/or computer program product(s) may be further operable to cause at least one processor to execute additional instructions for preventing display of the first outcome of the first wager-based game event prior to the occurrence of the first wager-based triggering event.

In some embodiments, execution of the first wager-based game event occurs in real-time; and execution of the first wager-based game event occurs in real-time occurs concurrently while the player continues to engage in interactive game play of the non-wager based gaming portion of the hybrid arcade/wager-based game.

In some embodiments, the first opportunity for the player to cause a first wager-based triggering event corresponds to the spawning of a first non-player character (NPC) during play of the non-wager based gaming portion.

In some embodiments, the first opportunity for the player to cause a first wager-based triggering event corresponds to the spawning of a first Wager Triggering object during play of the non-wager based gaming portion.

Additional method(s), system(s) and/or computer program product(s) may be further operable to cause at least one processor to execute additional instructions for: enabling the player to control a first in-game character during play of the non-wager based gaming portion; and the first opportunity for the player to cause a first wager-based triggering event corresponds to an action performed by the first in-game character during play of the non-wager based gaming portion.

In some embodiments, the first opportunity for the player to cause a first wager-based triggering event corresponds to the spawning of a first non-player character (NPC) during play of the non-wager based gaming portion; and the first wager-based triggering event relates to an in-game interaction with the first non-player character (NPC), the in-game interaction with the first non-player character being caused based on input from the player during play of the non-wager based gaming portion.

In some embodiments, the first opportunity for the player to cause a first wager-based triggering event corresponds to the spawning of a Wager Triggering object during play of the non-wager based gaming portion; and the first wager-based triggering event relates to an in-game interaction with the first Wager Triggering object, the in-game interaction with the first Wager Triggering object being caused based on input from the player during play of the non-wager based gaming portion.

In some embodiments, the predetermination of the first outcome of the first wager-based game event is independent from play of the non-wager based gaming portion.

Additional method(s), system(s) and/or computer program product(s) may be further operable to cause at least one processor to execute additional instructions for: providing a second opportunity for the player to cause a second wager-based triggering event to occur during play of the non-wager based gaming portion, the second wager-based triggering event being associated with a second wager-based game event having a second wager-based game event outcome associated therewith; predetermining the second wager-based game event outcome prior to the occurrence of the second wager-based triggering event; detecting the occurrence of the second wager-based triggering event during play of the non-wager based gaming portion; automatically causing the wager-based gaming portion to execute the second wager-based game event in response to detecting the occurrence of the second wager-based triggering event; wherein the execution of the second wager-based game event includes wagering a second wager amount on the outcome of the second wager-based game event; wherein the execution of the second wager-based game event further includes displaying the predetermined second wager-based game event outcome; wherein the execution of the second wager-based game event further includes determining, using the second wager-based game event outcome, whether any payout amount is due to the player; and enabling the player to concurrently engage in continuous game play of the non-wager based gaming portion of the hybrid arcade/wager-based game during execution of the second wager-based game event.

In other embodiments, various method(s), system(s) and/or computer program product(s) may be further operable to cause at least one processor to execute additional instructions for: causing a display of a play of an interactive game; enabling a player to make at least one input in the play of the interactive game; detecting an occurrence of a first wager triggering event during the play of the interactive game; predetermining a first wager-based game event outcome prior to detecting the occurrence of the first wager-based triggering event, wherein the first wager-based game event outcome is determined using a random number generator (RNG); automatically causing, during play of the interactive game and in response to detecting the occurrence of the first wager-based triggering event, a first wager of a predefined one of a plurality of wager components funded by the player; and providing, in response to detecting the occurrence of the first wager-based triggering event, the player with any determined wager-related credits or payouts associated with said first wager-based game event outcome; detecting an occurrence of a second wager triggering event during the play of the interactive game; predetermining a second wager-based game event outcome prior to detecting the occurrence of the second wager-based triggering event, wherein the second wager-based game event outcome is determined using a random number generator (RNG); automatically causing, during play of the interactive game and in response to detecting the occurrence of the second wager-based triggering event, a second wager of the predefined one of a plurality of wager components funded by the player; and providing, in response to detecting the occurrence of the second wager-based triggering event, the player with any determined wager-related credits or payouts associated with said second wager-based game event outcome.

Various objects, features and advantages of the various aspects described or referenced herein will become apparent from the following descriptions of its example embodiments, which descriptions should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (e.g., whether or not they cooperate) may be used in place of a single device/article. Similarly, where more than one device or article is described (e.g., whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself. Techniques and mechanisms described or reference herein will sometimes be described in singular form for clarity. However, it should be noted that particular embodiments include multiple iterations of a technique or multiple instantiations of a mechanism unless noted otherwise.

Currently existing slot machine technology is dated and lacking younger demographics due to the same format of gambling gameplay element displays. Problems with existing slot machine and video-based casino gaming technology include: the gambling gameplay display method, and the player interaction method with the gambling game elements using a slot machine.

Veteran gamblers (e.g., older gambler demographic age 50+) have been accustomed to a standard set of video gaming symbols (e.g., A, J, K, Q) which, for example, may be accompanied with a multitude of additional themed symbols (e.g., animals, fantasy creatures, media personas, etc.) presented on a series of wheels or drums. Newer technology has made possible the use of digital display screens that present the reels and symbols in a digital format. Younger generations of gamblers (e.g., herein referred to as "gamers"), on the other hand, have been accustomed to increasingly intense and graphically glorified 2D & 3D world environments where an untold amount of possibilities may arise. These gamers, who are used to fast paced, energetic, and visually stunning games, feel that the display method of the traditional slot machines are "boring." As for the veteran gamblers, they feel that the fast paced, new aged action, is "too much."

Veteran gamblers have experienced player interaction in a few different ways: (1) a pull lever (2) a spin button (3) interact with a touch screen. Gamers have experienced player interaction in dozens of different ways, such as, for example:
  gaming controllers (e.g., Nintendo, PlayStation, XBOX, Wii)
  PC HIDs (e.g., mouse, trackball, keyboard)
  joysticks
  shooting apparatuses
  head & body gear (e.g., Victormaxx, Power Glove)
  etc.

Much like the comparison between gamers and gamblers in regards to gambling gameplay display methods, the results are similar. The younger players are "bored" whereas the older players feel "intimidated."

In many existing casino venues, standard classic slot machines are deployed which include an electromagnetic mechanism with a "lever" interface device. Slot machines have also evolved using video screens and electronic push button interfaces, which are typically referred to as "Hybrid Machines" that use a combination of both the mechanical portion and video elements of both designs.

In light of the above, it may be desirable to create and/or implement "hybrid arcade/wager-based games" or "Gambling Arcade Games" which provide hybrid arcade-style, wager-based gaming techniques which may more suitably appeal to the Casino Gamer demographic. However, one significant obstacle regarding such hybrid arcade-style, wager-based gaming techniques is that they are often comprised of new/different and complex back end solutions that may require lengthy and costly processes of regulatory review and approvals in many different gaming jurisdictions.

One possible workaround to this significant obstacle is to configure/design a hybrid arcade-style, wager-based game such that it is compliant with currently approved wager-based gaming regulatory standards such as, for example, the well-known GLI standards, which have already been approved in various gaming jurisdictions. One example of a GLI standard is the GLI-11 standard version 2.1, Published Aug. 25, 2011 by Gaming Laboratories International, LLC, the entirety of which is herein incorporated by reference for all purposes.

For example, in one embodiment, a hybrid arcade-style, wager-based game may be configured or designed to provide an arcade-style gaming interface which enables a player to participate in an arcade-style game at the wager-based gaming machine. One or more events and/or activities performed by the player (e.g., during play of the arcade-style game) may automatically trigger an RNG wager-based event such as, for example, one or more of the following (or combinations thereof):

the spinning of a virtual wager-based slot machine reel (e.g., which has been configured or designed to be compliant with the GLI standard(s));
the spinning of a virtual wheel such as a roulette wheel or "Wheel-of-Fortune"™ wheel;
the throwing/rolling of one or more dice;
the dealing of one or more card(s);
and/or other types of RNG-based video games of chance (preferably which have been configured or designed to be compliant gaming standards, rules and regulations).

Because the wager-based activities of the hybrid arcade-style, wager-based game comply with currently existing GLI standard(s) (and/or other national, regional, local gaming rules and regulations), such hybrid arcade-style, wager-based games may not require additional regulatory approval for deployment in Casino venues.

Some benefits and advantages of the hybrid arcade/wager-based gaming techniques described herein may include, but are not limited to, one or more of the following (e.g., or combinations thereof):

Enabling the utilization of the same (e.g., proven/GLI approved) slot machine back end and RNG for gambling functionality.
Enables new and unique ways to display a slot machine gambling game to specific demographics based on gameplay type and/or theme.
May increase overall house gambling demographics, revealing untapped markets, more profits, more coin-ins & more "butts in seats."
Hybrid arcade-style, wager-based games may be purposefully configured or designed to avoid (or to not require) any additional regulatory approval for deployment in Casino venues.
Provides mechanisms to Casinos/gaming establishments for facilitating achievement of desired minimum wagering goals (e.g., over time), such as those established by Casinos (e.g., Casino desires at least one wager-based reel spin by a given player every 10 seconds).
Etc.

In one embodiment, a hybrid arcade-style, wager-based game may be created by combining a new and different visual game representation with a new and different method of player interaction on a slot machine. The hybrid arcade-style, wager-based game may be configured or designed to provide the assemblage of graphical elements and gameplay features for portraying a visually different experience while also providing the enhanced method of player interaction via a particular Human Interface Device (e.g., HID), which is based on the theme/style of the visually enhanced gambling game. For example, the game "Duck Hunt" uses a gun controller where as "Super Mario Bros." utilizes a D-pad multi-button controller as the HID. According to different embodiments, either (or both) of these arcade-style video games may be adapted (e.g., using the hybrid arcade/wager-based gaming techniques described and/or referenced herein) to function as hybrid arcade/wager-based games. According to different embodiments, one or more hybrid arcade/wager-based game(s) may also be configured or designed to include one or more of the following (or combinations thereof): graphical elements (e.g., 2D and/or 3D) animations, sound effects, programming, etc.

In some embodiments, the format of the hybrid arcade-style, wager-based game may focus on "first person shooter" type, arcade-style games such as, for example, "House of the Dead," "Area 51", "Lethal Enforcers", etc. At least a portion of such games may feature a player character that automatically moves on a "rail" system (e.g., automatically moving the player's character through different scenes of the game, without requiring the player to provide input for moving his/her game character), which allows the player to concentrate his/her focus on shooting the targets which appear throughout gameplay.

The format of the hybrid arcade-style, wager-based game may also focus on other types of video and/or arcade-style games such as, for example, one or more of the following (e.g., or combinations thereof):

"non-linear" (e.g., open world) type video and/or arcade-style games such as, for example, Grand Theft Auto
"linear" type video and/or arcade-style games such as, for example, Half-Life
Massively multiplayer online "MMO" type video and/or arcade-style games such as, for example, World of Warcraft
Role-playing game "RPG" type video and/or arcade-style games such as, for example, Final Fantasy.

Such games may feature a player character that may be moved through the game world via player input, (e.g., HID), which allows for an increased sense of excitement through gameplay by providing a multitude of player-choice possibilities through a wide-array of path directions.

In some embodiments, the format of the hybrid arcade-style, wager-based game may facilitate a gameplay environment in which multiplayer functionality takes place. The multiplayer gameplay may have multiple "enrollment" aspects in which one, for example, particular player could be on location at a casino playing a hybrid arcade/wager-based game, while another (e.g., different) player could be at a different location (e.g., at a different location in the casino, at a different casino, at a different establishment such as a home or office, etc.), concurrently participating in the same hybrid arcade/wager-based game, but without participating in any wagering aspect/portions of hybrid arcade/wager-based game. A non-wagering game such as this is commonly known as a "free to play" game, in which the player is allowed to download and install said game on their own devices, which then allows the player progress through the game (e.g., which is no different than the wager based counter-part) without taking place in wager based events. Examples of some popular "free to play" games are, "TERA", "Marvel Puzzle Quest", "Planetside 2", etc. Gaming situations such as these may promote a "clicks to bricks" outcome where a casino property could promote at home users to "login over the weekend to play Super Zombie Bash! Free! Come down to the casino and play Super Zombie Bash for a chance to win big!" Such property advertisement may entice more patrons to visit the casino in order to "win big" on their favorite hybrid arcade/wager-based game.

In some embodiments, different players concurrently participating in the same hybrid arcade/wager-based game may each separately configure his/her respective wagering parameters/amounts, which may be different from the wagering parameters/amounts configured by other game player-participants.

The various hybrid arcade/wager-based gaming techniques described herein may be used to improve the visual relationship between player and machine to increase player immersion and facilitate longer more exciting gambling durations without providing a completely new back-end delivery structure. It also improves the player method of interaction with the gambling game by allowing for a plethora of new age interface devices to be coupled with specific themed games (e.g., guns, joysticks, controllers, etc.). Existing technology and gameplay, although proven, is becoming dated and "not as fun" to younger players. The hybrid arcade/wager-based gaming techniques described herein may satisfy the younger demographics gameplay needs while still satisfying the house and regulatory needs by having the same foundation which has already been tested/approved. The presentation of the gaming elements are comprised in such a way where younger demographics may be more compelled to gamble while still allowing older demographics to understand and enjoy the experience if they so desire to participate. The hybrid arcade/wager-based gaming techniques described herein may also be utilized for enabling enhanced slot machine gambling with new and exciting twists, while still being compliant with local/state/Federal gaming regulations.

Walkthrough of Example Hybrid Arcade/Wager-Based Game Embodiment

The following example is intended to help illustrate some of the various types of functions, operations, actions, and/or other features which may be provided by the Hybrid Arcade/Wager-Based Gaming System. At least a portion of these various processes, procedures and activities may also be illustrated and described with respect to the flow diagrams of FIGS. 14-18.

Initially, it is assumed that a player (e.g., or players) engages with a hybrid arcade/wager-based gaming device via standard method (e.g., inserting monetary amount), selects gameplay and wagering options via button panel (e.g., different "characters" equal different bet/wager amounts e.g. 1 line vs 30 lines), "shoots" moving elements on the display (e.g., destroying a target qualifies as a triggering event for causing initiation of a wager-based event (e.g., initiating a wager-based spin of a virtual slot reel, which collects a specified amount of wagered credits), claims winnings/payouts (e.g., based on the outcome of the virtual slot reel spin), and continues to "shoot" until additional monetary amount is needed to continue play (e.g., out of credits) and/or until player is satisfied with gambling duration and decides to discontinue gameplay.

In some embodiments, the player character is on a "rail" (e.g., "House of the Dead", "Area 51", "Lethal Enforcers" one or more of which are classic arcade rail styled shooter games) which does not allow for free range of movement or choice of direction within the gaming environment (e.g., commonly referred to as "game world" or "game level").

The automated movement of the player's character is determined by the game's functionality and whether or not the player is actually playing (e.g., destroying zombies). By way of illustration, let's envision a short animated sequence—the player's mercenary character kicks down a door and enters a small maintenance room, Upon entering the room he stops to make sure the environment is safe to move on, however, 5 NPC's (e.g., Non Player Characters) heard the noise (e.g., from the door being kicked down) and have now surrounded the mercenary and are beginning to attack. Once the player character is in the room and surrounded, the rail movement (e.g., kicking down the door and walking into the room) stops. Once stopped, the player may use the game's HID (e.g., an electro-mechanical gun, which, for example, may be electronically tethered to the gaming device) to shoot and destroy the 5 NPC's.

According to different embodiments, one or more different types of gameplay-related triggering event(s)/condition(s) may be defined for initiating a wager-based event to occur during game play (e.g., execution of wager-based slot reel spin may take place concurrently with or simultaneously with the player's continued and active participation in the arcade-style portion of the game). Examples of different types of triggering event(s)/condition(s) may include, but are not limited to, one or more of the following (e.g., or combinations thereof):

Pulling a trigger;
Firing a shot with a gun or other weapon;
Hitting a specified target;
Destroying a specified virtual object;
One or more character movements such as, for example, jumping, ducking, punching, hitting, running, sitting, etc.;
An environmental object event, such as, for example, volcano eruption, avalanche, earthquake, or sci-fi/fantasy element (e.g., a strange alien world may harbor anti-matter pockets and/or worm-holes in space-time) and/or weather (e.g., "Lightning Strike" trigger);
NPC or Boss event such as, for example, a mage or magic wielding character casting a specific spell (e.g., Fire Flare bonus round), a boss summoning a group of minions during a battle (e.g., Golden Goblin minions with multipliers);
Predetermined outcome via host application such as, for example, a property may "credit/reward" a specific patron by triggering an event (e.g., "Hot Seat bonus"

etc.), and/or may initiate an event based on a situation deemed necessary for triggering such an event. (e.g., See, e.g., 1708, FIG. 17);

A multiplayer and/or team and/or co-op event (e.g., similar to other embodiments described and/or referenced herein) in occurrence with multiple players and situations thereof;

And/or other types of event(s)/condition(s) may be defined for initiating a wager-based event to occur during game play.

Examples of different types of wager-based gaming events which may be initiated may include, but are not limited to, one or more of the following (e.g., or combinations thereof):

spin of virtual slot reel (e.g., based on RNG)
spin of roulette wheel
throw of dice
dealing of one or more cards
pick & choose/find hidden item
scramble elements/find hidden item
"scratch off"/reveal hidden item
a pachinko round
"virtual" carnival/parlor events/spin of a wheel, etc.
and/or other types of wager-based gaming events (e.g., or wager-based games) known in the art and/or described and/or referenced herein.

In at least one embodiment, it is preferable that the gameplay-related triggering event(s)/condition(s) (e.g., for triggering initiation of a wager-based event to occur) relates to an event which repeatedly occurs during the player's active participation in the arcade-style portion of the game, such as, for example: pulling of a trigger, firing of a weapon, hitting an object/target, destroying and object, etc.

Figure 11:
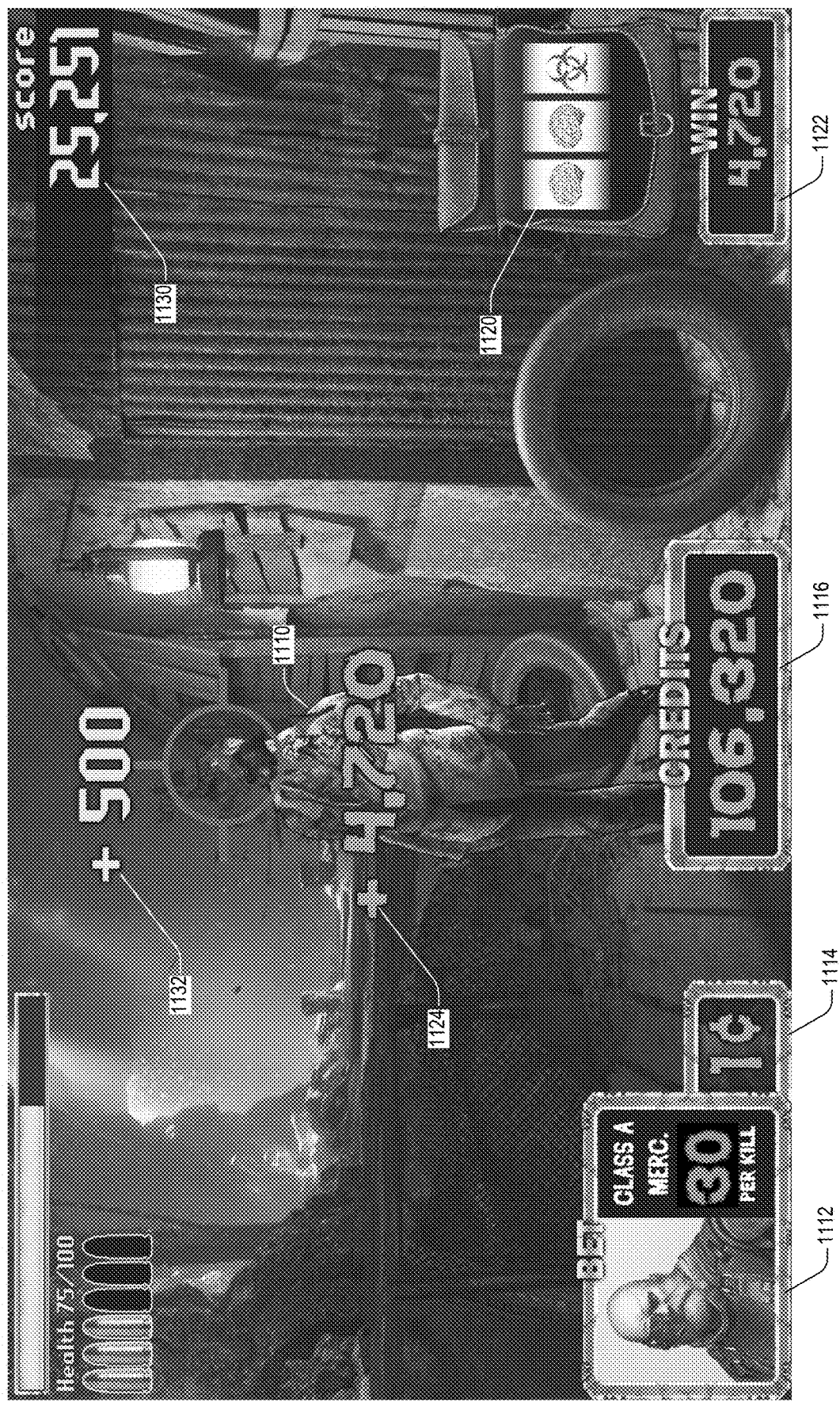
Figure 12:
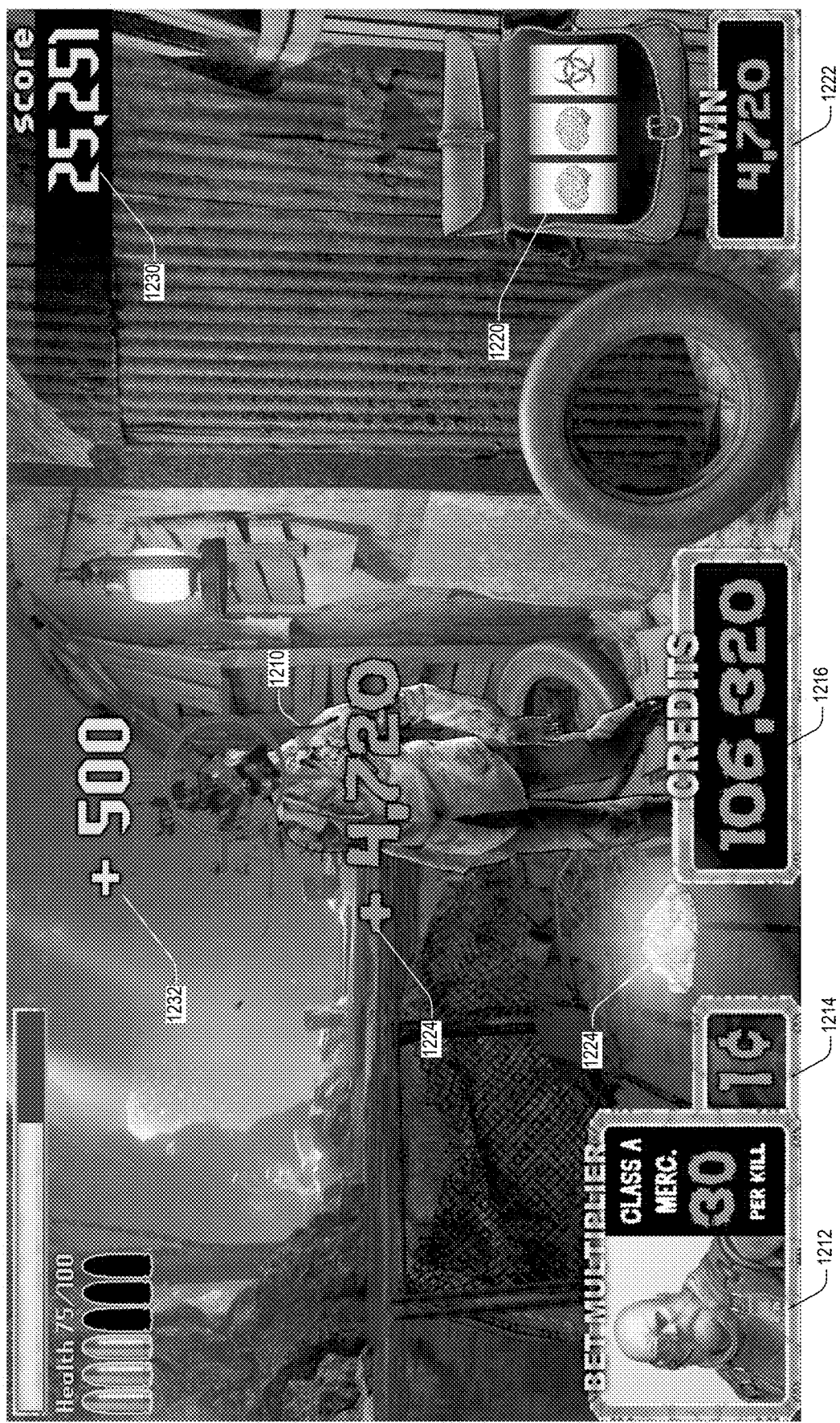
Figure 21:
FIGS. 21-25 show example embodiments of different electronic gaming machines which may be used for enabling and/or implementing one or more of the hybrid arcade/wager-based gaming techniques described and/or referenced herein.
Figure 22:
Figure 23:
Figure 24:
Figure 25:
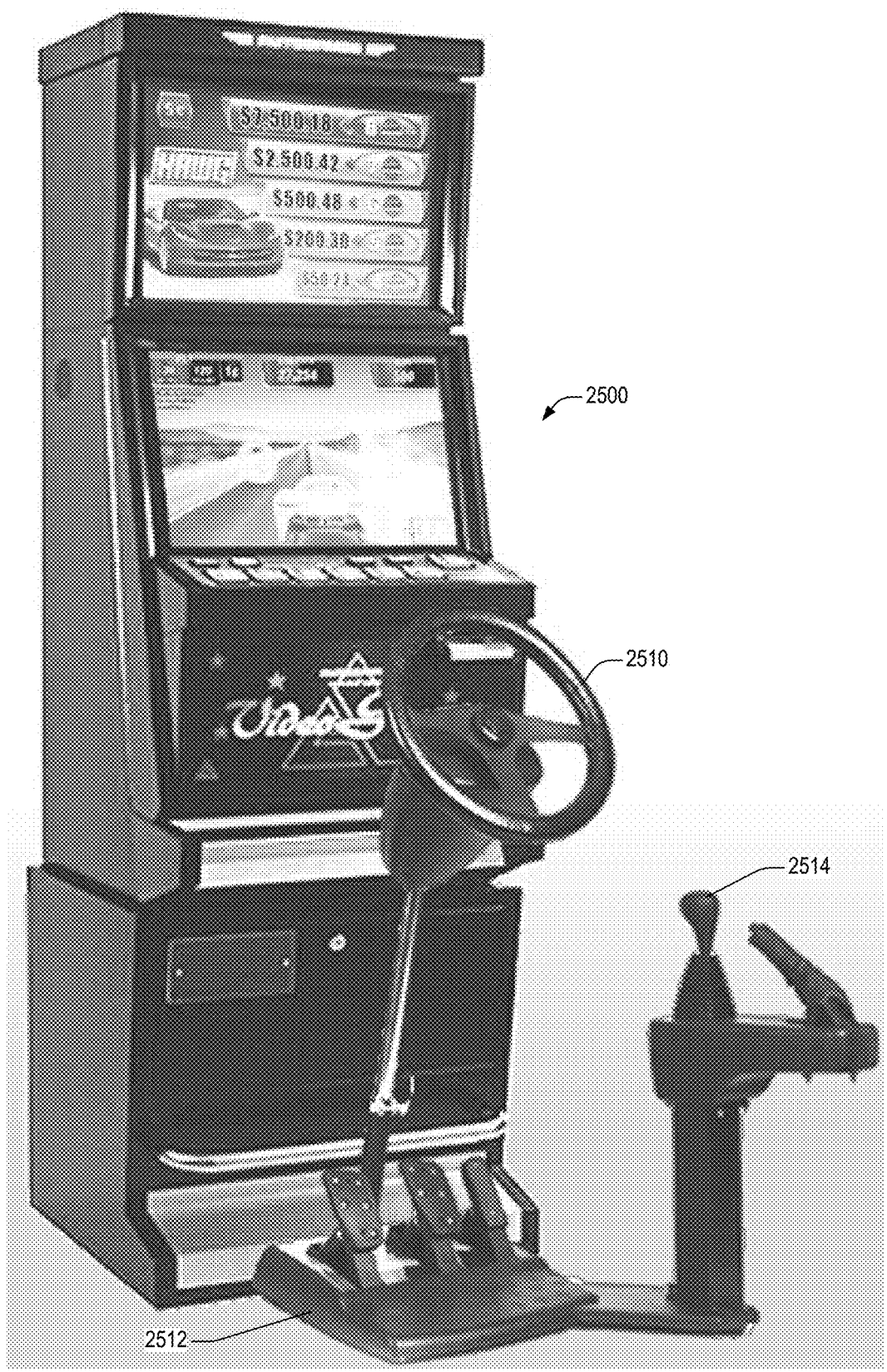

For example, in one embodiment, each time the player fires a shot (e.g., by pulling a trigger of the gun-HID device 2110, FIG. 21) during play of the arcade portion of the hybrid game, the system may automatically initiate a wager-based spin of a virtual slot reel (e.g., 1120, FIG. 11; 1220, FIG. 12, etc.). In other embodiments, each time the player destroys a specified target (e.g., destroys a zombie 1110, FIG. 11) during play of the arcade portion of the hybrid game, the system may automatically initiate a wager-based spin of the virtual slot reel (e.g., 1120, FIG. 11; 1220, FIG. 12, etc.).

In some embodiments, the hybrid arcade/wager-based game may be configured or designed as a "rail movement" type game, where the player's character is automatically moved through various scenes of the game (e.g., as if the player's character were riding on an automated rail or transport). Rail movement advances the player's character into next game world location. The rail movement durations may be short, as to not interfere with quickly repetitive and continuous shoot/spin gameplay situations. In some embodiments, there may be stopping points of play as well as regulated movement intervals which comply with then current gambling regulations and/or local casino gaming requirements/preferences (e.g., casino may deem it desirable that play of the hybrid arcade/wager-based game achieves at least 8 spins of virtual slot reel per minute). In at least some embodiments, the hybrid arcade/wager-based game may also be configured or designed to take into account standard slot game feature transition times, bonus round intro's, wild animations, etc., when determining rail movements and sequence zones.

In some embodiments, if the player decides not to shoot or destroy the Non Player Characters ("NPCs"), the NPC's may eventually destroy the player character. In at least one embodiment, when this occurs, the player character may automatically rejuvenate (e.g., come to life again), and the player may be provided with additional opportunities to destroy the NPC's at the current visual gaming location (e.g., level), before being allowed to proceed to the next level. Thus it will be appreciated that, in at least some embodiments, the hybrid arcade/wager-based game may be configured or designed to provide a minimal/no cost of failure (e.g., as compared with traditional arcade-style video games where loss of lives/credits=game over). Such techniques provide an advantage of allowing a player to temporarily depart from the game (e.g., to order a drink, have a smoke, etc.) as a traditional slot player might do. During such moments, play of the hybrid arcade/wager-based gaming device may be considered to be in an idle state. However, in some embodiments, even though the hybrid arcade/wager-based game may provide idle benefits, the game may continue to display or impart a visual sense of urgency to promote/stimulate gameplay (e.g., zombies continue to attack player character during idle game state).

Example Hybrid Arcade/Wager-Based Gaming User Interface(s)

FIGS. 10-13, 20, and 27-37 illustrate example screenshots of various graphical user interfaces ("GUIs") which may be used for facilitating activities relating to one or more of the Hybrid Arcade/Wager-Based Gaming aspects disclosed herein. In at least one embodiment, at least a portion of the GUIs may be configured or designed for use at one or more mobile devices.

Figure 10:
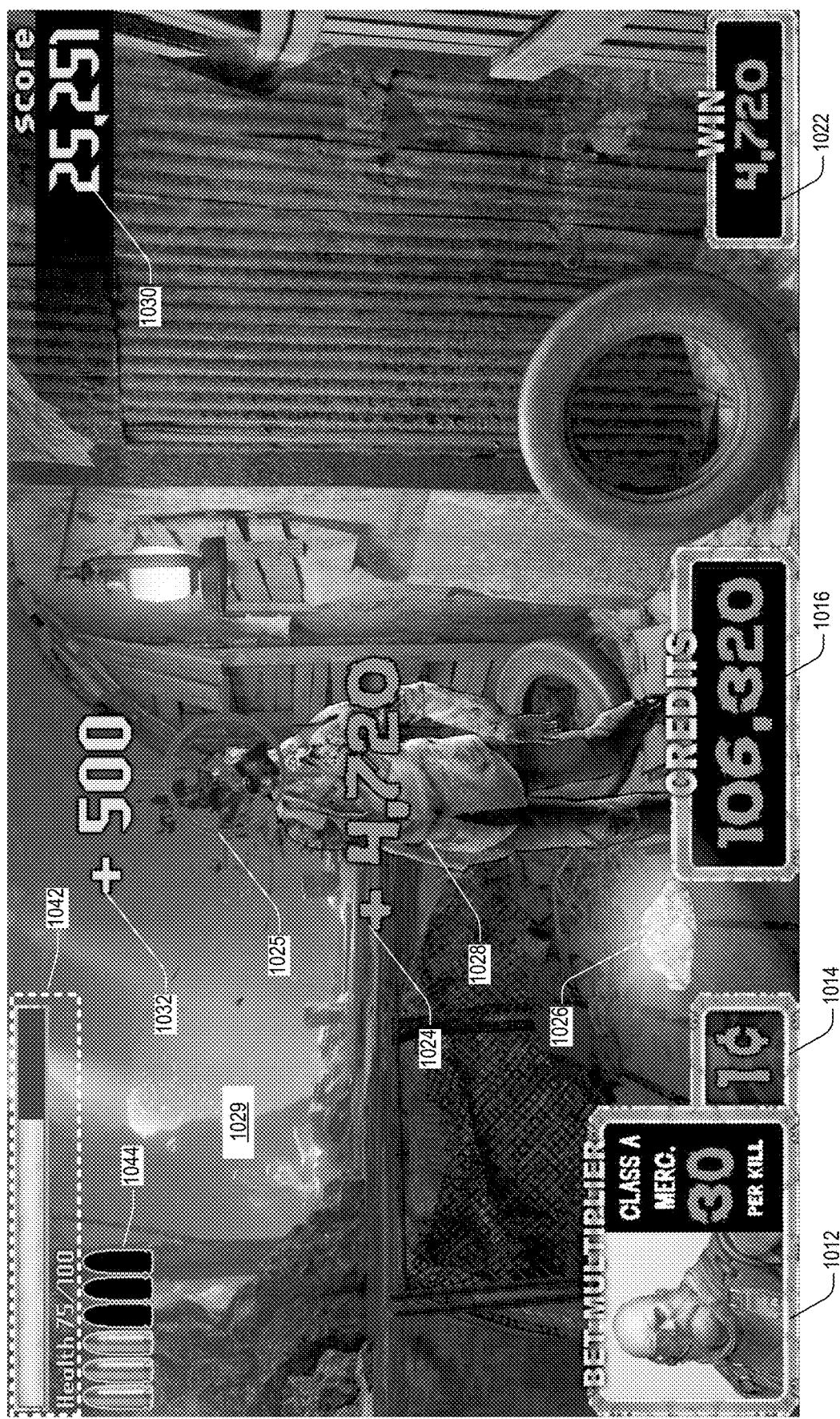

FIG. 10 shows a screenshot of an example embodiment of a Hybrid Arcade/Wager-Based Game GUI 1000 which may be used for facilitating game play and wagering activities relating to one or more of the hybrid arcade/wager-based gaming aspects disclosed herein. More specifically, FIG. 10 shows an example screenshot of hybrid arcade/wager-based game GUI based on concept of a first person shooter zombie game.

In the specific example embodiment of FIG. 10 it is assumed that the hybrid arcade/wager-based game corresponds to a first person shooter zombie game. According to different embodiments, the Hybrid Arcade/Wager-Based Game GUI 1000 may be configured or designed to display graphics, animation, images, video, text, and/or other types of content such as, for example, one or more of the following (or combinations thereof):

Player character/avatar content (e.g., 1012). As illustrated in the example embodiment of FIG. 10, this may include an image of the character, a description of the character (e.g., Class A Merc.), and other characteristics associated with the character such as, for example, character classification, skill level, strength, speed, power, knowledge, weapons, bet/wager multiplier value (e.g., 30× per kill), etc.

Wagering content (e.g., 1014). In the specific example embodiment of FIG. 10, the wagering content 1014 includes a wager value (e.g., $0.01) representing an amount to be automatically wagered for each wager-based event which occurs during play of the hybrid arcade/wager-based game.

Player credit information (e.g., 1016, 1024). In the specific example embodiment of FIG. 10, a first portion of player credit information 1024 may indicate recent credit(s) (e.g., "+4,720") awarded to the player (e.g., based on recent wager-based event), and a second portion of player credit information 1016 may indicate the player's current amount of total credits (e.g., 106, 320 credits).

Wager-based event outcome information (e.g., 1022). In the specific example embodiment of FIG. 10, the wager-based event outcome information 1022 shows an amount of credits awarded to the player based on the most recent wager-based event which occurred during play of the hybrid arcade/wager-based game.

Player character health status information (e.g., 1042).

Player character ammunition status information (e.g., 1044).

Player score information (e.g. 1030, 1032). In at least one embodiment, a first portion of player score information 1030 may represent the player's current total score achieved during the hybrid arcade/wager-based game play session. In at least one embodiment, a second portion of player score information 1032 may represent the player's score or award which has been awarded to the player based on a game play event activity and/or outcome achieved during the hybrid arcade/wager-based game play session.

Scene/Background Graphics (e.g., 1029)

NPC graphics/content (e.g., 1028)

Award Object content (e.g., 1026)

FIG. 11 shows a screenshot of an alternate example embodiment of a Hybrid Arcade/Wager-Based Game GUI 1100 which may be used for facilitating game play and wagering activities relating to one or more of the hybrid arcade/wager-based gaming aspects disclosed herein. In the specific example embodiment of FIG. 11, a classic styled slot game (e.g., 1120) is displayed, and configured or designed to offer a 1 line setup using different player characters (e.g., "mercenaries", 1112) as bet multipliers. For example, as illustrated in the example embodiment of FIG. 11, the player may use the gaming device button panel to choose a wager amount "weapon" or "character" to use, say, an armored mercenary game character (e.g., 1112, FIG. 11) wielding a shotgun (e.g., equivalent to a 30 line max bet). A bet multiplier of "30" (e.g., 30×) is associated with Class A Mercenary character 1112. Additionally, as illustrated in the example embodiment of FIG. 11, the wagering denomination is $0.01 (e.g., 1114). Accordingly, since the selected game character/weapon (e.g., 1112) is configured to correspond to a 30× wager of the wagering denomination, this is equivalent to a $0.30 wager per kill (e.g., a $0.30 wager per kill of each NPC). Thus, for example, in the specific example embodiment of FIG. 11, when the player destroys NPC 1110, this event may qualify as a wager-based triggering event, which may cause the gaming machine to automatically place and initiate (on behalf of the player) a $0.30 wager at the wager-based portion of the game (e.g., $0.30 wager automatically initiated at the slot game 1120). In some embodiments, the wager-based portion of the game is implemented as a RNG-based game of chance (e.g., such as a slot reel spin, roulette wheel spin, dice roll, etc.). In some embodiments, the outcome of the RNG-based game of chance is determined after the wager-based triggering event has occurred. In other embodiments, as described in greater detail below, the outcome of the RNG-based game of chance is determined before the wager-based triggering event has occurred, but not revealed until after the wager-based triggering event has occurred. In the specific example embodiment of FIG. 11, it is assumed that the outcome of the wager-based slot game 1120 results in the player winning 4,720 credits (1122), which may be automatically distributed to the player's account. In at least some embodiments, credits won by the player during play of the hybrid arcade/wager-based game may be converted into cash or other forms of monetary currency or credit.

FIG. 12 shows a screenshot of an alternate example embodiment of a Hybrid Arcade/Wager-Based Game GUI 1200 which may be used for facilitating game play and wagering activities relating to one or more of the hybrid arcade/wager-based gaming aspects disclosed herein. In the specific example embodiment of FIG. 12, a classic styled slot game (e.g., 1220) is displayed, and configured or designed to offer a 1 line setup using different player characters (e.g., "mercenaries", 1212) as bet multipliers. In this particular example, the selected game character/weapon (e.g., 1212) is configured to correspond to a 30× wager of the wagering denomination, which is equivalent to a $0.30 wager per kill (e.g., a $0.30 wager per kill of each NPC). In one embodiment, when the player destroys NPC 1210, this event may qualify as a wager-based triggering event, which may cause the gaming machine to automatically place and initiate (on behalf of the player) a $0.30 wager at the wager-based portion of the game (e.g., $0.30 wager automatically initiated at the RNG-based slot game 1220).

In other embodiments, when the player destroys NPC 1210, this event may not qualify as a wager-based triggering event, but rather, may cause a virtual award object 1224 to be displayed. According to different embodiments, the player may be required to interact with the virtual award object (e.g., by picking up the object, shooting the object, etc.) in order to cause a wager-based triggering event to occur. In some embodiments, the outcome of the RNG-based slot game 1220 may be determined after the NPC 1210 has been destroyed, but before the wager-based triggering event has occurred (e.g., before the player interacts with the virtual award object 1224). In the specific example embodiment of FIG. 12, it is assumed that the outcome of the RNG-based slot game 1220 results in the player winning 4,720 credits (1222). In some embodiments, the credits won by the player may be automatically distributed to the player's account. In other embodiments, the player may have to perform one or more actions (such as, for example, interacting with virtual award object 1224) in order to cause the RNG-based slot game winnings to be distributed to the player's account.

Figure 13:
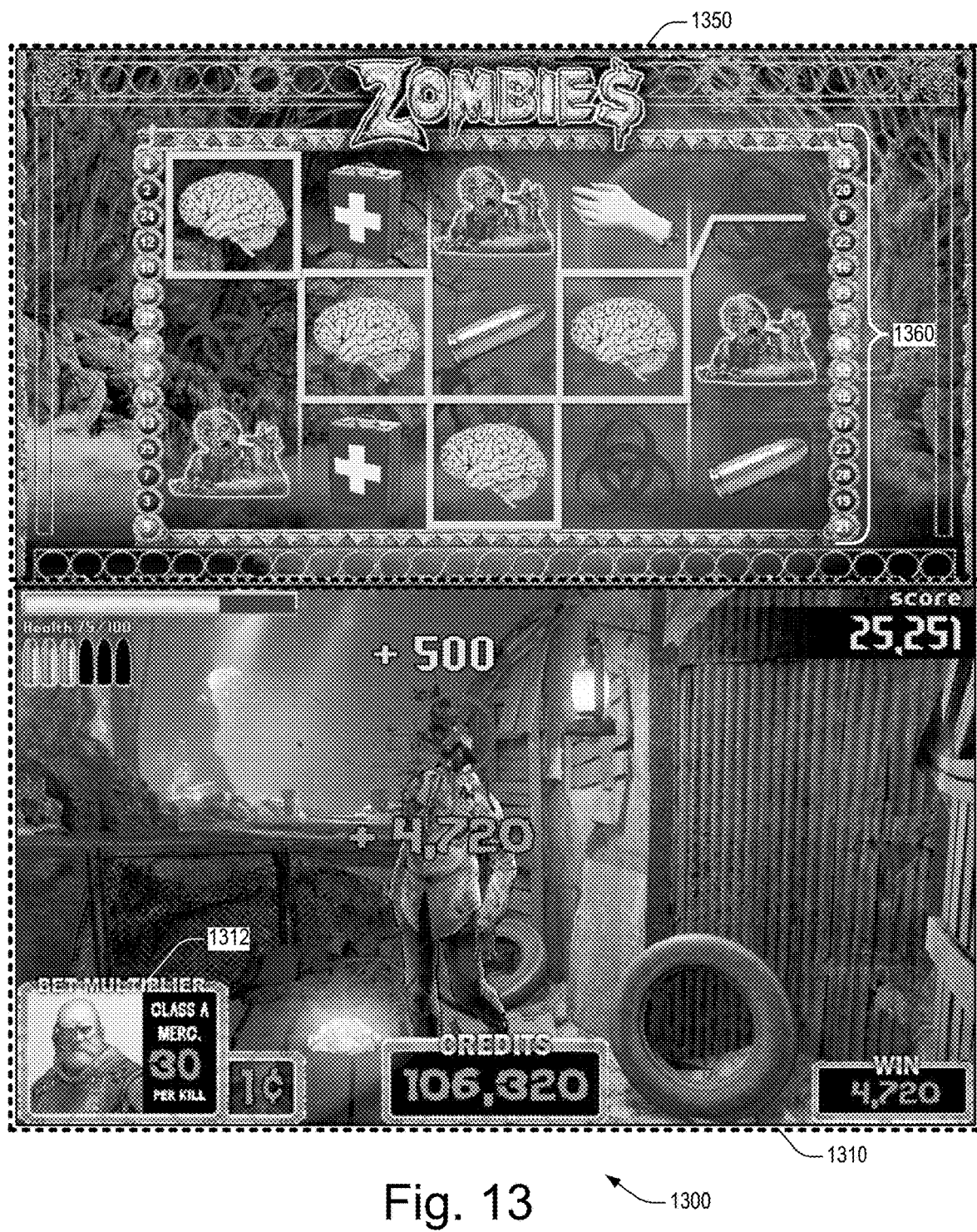

FIG. 13 shows a screenshot of an alternate example embodiment of a Hybrid Arcade/Wager-Based Game GUI 1300 which may be used for facilitating game play and wagering activities relating to one or more of the hybrid arcade/wager-based gaming aspects disclosed herein. In the specific example embodiment of FIG. 13, display portion 1350 displays an RNG-based slot game interface 1360 offering multiple lines of wager (e.g., up to 30 lines). According to different embodiments, one or more of the multiple lines of wager may be selected and associated with one or more specified:

wager amount(s),
player weapon(s)/character(s),
wager-based triggering event(s),
etc.

For example, in the example embodiment of FIG. 13, it is assumed that the selected player character 1312 ("Class A Merc.") has been configured to correspond to a 30-line wager, where the amount of each line of wager is $0.01. Accordingly, in this particular example, when a wager-based triggering event is detected during play of the hybrid arcade/wager-based game (e.g., such as, for example, when the player's Class A Merc character destroys an NPC), the gaming controller may respond by automatically placing and initiating (on behalf of the player) a 30-line wager via the wager-based slot game 1360.

According to different embodiments, different hybrid arcade/wager-based games may be configured or designed to include at least one arcade-style game play portion and at least one wager-based game play portion. Examples of various arcade-style games or arcade-style themes which may be used in implementing the arcade-style game play portion of the hybrid arcade/wager-based game may include, but are not limited to, one or more of the following (or combinations thereof):

- "First person shooter" type, arcade-style games such as, for example, "House of the Dead," "Area 51", "Lethal Enforcers".
- "Non-linear" (e.g., open world) type video and/or arcade-style games such as, for example, Grand Theft Auto.
- "Linear" type video and/or arcade-style games such as, for example, Half-Life.
- Massively multiplayer online "MMO" type video and/or arcade-style games such as, for example, World of Warcraft.
- Role-playing game "RPG" type video and/or arcade-style games such as, for example, "Final Fantasy".
- Racing/Driving arcade style game(s) (e.g., Cars, boats, planes etc.).
- Sports-themed arcade style game(s) (e.g., Football, Baseball, downhill skiing, etc.).
- Challenge arcade style game(s) (e.g., Archery, Darts, Hunting, Shooting, etc.).
- Recreation arcade style game(s) (e.g., Horseshoes, Croquet, Fishing etc.).
- TV-themed arcade style game(s).
- And/or other types of arcade-style games.

Examples of various wager-based games or wager-based themes which may be used in implementing the wager-based game play portion of the hybrid arcade/wager-based game may include, but are not limited to, one or more of the following (or combinations thereof):

- Spin of virtual slot reel (e.g., based on RNG). Examples of these types of wager-based games of chance include the RNG-based virtual slot games illustrated in FIGS. 11-13 and 27-34.
- Throw of virtual dice. An example of this type of wager-based game of chance includes the RNG-based virtual dice game 3120 illustrated in FIG. 31.
- Spin of a virtual roulette wheel or other type of wheel (such as, for example, "Wheel of Fortune"). Examples of these types of wager-based games of chance include the RNG-based virtual roulette game 3220 illustrated in FIG. 32 and the RNG-based "Wheel of Fortune" game 3320 illustrated in FIG. 33.
- Dealing of one or more virtual cards.
- Pick & choose/find hidden item.
- Scramble elements/find hidden item.
- "Scratch off"/reveal hidden item.
- A pachinko-type game.
- A bingo-type game.
- "Virtual" carnival/parlor events/spin of a wheel, etc.
- And/or other types of RNG-based games of chance known in the art and/or described and/or referenced herein.

FIGS. 21-25 show example embodiments of different electronic gaming machine cabinets with different human interface devices ("HIDs") for enabling players/participants to engage in one or more of the hybrid arcade/wager-based gaming activities described and/or referenced herein. As illustrated in the example gaming cabinet embodiments of FIGS. 21-25, examples of different human interface devices ("HIDs") may include, but are not limited to, one or more of the following (or combinations thereof):

- Touchscreen interfaces
- Mechanical Buttons (e.g., 2112, FIG. 21)
- Gun, Pistol, Shooting Device (e.g., 2110, FIG. 21)
- Mechanical Joystick (e.g., 2310, FIG. 23)
- Gaming Controller (e.g., 2410) such as, for example, remote gaming controllers similar to those used for X-Box™, Playstation™, Wii™, etc.
- Mechanical vehicle components such as, for example, vehicle steering wheel (e.g., 2510, FIG. 25), gear shift (e.g., 2514, FIG. 25), gas pedal, brake pedal, clutch pedal (e.g., see pedal assembly 2512, FIG. 25), etc.
- And/or other types of HIDs described and/or referenced herein and/or commonly known.

Example Procedures and Flow Diagrams

FIGS. 14-18 illustrate various example embodiments of different Hybrid Arcade/Wager-Based Gaming procedures and/or procedural flows which may be used for facilitating activities relating to one or more of the Hybrid Arcade/Wager-Based Gaming aspects disclosed herein.

According to different embodiments, at least a portion of the various types of functions, operations, actions, and/or other features provided by the Hybrid Arcade/Wager-Based Gaming Procedures of FIGS. 14-18 may be implemented at one or more client systems(s), at one or more System Servers (s), and/or combinations thereof.

In at least one embodiment, one or more of the Hybrid Arcade/Wager-Based Gaming procedures may be operable to utilize and/or generate various different types of data and/or other types of information when performing specific tasks and/or operations. This may include, for example, input data/information and/or output data/information. For example, in at least one embodiment, the Hybrid Arcade/Wager-Based Gaming procedures may be operable to access, process, and/or otherwise utilize information from one or more different types of sources, such as, for example, one or more local and/or remote memories, devices and/or systems. Additionally, in at least one embodiment, the Hybrid Arcade/Wager-Based Gaming procedures may be operable to generate one or more different types of output data/information, which, for example, may be stored in memory of one or more local and/or remote devices and/or systems. Examples of different types of input data/information and/or output data/information which may be accessed and/or utilized by the Hybrid Arcade/Wager-Based Gaming procedures may include, but are not limited to, one or more of those described and/or referenced herein.

In at least one embodiment, a given instance of the Hybrid Arcade/Wager-Based Gaming procedures may access and/or utilize information from one or more associated databases. In at least one embodiment, at least a portion of the database information may be accessed via communication with one or more local and/or remote memory devices. Examples of different types of data which may be accessed by the Hybrid Arcade/Wager-Based Gaming procedures may include, but are not limited to, one or more of those described and/or referenced herein.

According to specific embodiments, multiple instances or threads of the Hybrid Arcade/Wager-Based Gaming procedures may be concurrently implemented and/or initiated via the use of one or more processors and/or other combinations of hardware and/or hardware and software. For example, in at least some embodiments, various aspects, features, and/or functionalities of the Hybrid Arcade/Wager-Based Gaming procedures may be performed, implemented and/or initiated by one or more of the various systems, components, systems, devices, procedures, processes, etc., described and/or referenced herein.

According to different embodiments, one or more different threads or instances of the Hybrid Arcade/Wager-Based Gaming procedures may be initiated in response to detection of one or more conditions or events satisfying one or more different types of minimum threshold criteria for triggering initiation of at least one instance of the Hybrid Arcade/Wager-Based Gaming procedures. Various examples of conditions or events which may trigger initiation and/or implementation of one or more different threads or instances of the Hybrid Arcade/Wager-Based Gaming procedures may include, but are not limited to, one or more of those described and/or referenced herein.

According to different embodiments, one or more different threads or instances of the Hybrid Arcade/Wager-Based Gaming procedures may be initiated and/or implemented manually, automatically, statically, dynamically, concurrently, and/or combinations thereof. Additionally, different instances and/or embodiments of the Hybrid Arcade/Wager-Based Gaming procedures may be initiated at one or more different time intervals (e.g., during a specific time interval, at regular periodic intervals, at irregular periodic intervals, upon demand, etc.).

In at least one embodiment, initial configuration of a given instance of the Hybrid Arcade/Wager-Based Gaming procedures may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the Hybrid Arcade/Wager-Based Gaming procedures may correspond to and/or may be derived from the input data/information.

For purposes of illustration, an example walk-through of a specific embodiment of a hybrid arcade/wager-based game will now be described by way of example with reference to the FIGS. 11, and 14-18.

It is to be noted that, although various process steps, method steps, algorithms or the like may be described in a sequential order, such processes, methods and algorithms may be configured to work in alternate orders. Accordingly, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

Figure 14:
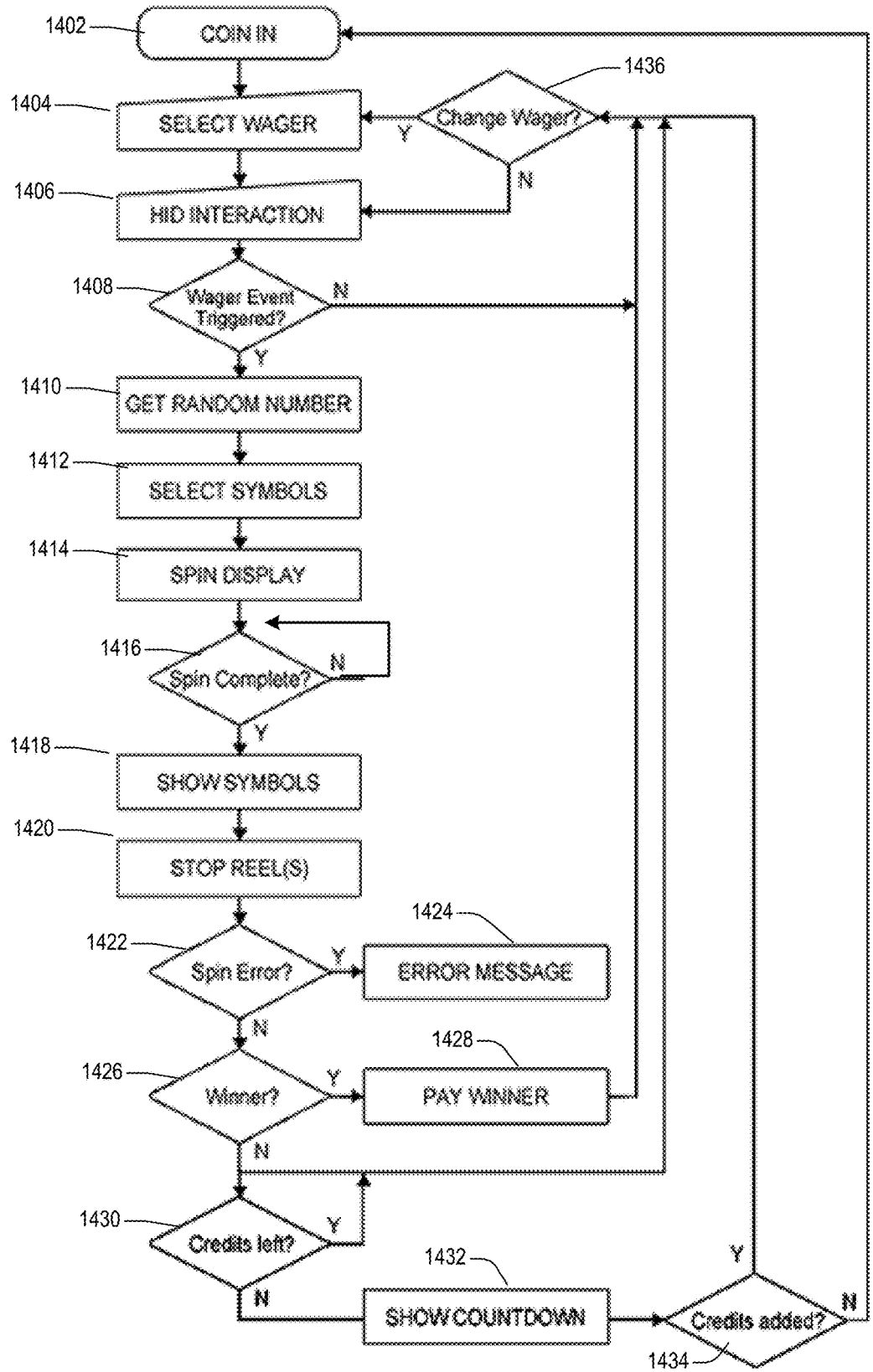
FIGS. 14-18 illustrate various example embodiments of different Hybrid Arcade/Wager-Based Gaming procedures and/or procedural flows which may be used for facilitating activities relating to one or more of the Hybrid Arcade/Wager-Based Gaming aspects disclosed herein.

FIG. 14 shows an illustrative example of a Hybrid Arcade-Wager Gaming Procedure 1400 in accordance with a specific example embodiment. As illustrated in the example embodiment of FIG. 14, the Hybrid Arcade-Wager Gaming Procedure may facilitate, enable, initiate, and/or perform one or more of the following operation(s), action(s), and/or feature(s) (or combinations thereof):

Coin in operation(s) 1402.
Select wager operation(s) 1404.
HID interaction operation(s) 1406.
Wager event triggered 1408?
If yes to 1408, retrieve RNG outcome 1410 for triggered wager-based game event.
If no to 1408, continue game play, and present opportunity to change wager parameters.
Select symbols relating to triggered wager-based game event 1412.
Spin display operation(s) 1414.
Spin Complete 1416?
If yes to 1416, show final symbols representing wager-based game event outcome 1418.
Stop reel(s) operation(s) 1420
Spin Error 1422?
If yes to 1422, generate error message 1424.
Wager-based game event outcome=Winner 1426?
If WINNER, distribute winning wager-based game event payout to player 1428.
Sufficient credits remaining for continuing play of hybrid arcade/wager-based game 1430?
If no to 1430, show countdown 1432.
Credits added 1434?
If yes to 1434, continue game play, and present opportunity to change wager parameters.
If no to 1434, end player's participation in hybrid arcade/wager-based game.

Figure 15:
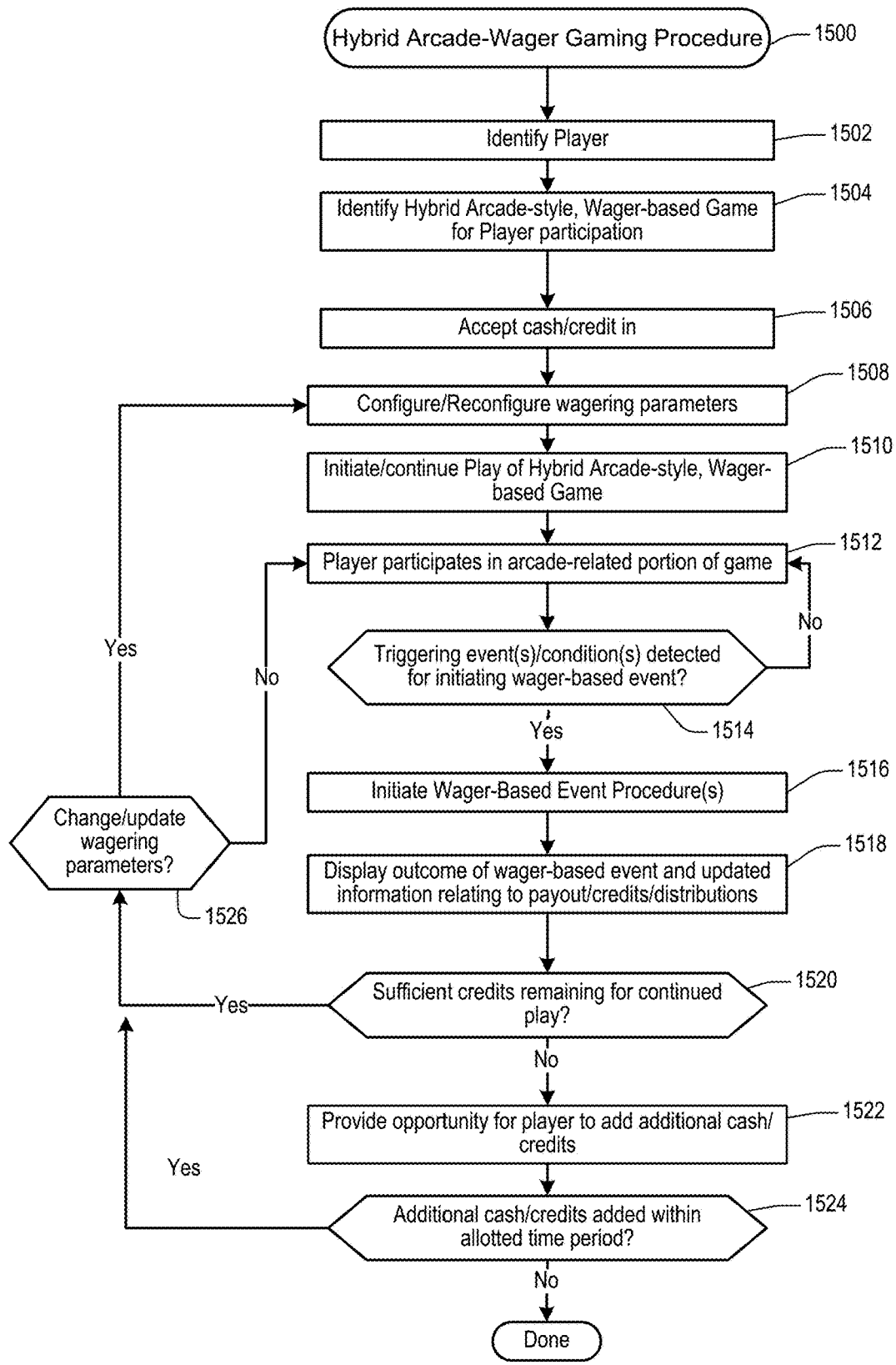

FIG. 15 shows an illustrative example of an alternate embodiment of a Hybrid Arcade-Wager Gaming Procedure 1500. As illustrated in the example embodiment of FIG. 15, the Hybrid Arcade-Wager Gaming Procedure may facilitate, enable, initiate, and/or perform one or more of the following operation(s), action(s), and/or feature(s) (or combinations thereof):

Identify Player 1502.
Identify Hybrid Arcade-style, Wager-based Game for Player participation 1504.
Accept cash/credit in 1506.
Configure/Reconfigure wagering parameters 1508. Reconfigure wagering parameters during continued game play, if desired
Initiate/continue Play of Hybrid Arcade-style, Wager-based Game 1510. Continue play of game (if start of game already initiated).
Player participates in arcade-related portion of game 1512, which corresponds to the non-wager based portion of the hybrid arcade/wager-based game.
Wager-based triggering event(s) detected 1514 in association with an identified NPC? For example:
NPC hit/destroyed?
NPC damaged by player's character?
Wagering Object collected by player's character?
Other type of wager-based triggering event detected?
If yes to 1514, retrieve predetermined RNG-based outcome for the identified NPC.
Display outcome of wager-based game event using predetermined RNG-based outcome for the identified NPC. Calculate and display updated information relating to payout/credits/distributions.
Initiate Wager-Based Event Procedure(s) 1516. For example:
Initiate wager-based virtual slot reel spin in response to successful NPC hit/destruction.
Initiate wager-based virtual slot reel spin in response to Player's character collecting "Wagering Ring" or "Gold Award Object"
Display outcome of wager-based event and updated information relating to payout/credits/distributions 1518.

e.g., Display outcome of virtual slot reel spin and update player's credits based on payout from virtual slot reel spin Sufficient credits remaining for continued play of hybrid arcade/wager-based game 1520?

If yes to 1520, change/update wagering parameters 1526?

If no to 1520, provide opportunity for player to add additional cash/credits 1522.

Additional cash/credits added within allotted time period 1524?

If yes to 1524, present opportunity to change wager parameters 1526, and continue game play 1512.

If no to 1524, end player's participation in hybrid arcade/wager-based game.

Figure 16:
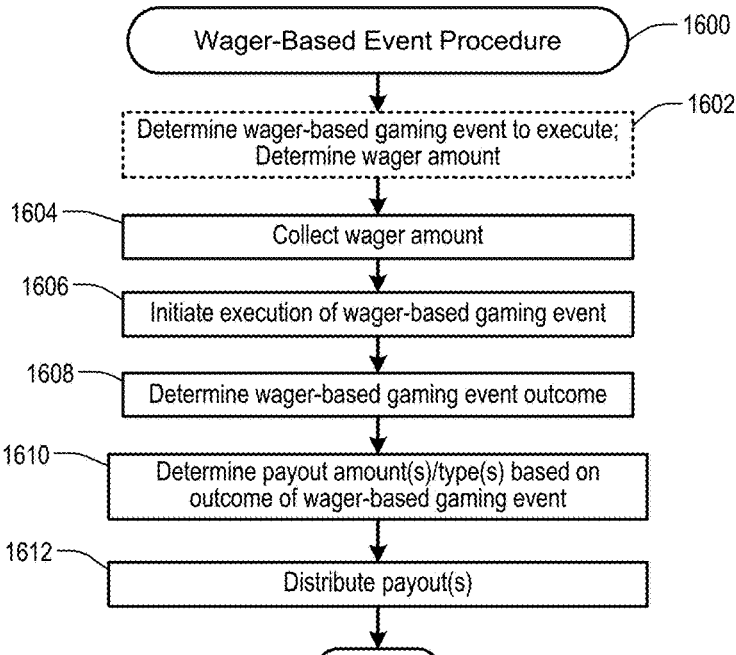

FIG. 16 shows an illustrative example of a Wager-Based Event Procedure 1600 in accordance with a specific example embodiment. In at least one embodiment, the Wager-Based Event Procedure 1600 may be initiated or implemented concurrently during hybrid arcade/wager-based game play, allowing player to seamlessly continue arcade-style game play while wagering event is executed and outcome determined. As illustrated in the example embodiment of FIG. 16, the Wager-Based Event Procedure may facilitate, enable, initiate, and/or perform one or more of the following operation(s), action(s), and/or feature(s) (or combinations thereof):

Determine wager-based gaming event to execute, and determine wager amount(s) 1602.

Collect wager amount 1604. For example, collect one credit.

Initiate execution of wager-based gaming event 1606. For example, initiate spin of RNG-based virtual slot reels.

Determine wager-based gaming event outcome 1608. For example, determine outcome of virtual slot reel spin.

Determine payout amount(s)/type(s) based on outcome of wager-based gaming event 1610. For example, determine outcome of virtual slot reel spin.

Figure 18:
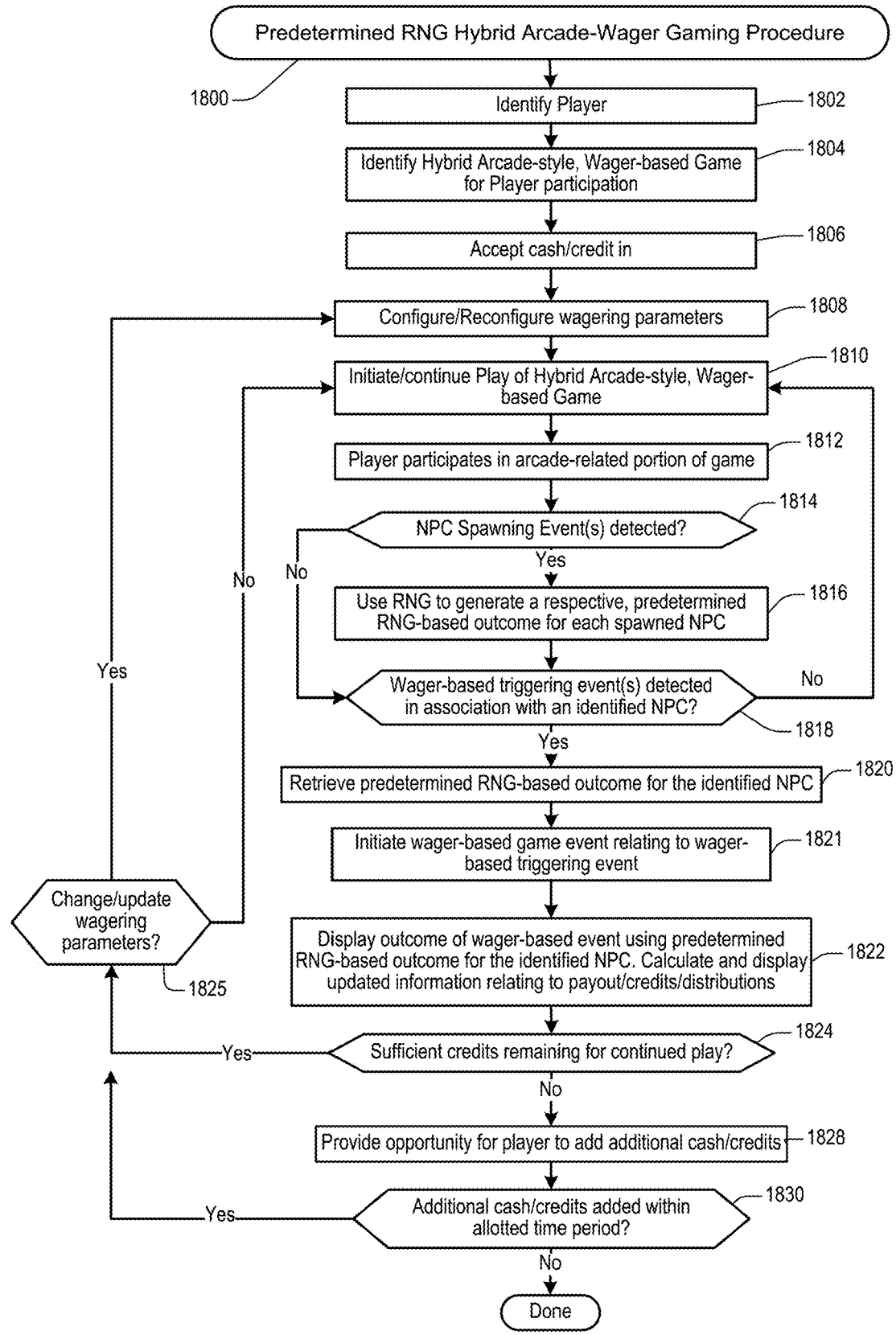

Distribute payout(s) 1612. Distribute any payout(s) (e.g., credits) due to player based on outcome of virtual slot reel spin FIG. 18 shows an illustrative example of a Predetermined RNG Hybrid Arcade-Wager Gaming Procedure 1800 in accordance with a specific example embodiment. As illustrated in the example embodiment of FIG. 18, the Predetermined RNG Hybrid Arcade-Wager Gaming Procedure may facilitate, enable, initiate, and/or perform one or more of the following operation(s), action(s), and/or feature(s) (or combinations thereof):

Identify Player 1802.

Identify Hybrid Arcade-style, Wager-based Game for Player participation 1804.

Accept cash/credit in 1806.

Configure/Reconfigure wagering parameters 1808. Reconfigure wagering parameters during continued game play, if desired Initiate/continue Play of Hybrid Arcade-style, Wager-based Game 1810. Continue play of game (if start of game already initiated).

Player participates in arcade-related portion of game 1812, which corresponds to the non-wager based portion of the hybrid arcade/wager-based game.

NPC Spawning Event(s) detected 1814? For example, NPC Spawning Event occurs when one or more NPCs are automatically spawned (e.g., introduced) during play of the hybrid arcade/wager-based game.

If yes to 1814, use RNG to generate a respective, predetermined RNG-based outcome for each spawned NPC. 1816. In this example procedural embodiment, each spawned NPC has associated therewith a respective RNG-based game of chance outcome, which has been determined before the initiation of the associated RNG-based game of chance, and which has been determined before a wager-based triggering event has occurred for that particular NPC. After a wager-based triggering event (e.g., associated with a specific NPC) has been detected, the respective RNG-based game of chance outcome (associated with that specific NPC) is then revealed, and payouts (if any) are distributed. However, in at least some embodiments, the hybrid arcade/wager-based game may be configured or designed to prevent the player from being aware that the outcome of the wager-based game of chance has been predetermined. In such embodiments, even though the outcome of the wager-based game of chance may be predetermined, the hybrid arcade/wager-based game may be configured or designed to lead the player to believe that the outcome of the wager-based game of chance was determined after the occurrence of the wager-based triggering event, and subsequent initiation of the wager-based game of chance.

If no to 1814, wager-based triggering event(s) detected in association with an identified NPC 1818? For example: NPC hit?

NPC killed/destroyed?

NPC damaged by player's character?

Wagering Object collected by player's character?

Other type of wager-based triggering event detected?

If no to 1818, player continues to participate in hybrid arcade/wager-based game 1810.

If yes to 1818, retrieve predetermined RNG-based outcome for the identified NPC 1820.

Initiate wager-based game event relating to wager-based triggering event associated with the identified NPC 1821.

Display outcome of wager-based event using predetermined RNG-based outcome associated with the identified NPC 1822. Calculate and display updated information relating to payout/credits/distributions using the predetermined outcome of the wager-based game of chance. e.g., Display outcome of virtual slot reel spin (e.g., based on outcome of the wager-based game of chance), and update player's credits based on payout from virtual slot reel spin.

Sufficient credits remaining for continued play of hybrid arcade/wager-based game 1824?

If yes to 1824, change/update wagering parameters 1825?

If no to 1824, provide opportunity for player to add additional cash/credits 1828.

Additional cash/credits added within allotted time period 1830?

If yes to 1830, present opportunity to change wager parameters 1825, and continue game play 1810.

If no to 1830, end player's participation in hybrid arcade/wager-based game.

In at least some embodiments where hybrid arcade/wager-based games are deployed in casino/regulated environments in which voluntary and/or mandatory rules/regulations are imposed (e.g., based on GLI standards, specific jurisdiction rules/regulations, and/or casino rules/regulations), one or more mechanisms may be implemented (see, e.g., FIG. 17) to cause wager-based game events to be initiated or triggered in a manner which conforms with governing rules/regulations. For example, according to different embodiments, a hybrid arcade/wager-based game may be configured or designed to automatically create conditions for a wager-based triggering event to occur in situations where there is lack of player input while credits are present, and gameplay is expected. In other embodiments, one or more hybrid arcade/wager-based games may be configured or designed to automatically cause wager-based game events to be initiated or triggered in accordance with specifically defined rules and/or criteria such as, for example, one or more of the following (or combinations thereof):

One wager-based event (e.g., virtual reel spin) about every 10 seconds (or sooner);
6 wager-based events (e.g., 6 separate reel spins) w/in 30 seconds);
10 wager-based events (e.g., 10 separate reel spins) during each level of game play);
Etc.

Additionally, in at least some embodiments, a player character's game world movement may be automatically controlled or influenced (e.g., via rail style, programmatically controlled gameplay destination paths, predetermined (and/or player-selectable) gameplay destination paths, etc.) to cause, satisfy, or achieve one or more identified or predefined goals/objectives. At least a portion of such goals/objectives may be defined by or generated by the hybrid arcade/wager-based game software and/or by local rules/regulations governing play of the hybrid arcade/wager-based game (e.g., in contrast to goals/objectives defined by the player). Additionally, in at least some embodiments, a player character's game world movement may also be automatically controlled or influenced so as to avoid the need for player input, and/or so as to avoid the need for providing specific HID hardware. For example, in one embodiment, a player character's game world movement may be automatically controlled or influenced in a manner which enables the player to interact with the gameplay elements via existing gaming cabinet hardware such as, for example, button panels, touchscreens, etc. In a controlled movement setting, the player may see their character travel a short distance on a game world map before engaging in a battle, similar to the Zombie Rail Shooter mentioned in previous embodiments where short automated movement zones offer a quick "break" in action/wagering events (e.g., to thereby cause the game to be in conformance with standards governing the occurrence of wager-based game events, which may be imposed by local rules/regulations).

Figure 17:
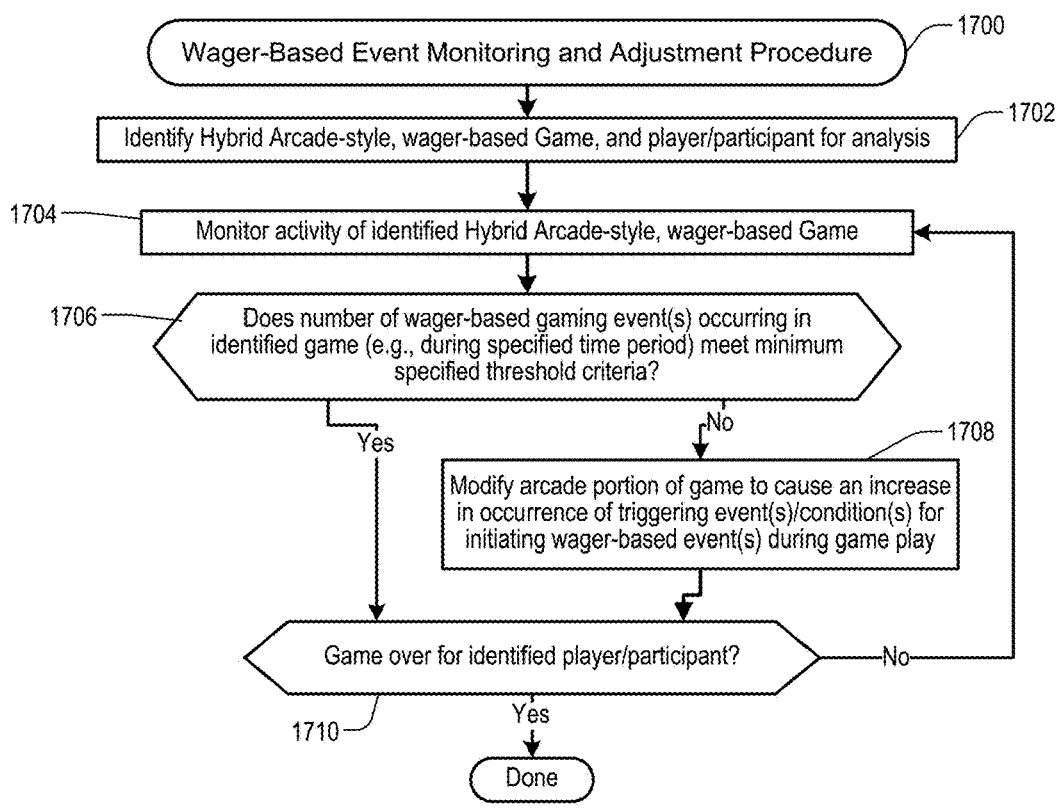

FIG. 17 shows an illustrative example of a Wager-Based Event Monitoring and Adjustment Procedure 1700 in accordance with a specific example embodiment. As illustrated in the example embodiment of FIG. 17, the Wager-Based Event Monitoring and Adjustment Procedure may facilitate, enable, initiate, and/or perform one or more of the following operation(s), action(s), and/or feature(s) (or combinations thereof):

Identify Hybrid Arcade-style, wager-based Game, and player/participant for analysis 1702.
Monitor activity of identified Hybrid Arcade-style, wager-based Game 1704.
Does number of wager-based gaming event(s) occurring in identified game (e.g., during specified time period) meet minimum specified threshold criteria 1706?
If no to 1706, modify arcade portion of game to cause an increase in occurrence of triggering event(s)/condition(s) for initiating wager-based event(s) during game play 1708. For example, in one embodiment, a minimum specified threshold criteria may be configured by the Casino such as, for example, one or more of the following (or combinations thereof):

One wager-based event (e.g., virtual reel spin) about every 10 seconds (or sooner);
6 wager-based events (e.g., 6 separate reel spins) w/in 30 seconds);
10 wager-based events (e.g., 10 separate reel spins) during each level of game play);
Etc.

If yes to 1706, game over for identified player/participant 1710?
If no to 1710, continue to monitor activity of identified hybrid arcade-style, wager-based Game 1704.

In a case where such games are featured in a casino/regulated environment, there may be a need to initiate or trigger a gambling event based on (e.g., GLI standards and/or specific jurisdiction guidelines) "lack of player input while credits are present and gameplay is expected" (e.g., 1708, FIG. 17). Also, a player characters game world movement may be automatically controlled (e.g., rail style and/or programmatically controlled predetermined (e.g., and/or selectable) gameplay destination paths) as to not facilitate the need for a specific HID, wherein the player could interact with the gameplay elements via current methods (e.g., button panel and/or touchscreen). In a controlled movement setting, the player may see their character travel a short distance on a game world map before engaging in a battle, similar to the Zombie Rail Shooter mentioned in previous embodiments where short automated movement zones offer a quick "break" in action/wagering events (e.g., conforming to regulatory spins per minute).

Example Zombie Hybrid Arcade/Wager-Based Game Walkthrough

COIN IN—(e.g., 1402, FIG. 14; 1506, FIG. 15) Player inserts monetary value (e.g., cash, credit card, credit voucher, casino token, etc.) into hybrid arcade/wager-based gaming device. The gaming machine establishes credit amount, displays it, and waits for a trigger to initiate wagered gameplay. In this particular example, it is assumed that player inserts $20 into the hybrid arcade/wager-based gaming device.

Coin I/O setup determines amount. Credits established at the hybrid arcade/wager-based gaming device and displayed (e.g., 1116, FIG. 11) via a Graphical User Interface (e.g., GUI) and/or via Heads Up Display (HUD, see, e.g., FIGS. 27 and 28).

SELECT WAGER—(e.g., 1404, FIG. 14; 1508, FIG. 15) Player provides input to select wager amount(s) via the Human Interface Devices (e.g., HIDs). Changes to wager amounts are detected by triggers (e.g., selectable interface/buttons) and depending on which one specifically is triggered, corresponding events may happen (e.g., changing from 1 line bet to 30 lines may display graphics and or animations to notify player as a response to their actions).

For example, as illustrated in the example embodiment of FIG. 13, display portion 1360 displays a slot game interface offering multiple lines of wager (e.g., up to 30 lines), which can be selected and associated with one or more specified wager amounts. In another embodiment, as illustrated in the example embodiment of FIG. 11, a classic styled slot game (e.g., 1120) is displayed, and configured or designed to offer a 1 line setup using different "mercenaries" (e.g., 1112) as bet multipliers. The player uses the gaming device button panel to choose a wager amount "weapon" or "character" to use, say, an armored mercenary game character (e.g., 1112, FIG. 11) wielding a shotgun (e.g., equivalent to a 30 line bet). As illustrated in the example embodiment of FIG. 11, the wagering denomination is $0.01 (e.g., 1114), and the selected game character/weapon (e.g., 1112) is configured to correspond to a 30× or 30-line wager of the wagering denomination, which is equivalent to a $0.30 wager per kill (e.g., of each NPC).

In at least one embodiment, a player may dynamically select wager amount by interacting with the button panel on the hybrid arcade/wager-based gaming device. For example, in one embodiment, Player may choose wager amount by using a Human Interface Device (e.g., "gun") which is attached to the hybrid arcade/wager-based gaming device cabinet via cables and wires which link to internal mechanisms that determine interactions of the HID. The player may literally point the gun and fire at the different wager amounts in order to make their desired selection (e.g., similar to pressing the wager amount buttons on current technology hybrid arcade/wager-based gaming devices). To assist the player with the pointing location of the gun, a reticle is displayed on screen and follows the movement of the gun barrel (e.g., while the gun is pointed directly at the screen) similar to a mouse and a cursor on a common computer.

GAMEPLAY OVERVIEW—For purposes of illustration, it is assumed that the player (e.g., "you") selects one or more of the various mercenaries (e.g., different wager/bet lines) to battle/destroy the enemy threat (e.g., NPC's/zombies/aliens) which has over-run the current environment (e.g., game world). It's the player's "mission" to clear the entire area of any enemy threat. In this particular example, the functionality of gameplay movement is based on a "rail shooter" (e.g., such as that associated with "House of the Dead" video arcade game). The rail movement is controlled by code and a series of triggers that determine the location of the player character in relation to gameplay and the game environment. The movement in relation to gameplay is determined by the actions of the player (e.g., shooting NPC's), and the amount of NPC's remaining in a particular location (e.g., 0 zombies left may trigger resume rail movement). The movement in relation to the gameplay environment could depend on the physical location of the player in the game world (e.g., approaching mansion doors would trigger rail movement—to open the doors and enter the mansion).

ARCADE-STYLE GAMEPLAY—(e.g., 1406, FIG. 14; 1510, FIG. 15) This assumes the player has selected a wager amount, in this case, a large mercenary using a shotgun (e.g., 1112), and engages (e.g., 1406) in interactive play of the arcade-style portion of the hybrid arcade/wager-based game using one or more HIDs. In at least one embodiment, the player initiates and participates in gameplay of the arcade-style portion of the hybrid arcade/wager-based game via HID interaction (e.g., pulling a gun trigger, pushing button(s) on gaming device, and/or providing other input).

Chapter 1—"The Mansion". The scene starts by a quick cut scene giving an overview of the player's location in the world. You (e.g., the player) are in a courtyard of an older abandoned mansion and need to make your way through while destroying any possible threats contained within. To begin your journey, you survey the courtyard in case of any possible threats. Upon doing so, you are startled/interrupted by a small group of zombies that are about to surround you. The cut scene ends and your player character is stopped. You've been surrounded, it's time to unleash the fury of your trusty shotgun. The first shot blasts through one of the zombies (e.g., 1110), dropping it to the ground. A point score value (e.g., +500) (e.g., based on how well/quick you destroyed the zombie) may be automatically and/or dynamically determined and added to your total score (e.g., 1130).

Initiation/Execution/Outcome of Wager-Based Event

During play of arcade portion of game, one or more wager-based triggering event(s)/condition(s) may be detected (e.g., 1408) for initiating execution of one or more wager-based gaming event(s). For example, the player may aim and fire at one of the displayed gaming elements (e.g., zombie/alien) on the screen at that given time. If the player does not hit or destroy the zombie/alien, the wager-based gaming event may not be initiated. In at least one embodiment, execution of a wager-based event (e.g., spinning virtual slot reel) may be performed in response to detecting the pulling the gun trigger which causes the destroying of a game element/object (e.g., zombie/alien).

In this particular example the killing of a zombie represents an occurrence of a "wager-based triggering event" which causes the gaming machine to automatically initiate a wager-based gaming event (e.g., 1516, FIG. 15, and Wager-Based Event Procedure of FIG. 16), in which a first wager is automatically placed (on behalf of the player) on the outcome of a game of chance. In this particular example the game of chance corresponds to an RNG-based slot game (e.g., 1120), and the wager-based gaming event corresponds to the placing of a $0.30 wager amount (e.g., 30 max line bet at $0.01/line) on a single spin of a virtual (e.g., RNG) slot real based 1120. In at least one embodiment, the initiation and/or execution of the wager-based gaming event may be in compliance with existing regulations governing wager-based video slot machines.

In at least one embodiment, the execution of the wager-based gaming event may occur in real-time, and may occur concurrently while the player continues to be engaged in play of the arcade-style portion of the game.

As illustrated in the example embodiment of FIG. 14, a random number generator (RNG) may be used to generate a random number 1410 (or sequence of random numbers). In at least one embodiment, the value of the generated random number may be used to:

Represent (or generate) the outcome of the wager-based game of chance;

Determine/select the final slot reel symbols 1412 (e.g., representing the outcome of the wager-based game of chance);

Initiate spinning (1414) of the virtual slot reels of the wager-based slot game.

For example, in at least one embodiment, a call to a Random Number Generator (RNG) may be made (e.g., 1410, FIG. 14) before execution of the wager-based gaming event in order to determine an outcome of the wager-based gaming event. In one embodiment, a "call" may be defined as the process where a function and/or a series of functions written in code format(s) (e.g., C#) performs specific tasks to complete operations initiated by a defined set of circumstances based on various situations. In some embodiments, a call to a Random Number Generator (RNG) may be made (e.g., 1816, FIG. 18) before the occurrence of a wager-based triggering event in order to predetermine an outcome of a future wager-based gaming event.

The return value (e.g., from the RNG generator) may go through an approved mathematical process in which the wager-based gaming event symbols to be displayed are calculated. (e.g., 1412, FIG. 14)

The anticipation animation may be called to the game display of the gaming device (e.g., spinning reels, zombie death animations, etc.). (e.g., 1414, FIG. 14)

Before the anticipation animation is complete, a series of calls may be made in order to display and arrange the symbols (e.g., to show the wager-based gaming event outcome) which were determined or predetermined via the RNG generator/mathematical process. (e.g., 1418, FIG. 14)

A call is made to stop the anticipation animation (e.g., "stop reels") (e.g., 1420, FIG. 14)

The symbols showing the wager-based gaming event outcome are displayed (e.g., at the gaming device). When the slot reel spin has completed (e.g., 1416), the final resting position of the slot reel symbols may be displayed 1418, 1420 (e.g., in accordance with the RNG-based outcome). For example, as illustrated in the example embodiment of FIG. 11, the result or outcome of the wager-based gaming event (e.g., virtual slot reel spin) may be displayed (e.g., at 1120). Additionally any wins, awards and/or payout amount(s) may be displayed (e.g., at 1122, 1124) and/or automatically distributed (e.g., Pay Winner 1428). In this particular example, it is assumed that the player has received a payout of 4,720 credits based on the outcome of the wager-based gaming event. This payout amount may be added to the player's total credits (e.g., shown at 1116). In one embodiment, the payout may be indicated by displaying (e.g., in the arcade portion of the game) a small pile of "loot" (e.g., 1224, FIG. 12) (e.g., representing slot winnings) at the base of the killed zombie.

A series of calls and checks may be made to determine if any spin errors occurred (1422). If errors occurred, an error message may be displayed (1424), and further operations may be controlled by house/regulatory standards. At least some checks may be configured or designed to provide functionality similar to that of calls. However, in at least some embodiments, checks may also be configured or designed to maintain and/or monitor certain operations and notify the system in case of failure(s)).

Assuming no spin errors detected, the hybrid arcade/wager-based game may automatically initiate and/or perform a check to see if the wager-based gaming event outcome is a winner (1426). If it is not a winner, a series of graphics and/or animations may be displayed to notify the player. If the wager-based gaming event outcome is a winner, the player's winnings may be automatically determined and distributed (1428) to the player. Additionally, a series of graphics and/or animations may be displayed to notify the player of the winning outcome. In some embodiments, there may be a minimum amount of time that the win/payout info needs to be displayed to the player.

Concurrent Play of Arcade-Style Gameplay (e.g., 1406, FIG. 14; 1510, FIG. 15) and Execution of Wager-Based Gaming Events—

In at least one embodiment, concurrently while the wager-based event is taking place, the player continues to engage in the arcade-style portion of the hybrid arcade/wager-based game.

Returning to the arcade-style play of the hybrid arcade/wager-based game, before the player can advance from the current room/level, the other surrounding zombies need to go down. The player repeatedly fires his weapon, and destroys several zombies, thereby causing initiation and execution of additional wager-based gaming events. Additional awards of arcade game points and/or wager-based credits (e.g., if applicable) are displayed for each additional zombie that is shot or killed. For example, during this process, 2 of the zombies had (e.g., based on respectively calculated RNGs) winnings which were each displayed to you (the player) via a Graphical User Interface (e.g., GUI). The other killed zombies did not drop any loot (e.g., no winning lines/no payouts).

The player then continues to shoot targets on the screen (e.g., NPC's). Upon at least one NPC destroyed (e.g., player may take multiple shots), wager-based gaming event is initiated and credits are used/collected and an amount may be displayed (e.g., in the form of graphical elements) to the player letting them know of a win or non-win situation (e.g., a backpack/duffle bag containing slot reels is shown in a Heads Up Display (HUD) and/or Graphical User Interface GUI, along with an NPC-specific display of winnings and/or points) which is clearly shown to the player at one or more times, and which may be displayed in accordance with regional and/or local jurisdictional gaming regulations and/or in accordance with local casino rules/regulations.

In at least some embodiments, when a wager-based triggering event/condition has been detected, a corresponding wager-based event may be automatically initiated or implemented concurrently during the hybrid arcade/wager-based game play, thereby allowing player to seamlessly continue arcade-style game play while, concurrently:

a Wager-Based Event Procedure (e.g., 1600, FIG. 16) is automatically executed;

a wager-based event outcome determined; and winning(s)/payout(s)/award(s) are distributed.

In this way, the player does not experience any interruption of the arcade style portion of gameplay to conduct the wagering event.

Reconfiguring of Wagering Parameters

In at least one embodiment, if player reaches a point where he/she may no longer desire to bet/wager 30 lines (e.g., per spin) (e.g., no longer able to/desirous of play as/use armored mercenary) player may choose to reconfigure wagering parameters (e.g., 1436, FIG. 15; 1508, FIG. 15) by selecting a lower wager amount (e.g., 1 line bet/wager). For example, the player may choose a small framed scout mercenary wielding a single small 9 mm pistol, which has an associated wager multiplier value of 1×. In one embodiment, this updated bet/wager criteria would continue to remain in effect until: (a) the player is out of credits, or (b) the player wins an amount which allows for increased wager(s), or (c) the player elects to subsequently change the wager amount (e.g., by changing to a new player character/weapon).

Option to Continue/End Gameplay

In one embodiment, if player uses up all credits (e.g., 1430), a countdown (e.g., 10 seconds) may be displayed (e.g., 1432), and the player may be prompted to insert monetary value/indicia of credit to continue game play. (e.g., 1434, FIG. 14; 1520-1526, FIG. 15)

If the player chooses not to insert additional money, the countdown may continue until expiration, which may then cause the hybrid arcade/wager-based game to end (e.g., for that particular player), and the game level(s) to be reset (e.g., resets gaming device to idle/attractor screen).

In a multi-player hybrid arcade/wager-based game implementation, game play may be ended for the player who is out of credits, while game play may continue for other players currently participating in the multi-player hybrid arcade/wager-based game. If a player leaves the hybrid arcade/wager-based gaming device during the continue countdown and someone else adds money during the previous players countdown, the new player may be able to continue gameplay where the last player left off.

In at least some embodiments, the above-described processes may continue to repeat themselves until either: (a) the player is out of credits, and/or (b) the player is satisfied with their gambling duration and choose to leave.

Continued Play of Arcade-Style Gameplay (e.g., 1510, FIG. 15) and Execution of Wager-Based Gaming Events In this particular example, it is assumed that the player inserts more money during the countdown, and resumes play of the hybrid arcade/wager-based game.

The courtyard area has been cleared and the automated rail movement brings the player up to the giant wooden doors of the mansion. The mercenary gives a swift kick and the doors bust open.

In at least one embodiment, when the player's character transitions from one scene/room/setting to a different scene/room/setting, this may cause the automatic spawning of new NPCs (e.g., whom the player will be battling in the newly entered scene/room/setting). In at least some first person shooter hybrid arcade/wager-based game embodiments, the NPCs may spawn in locations which may not be visible to the player (e.g., rooms out of sight, around corners, behind doors, etc.).

In at least one embodiment, each spawned NPC may have associated therewith a respectively different, predetermined RNG-based outcome. For example, in some embodiments, each spawned NPC has associated therewith a respective RNG-based game of chance outcome, which has been determined before the initiation of the associated RNG-based game of chance, and which has been determined before a wager-based triggering event has occurred for that particular NPC. After a wager-based triggering event (e.g., associated with a specific NPC) has been detected (e.g., NPC 1110 is killed/destroyed), the respective RNG-based game of chance outcome (associated with that specific NPC 1110) may be revealed, and payouts (if any) may be distributed. In at least some embodiments, the hybrid arcade/wager-based game may be configured or designed to prevent the player from being aware that the outcome of the wager-based game of chance has been predetermined. In such embodiments, even though the outcome of the wager-based game of chance may be predetermined, the hybrid arcade/wager-based game may be configured or designed to lead the player to believe that the outcome of the wager-based game of chance was determined after the occurrence of the wager-based triggering event, and after subsequent initiation of the wager-based game of chance.

Returning to the present hybrid arcade/wager-based game example, as soon as the player enters the new room (e.g., to survey the situation again), rail movement stops and zombies are beginning to swarm towards him. Zombies are coming from a hallway to the right. Confronted by another wave of zombies, the player continues to blast through the hoard of the undead. Each zombie kill initiates a respective, wagered spin of the virtual slot reel, wherein each spin has a respectively independent outcome.

Loot piles (e.g., winnings) are being tallied (e.g., not all destroyed NPC is a win). The main room has been cleared out; it's time to head for the hallway.

While the rail movement starts to automate, the player "hears a noise" the automated rail movement quickly turns to the left. There were a few straggling zombies that just now caught up to you (e.g., a mildly startling event by a quick look left to face angry up close zombies), and you take them out with your shotgun! Click, Click. Oh crap! No bullets?! No worries, by quickly firing the gun off to either sides of the screen, the gun may be reloaded. Now that the shotgun is loaded, continue with the boom-stick. The straggler zombies have been destroyed and it's time to continue to the hallway (e.g., initially seen when entering the mansion).

The rail movement stops you at a hallway. It's long, and there are windows to the right and a couple of doors to the left. You may proceed with caution. BAM! Just as you suspected, a new horde of zombies have spawned and have busted through the doors and windows and are heading straight towards you! Entrusting the almighty power of your shotgun, you lay waste to the undead foes (e.g., collecting applicable wins, if any).

The hallway battle looks to be complete, as the rail movement continues you down the hallway, CRASH! (e.g., quick camera turn to the right) a zombie bursts through a window and is trying to grab you (e.g., this event is similar to the straggler zombies event that happened previously). Quickly blast the foe to launch it back out of the window and claim loot (e.g., if applicable). The rail movement resumes as you begin heading down the hallway.

Upon reaching the end of the hallway, you enter a small, two floored room that has a spiral staircase leading to the second floor. Before you have time to gather your thoughts, another wave of zombies starts making their way towards you. Only this time, you have zombies on the main floor and zombies on the second floor above you. The main floor zombies make their way towards you while the 2nd floor terrors remain upstairs flailing their arms (e.g., "sitting ducks"). The shotgun is on duty to do the dirty work. The zombies on the main floor have been destroyed, as well as the zombies on the 2nd floor. The rail movement continues as it brings you up the spiral staircase to the 2nd floor.

Once you've reached the top of the stairs, you realize you're facing another hallway, setup similar to the ambush earlier, you proceed with caution. Zombies! They are making their way towards you! As you destroy the hallway horde, the rail camera quickly turns to look behind you—zombies have followed you up the stairs and are climbing over the banister rail! Take them out and claim any loot piles.

After the double ambush, the rail movement continues as you dash down the hallway towards a master bedroom. Once inside the room, rail movement stops. A short (e.g., bonus) cut scene shows "The Duke" (e.g., a larger crazed deformed zombie who may have lived here at one point in time) who is very angry that you splattered one or more of his zombie friends. The cut scene ends and a mini (e.g., bonus/boss) battle begins. Firing off shots to take down this angry undead giant may require a few reloads of your gun, as well as a constant barrage of bullets. Upon beating The Duke (e.g., drops bonus winnings if applicable) a short cut scene shows an Army Jeep pull up to the back side of the mansion near you (e.g., one of your mercenary friends). The rail movement continues as you make your way out of the master bedroom and back outside to meet up with your friend for further instructions.

Additional and/or Alternate Procedural Details and Functionality Relating to Hybrid Arcade/Wager-Based Game Play Additional and/or alternative procedural operations and features relating to one or more hybrid arcade/wager-based games may include, but are not limited to, one or more of the following (e.g., or combinations thereof, some of which may assume a that the hybrid arcade/wager-based game is being implemented/conducted in regulated casino gambling network environment):

In at least some embodiments, as illustrated in the example embodiment of FIG. 17, the gaming server (e.g., or other system) may monitor activity of hybrid arcade/wager-based game in order to determine if the number of wager-based gaming event(s) occurring in a hybrid arcade/wager-based game (e.g., during specified time period) meet minimum specified threshold criteria, which, for example, may be set or defined by the casino (e.g., minimum specified threshold criteria=at least one wager-based event (e.g., virtual reel spin) occurring about every 10 seconds (e.g., or sooner). If the system determines that the minimum specified threshold criteria is not being met, the system may automatically take appropriate action to modify parameters of the arcade portion of the hybrid arcade/wager-based game to cause an increase in occurrence of triggering event(s)/condition(s) for initiating wager-based event(s) during game play.

When the trigger is pulled by the player, code is executed that determines where the "gun" was pointed and what gaming element it was fired at (e.g., at the moment when the trigger was pulled).

In some embodiments, there may be situations where multiple elements are shot at different times. Example, there are 3 NPC's on the screen, each requiring (e.g., up to but not limited to) 3 shots to destroy. The player fires one shot at NPC 1, then player fires another shot at NPC 2, the player then fires another shot at NPC 3. At this moment, each NPC still requires two shots each in order to be destroyed. The player goes through in the reverse order firing two shots per each NPC targeted. The NPC that was shot first now has become the last one to be destroyed.

A series of events which store data may log the location and stats for one or more NPCs. The logged game data may include, for example, one or more of the following (e.g., or combinations thereof):
How many times an NPC was shot;
Where each NPC was shot;
The resulting animation used to display how it was shot (e.g., a headshot may destroy most zombies, but may still reward in the same manner as if it were shot multiple times (e.g., RNG));
Etc.

The logged game data may be used for bonus rounds and/or events that may include giant boss-like NPC's and/or other NPC's that may require more shots to destroy.

Execution of wager-based gaming events may be implemented by performing a series of operations (e.g., as illustrated in FIG. 16) at one or more devices (e.g., RNG-based gaming server, or EEPROM).

"Big win" kills may offer increased/extra animations and sounds to highlight the winnings According to different embodiments, based on a different set(s) of predetermined symbols, bonus rounds may be available to players. A few such rounds may include one or more event(s) similar to those described below.

FREE SPIN
    Bonus triggered. For example, in one embodiment, a crazy super-awesome mercenary drops in and offers a predetermined number (e.g., 10) free kills (e.g., because he likes the smell of NPC blood)
    Large, armored/mech-like, huge gun (e.g., may only appear during free spin bonus)

PICK N CHOOSE
    NPC's holding hostages
    "Pick" the appropriate NPC(s) to save the hostages and claim "rescue rewards"

SUPPORT DROP
    A bonus scene: Virtual carrier (e.g., crate/drone) drops/delivers special item that gets auto used in the cinematic (e.g., grenade dropped and thrown kills predetermined number (e.g., 5, 10).

In some embodiments, a RNG outcome determination is tied to NPC spawn points, prior to player gameplay interaction (although, in some embodiments, it may be assumed that monetary value has been added as well as wager amount selected). For example, when an NPC is spawned into the gameworld, a respective spin of the reels (behind the scenes) may be automatically generated per each spawned NPC, essentially determining the wager-based game event outcomes before player interaction happens. In one embodiment, the predetermination of the RNG outcomes are based on the game's spawning of NPC's within the gameworld. The actual wager initiation may be based on the player's interaction (e.g., destroying/damaging of an NPC). Upon execution of the wager-based game event, the HAWG may then display the predetermined RNG outcome. This process may occur with each NPC that has been spawned and destroyed.

By way of illustration, imagine a player needs to go through an abandoned house and destroy any zombies within. When the HAWG game level loaded, it populated its (5) spawn points with NPC's. When the first NPC was spawned, a RNG call was made to generate an RNG outcome, and that outcome is stored and associated with the first spawned NPC. When the next NPC is spawned, another, new and different RNG call is made to generate a second RNG outcome, and that second RNG outcome is stored and associated with the newly spawned (second) NPC. This process continues until all NPC's are spawned (e.g., the timing of which may span of a few milliseconds/seconds). Upon entering the house, the player encounters their 1$^{st}$ NPC. BOOM! Headshot! . . . the NPC was destroyed and its associated, previously generated (e.g., predetermined) wager-based game event outcome is displayed to the player. The outcome does not get changed or altered in any way. In at least some embodiments, the outcome which is generated for a given NPC may represent the "same" outcome (e.g., based on RNG probability data) which the player would've received had they just "pressed spin" on a RNG-based slot machine.

To further illustrate HAWG flexibility, what if, using the same scenario (e.g., 5 NPC's and 1 player) the player decides to discontinue play after destroying 2 NPC's? In one embodiment, the result would be similar to the situation of the player sitting down at a slot machine and pressing spin twice and then discontinuing play. What about the 3 other predetermined RNG outcomes? Those outcomes did not have any wager initiation associated with them and therefore do not "exist" to be displayed. If the other 3 NPCs are never destroyed, the 3 corresponding predetermined RNG outcomes are never utilized.

It will be appreciated that the sequential order in which RNG outcomes are determined in these HAWG embodiments differs from that of conventional wager-based games (e.g., slot games) in which the wager-based triggering event occurs first (e.g., hitting a "spin" button) and the determination of the RNG outcome occurs second (e.g., after the occurrence of the wager-based triggering event). One reason behind the altered process order of HAWG embodiments is that the predetermination (and storing) of the RNG outcome allows for quick and uninterrupted access to such information in the event that the game stutters, and/or avoids overloading of the RNG engine (e.g., in the event that multiple RNG outcomes may need to be determined substantially simultaneously).

Open World & Role-Playing Gaming (e.g., RPG) Embodiments

The format of at least some of the hybrid arcade-style, wager-based games may also focus on "linear", "non-linear (e.g., open world)", Massively Multiplayer Online "MMO", and/or Role-Playing ("RPG") type video and/or arcade-style games such as, for example, "Half-Life", "Grand Theft Auto", "World of Warcraft", and "Final Fantasy" (e.g., respectively). Such games may be collectively referred to herein as "RPG" type games, and may feature a player character that is moved through the game world via player input (e.g., HID). This allows for an increased sense of excitement through gameplay by providing a multitude of player-choice possibilities through a wide-array of path directions.

In some embodiments, the format of the hybrid arcade-style, wager-based game may facilitate a gameplay environment in which multiplayer functionality takes place. The multiplayer gameplay may have multiple "enrollment" aspects in which one particular player could be on location at a casino playing a hybrid arcade/wager-based game, while another different player could be at a different location (e.g., a location outside the casino which may be accessible via network access to a home/personal computer and/or mobile device) playing the same hybrid arcade/wager-based game, but without the wagering aspect found in the casino environment.

A non-wagering game such as this is commonly known as a "free to play" game, in which the player is allowed to download and install said game on their own devices, which then allows the player progress through the game in a manner substantially similar to that of the hybrid arcade/wager-based game except that the wagering component (e.g., regulated gambling component) of the game is omitted. Examples of some popular "free to play" games may include: "TERA", "Marvel Puzzle Quest", "Planetside 2", etc. Gaming situations such as this may promote a "clicks to bricks" outcome where a casino property could promote or solicit home users to "login over the weekend to play Super Awesome RPG! Free! Come down to the casino and play Super Awesome RPG for a chance to win big!" Such property advertisement may entice more patrons to visit the casino in order to "win big" on their favorite hybrid arcade/wager-based game. The various hybrid arcade/wager-based gaming techniques described herein may also be utilized for enabling enhanced slot machine gambling with new and exciting twists, while still being compliant with local/state/Federal gaming regulations.

In at least some embodiments, the assemblage and representation of graphical elements of the RPG type hybrid arcade/wager-based games may be configured or designed such that the visual result (e.g., as experienced by the player) resembles that of a traditional, arcade-style RPG-type game, and may be further configured or designed such that the interaction by the player (e.g., via HID, EGM button panel and/or possible touchscreen) facilitates wagered gameplay, for example, by providing opportunities to the player (e.g., during play of the RPG-type hybrid arcade/wager-based game) to selectively participate in wager-based activities/events which conform to appropriate gaming regulations and jurisdictional requirements. Using the various hybrid arcade/wager-based gaming technique described herein, the visual relationship between player and machine may be enhanced and improved, thereby increasing player immersion and facilitating longer more exciting gambling durations without the need to implement new and/or reconfigured back-end delivery structure(s).

Additionally, unlike the Zombie themed rail shooter embodiments previously described herein, the RPG (e.g., Role Playing Game) hybrid arcade/wager-based game may be setup/configured/built substantially differently (e.g., than that of rail-type games), while still utilizing similar concepts, triggering mechanisms and gameplay criteria. For example, in some embodiments, the focus on the wagering event may change depending on the structure, style, and theme of the RPG game. For example, in one embodiment of the Zombie theme game, the wager event was triggered after (or in response to) an NPC being destroyed; whereas an RPG version of the game may be configured or designed to trigger a wager-based gaming event to occur when a player character deals damage to an NPC and/or attacks an NPC. For example, depending on one or more factors such as, for example: the type of attack, player character performing the attack, weapon and/magic spell being used and type of NPC player is battling, etc., there may exist the possibility of an NPC being destroyed by the damage dealt by the player character in a single wager-based gaming event (e.g., one attack). A person of ordinary skill in the art may deem it preferable that the wagering event be based on more simplified criteria such as the destruction of an object rather than on more complex criteria such as the degree of damage dealt to the object. However, by leveraging and using various programmatic functions such as those inherent in RPG styled gameplay, it becomes possible to define and/or configure one or more wager-based triggering events (e.g., for initiating pre-approved RNG-based games of chance) which may be based on different degrees of damage inflicted upon an object, and/or which may be based on player initiated attacks. In such embodiments, for example, the specific case previously described where the NPC was destroyed by a single damage dealing attack may be a result of a wild symbol and or mini bonus win line configuration, which may be displayed to the player via graphics and/or animations. In a similar manner, a player could be engaged in a battle where multiple attacks from NPCs and/or other player(s) may be exchanged. For example, from a gambling/casino viewpoint, a patron could be "battling" a giant monster for a few minute duration where each (e.g., or at least one) attack made by the player initiates a separate wager-based spin of the RNG-based slot game.

In some embodiments of RPG hybrid arcade/wager-based games, battles between players and NPC's may follow a "turn based" style, e.g. player move, NPC move, player move, NPC move—until the battle is over (e.g., either the player or NPC gets destroyed). Some RPG hybrid arcade/wager-based game embodiments may have multiple "hero's" controlled by one player. For example, one embodiment of an RPG hybrid arcade/wager-based game may be configured or designed to be substantially similar in gameplay to the RPG-based game "Final Fantasy", in which the player controls (3) hero characters as "they" travel across the lands in search of their quest related tasks. These (3) hero characters may encounter numerous NPC's along their travels, and when doing so, the team of hero's may encounter a cornucopia of NPC's in no specific amount and/or arrangement. For example, one NPC encounter may entail the 3 hero characters battling 4 ogres, or 8 small gremlins, or 1 behemoth, or a combination thereof such as, 1 behemoth 1 ogre and 4 small gremlins. How the player decides to battle each group may depend on one or more factors such as, for example: the player's preferences, the player characters abilities, the type of NPC's (e.g., fighting style, weaknesses, strengths) about to be battled, wagering criteria relating to one or more player characters, etc.

HUD and Menu Layouts/Credits Vs Points

In at least some embodiments, a player may observe multiple graphical elements and/or display panels configured within the main view on the game screen. Such elements are typically referred to as a Heads Up Display (e.g., HUD). An example of a HUD is illustrated at 2750 of FIG. 27.

The HUD may be configured or designed to display important information to the player in regards to their relationship with the game and/or game world. For example, in the case of an RPG hybrid arcade/wager-based game, one may expect to see indicators for Health, Stamina, Mana, Experience Points (e.g., other points too), Potions, scrolls, crystals, gems, character level progress, etc. For wager-based game events, there may also be accompanying indicators displaying, credits, wager amount, payline amounts, last win amount, reels & symbols, etc.

Figure 27:
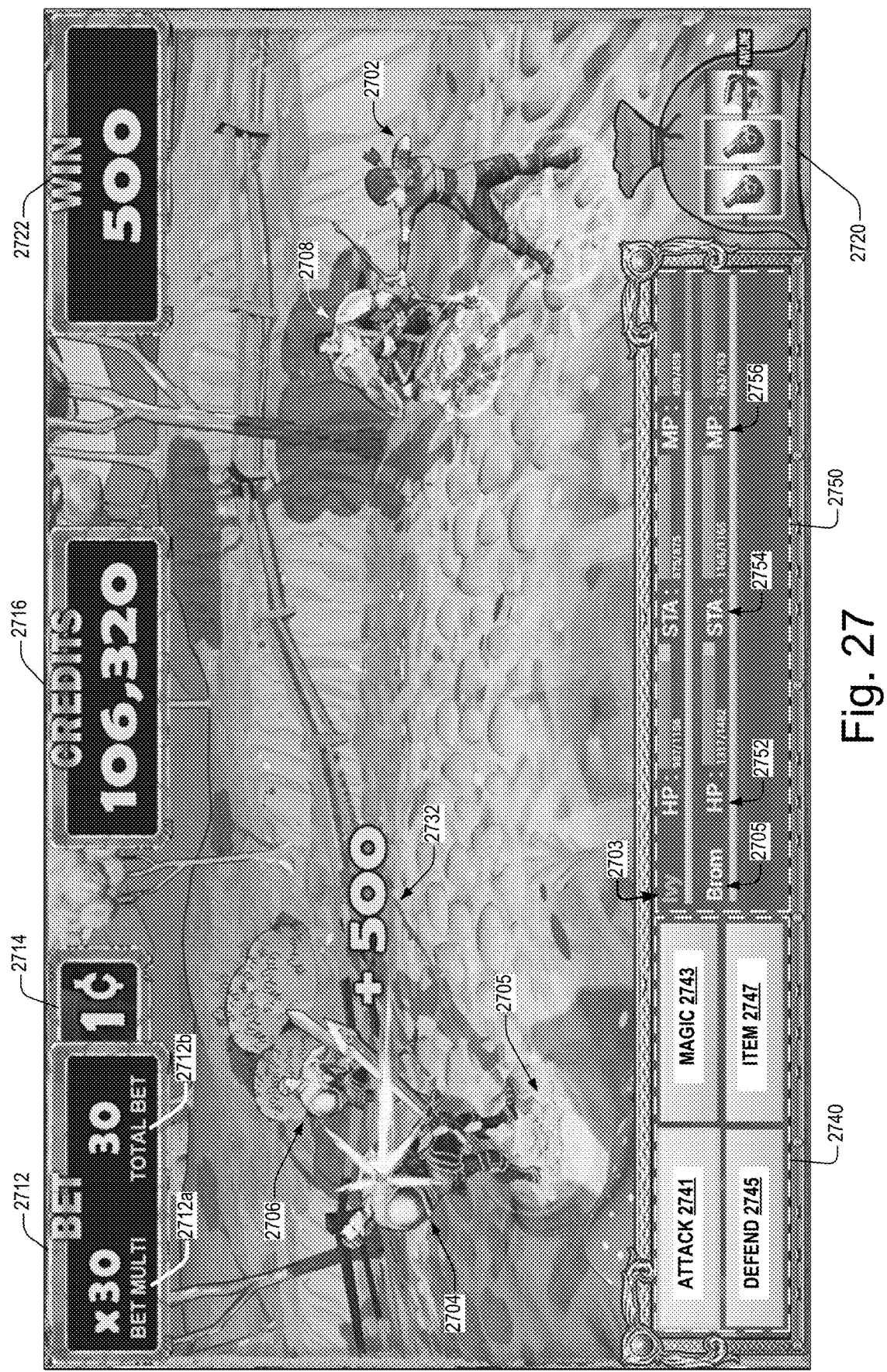

In at least some embodiments, wager-related credits may be distinguished from gameplay points (e.g., experience, battle or skill etc.). For example, as illustrated in the example embodiment of FIG. 11, wager credits 1116 and score (e.g., gameplay points 1130) are separate and distinct elements which are each displayed differently. In some embodiments, an RPG hybrid arcade/wager-based game may be configured or designed to enable the player to toggle/hide various portions of the HUD, thereby allowing for an increased sense of immersion. Additionally, in at least some embodiments, win animations, graphics and/or sounds may accompany and highlight winning wager events, clearly notifying the player/patron of his or her winnings, losses, credits received and/or score points earned. FIG. 27 shows a screenshot of an example embodiment of a RPG Hybrid Arcade/Wager-Based Game GUI 2700 which may be used for facilitating game play and wagering activities relating to one or more of the RPG hybrid arcade/wager-based gaming aspects disclosed herein. For example, the RPG Hybrid Arcade/Wager-Based Game GUI 2700 may be configured or designed to display one or more of the following (or combinations thereof):

Player character/avatar content (e.g., 2702, 2706, 2708). As illustrated in the example embodiment of FIG. 27, this may include one or more of the following (or combinations thereof): an image of the player's character, an image of other player characters, a description of the character(s), and/or other characteristics associated with the character(s) such as, for example, character classification, skill level, strength, speed, power, knowledge, weapons, bet/wager multiplier value, etc.

Wagering content (e.g., 2712, 2714). In the specific example embodiment of FIG. 27, the displayed wagering content includes a wager value or wager denomination 2714 (e.g., $0.01) representing an amount to be automatically wagered for each wager-based event which occurs during play of the hybrid arcade/wager-based game. As illustrated in the example embodiment of FIG. 27 the displayed wagering content also includes bet/wager multiplier information 2712*a* (e.g., 30×), and a total bet/wager information 2712*b* (e.g., Total Bet=$0.30 or 30 credits)

Player credit information (e.g., 2716, 2722, 2732). In the specific example embodiment of FIG. 27, a first portion of player credit information 2722, 2732 may indicate recent credit(s) (e.g., "+500") awarded to the player (e.g., based on recent wager-based win event), and a second portion of player credit information 2716 may indicate the player's current amount of total credits (e.g., 106,320 credits which may be touch-toggled to display actual monetary value, in this case credits equal $1063.20).

Wager-based event outcome information (e.g., 2732). In the specific example embodiment of FIG. 27, the wager-based event outcome information 2732 shows an amount of credits awarded to the player based on the most recent wager-based event which occurred during play of the hybrid arcade/wager-based game.

Player Character Attribute Status Information 2750, which, for example, may be configured or designed to display updated status information relating to attribute(s) of one or more player characters such as, for example, one or more of the following (or combinations thereof):

Player character health status information (herein referred to as HP) (e.g., 2752).

Player character stamina status information (herein referred to as STA or ST) (e.g., 2754).

Player character magic points and/or mana status information (herein referred to as MP) (e.g., 2756).

As illustrated in the example embodiment of FIG. 27, player character attribute status information is displayed for two different player characters, namely Player Character "Ivy" (2703) and Player Character "Brom" (2705). In some embodiments, a single game play participant (e.g., human player) may control both Player Character "Ivy" (2703) and Player Character "Brom" (2705). In other embodiment, one human game play participant may control Player Character "Ivy" (2703), and a different human game play participant may control Player Character "Brom" (2705).

Player score information. In at least one embodiment, a first portion of player score information may represent the player's current total score achieved during the hybrid arcade/wager-based game play session. In at least one embodiment, a second portion of player score information may represent the player's score or award which has been awarded to the player based on a game play event activity and/or outcome achieved during the hybrid arcade/wager-based game play session.

Scene/Background Graphics.

NPC graphics/content (e.g., NPC character 2704).

Award Object content (e.g., 2705).

One or more interface(s) (e.g., 2740) for enabling a player to access and/or initiate game-related activities/actions such as, for example:

Attack (e.g., 2741)—Choose from various attacks based on specific character selection.

Magic (e.g., 2743)—Choose from various magic abilities based on specific character selection.

Defend (e.g., 2745)—Choose from various defense skills based on specific character selection.

Item (e.g., 2747)—Choose from various items which may be quest related and/or character related.

And/or other types of game-related information and/or activities.

For example, as illustrated in the example embodiment of FIG. 27, Actions Panel 2740 represents an area of the GUI which has been configured or designed to enable one or more player(s) to strategically initiate and/or perform specific character based actions which may cover a wide area of possibilities, such as, for example, one or more of the following (or combinations thereof):

Selecting a special type of defense move for a character who (e.g., who is fatigued, for example). In one embodiment, that characters next turn may be forfeited because they will be defending themselves in order to heal.

Applying potions (e.g., choosing the correct one may aid the fatigued character).

Swapping items (such as a rejuvenating necklace that may also aid with healing a player's character).

Selecting a form of attack and/or special move/ability (e.g., based on character selection). For example, Paladin="Hammer Strike" whereas Archer="Raining Arrows". In at least some embodiments, different characters may have associated therewith respectively different sets of moves/weapons which may be selected by the controlling player).

Selecting a form of magic spell and/or scroll. In at least some embodiments, different characters may have associated therewith respectively different sets of spells and/or scrolls which may be selected by the controlling player).

And/or other types of game play action(s)/activities.

Figure 36:
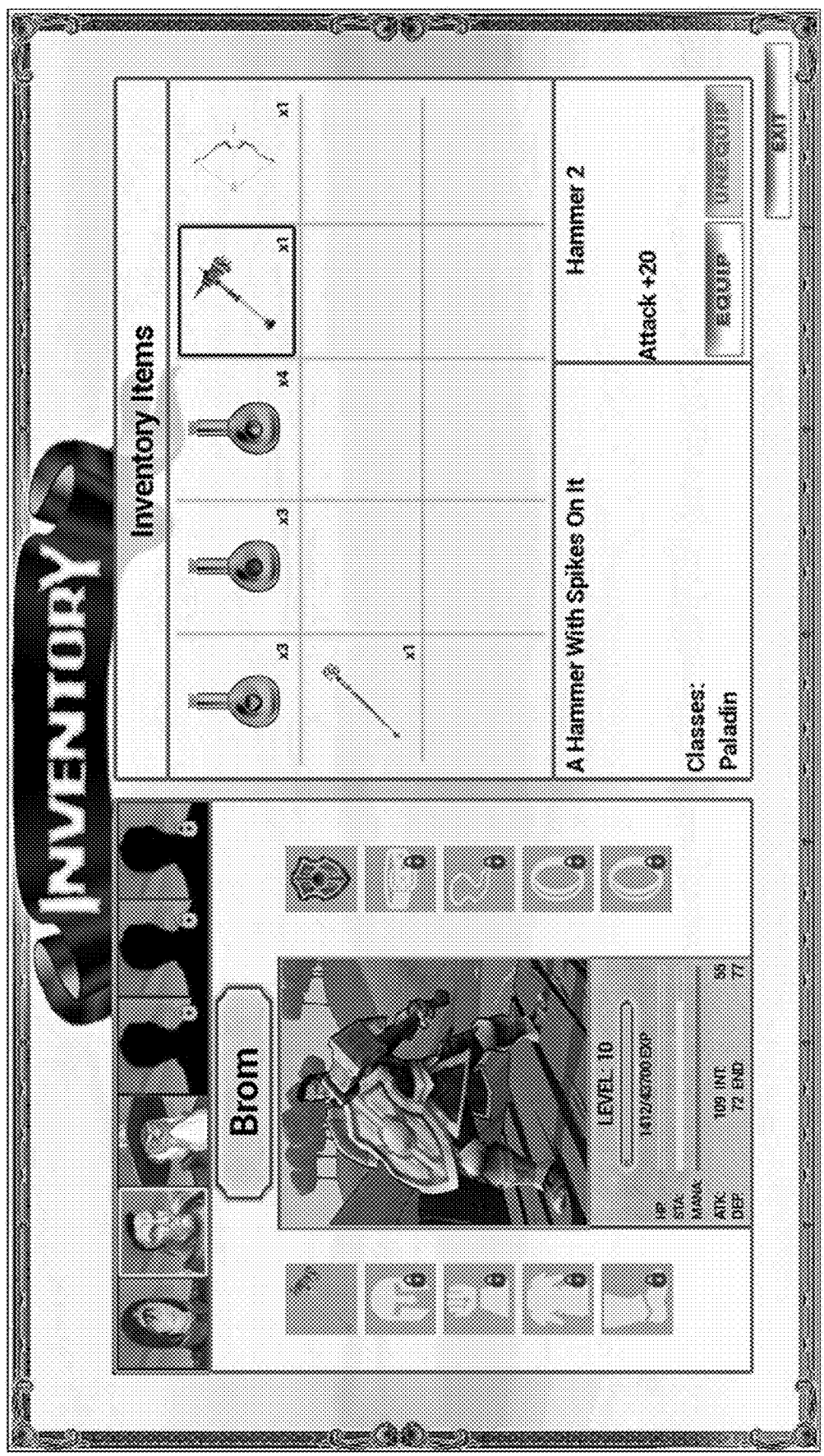

In at least some embodiments, a player may choose from a list of attacks, special moves, magic spells, scrolls, and/or other game related elements that may aid in quests, battles, etc. For example, as illustrated in the example embodiment of FIG. 34, when a player interacts with one or more of the main buttons (e.g., Items Button 3447) within the Action Panel, one or more additional GUI portion(s) (e.g., 3460) may be displayed which may be configured or designed to present a menu or list of all (or selected ones) of the game elements available to the player, based on the button selection(s) pressed. Examples of additional GUI menu(s) which may be accessed via player interaction with the Action Panel buttons may include, but are not limited to, one or more of the following (or combinations thereof):

Player Character Inventory GUIs (such as, for example, that illustrated in FIG. 36). In at least one embodiment, a Player Character Inventory GUI may be configured or designed to enable players to customize/upgrade characters with items which the Player Character currently has in its possession. The Player Character's inventory of currently possessed items may be acquired or collected via game play questing activities, and/or acquired by via purchasing item(s) via a Store GUI.

Figure 37:
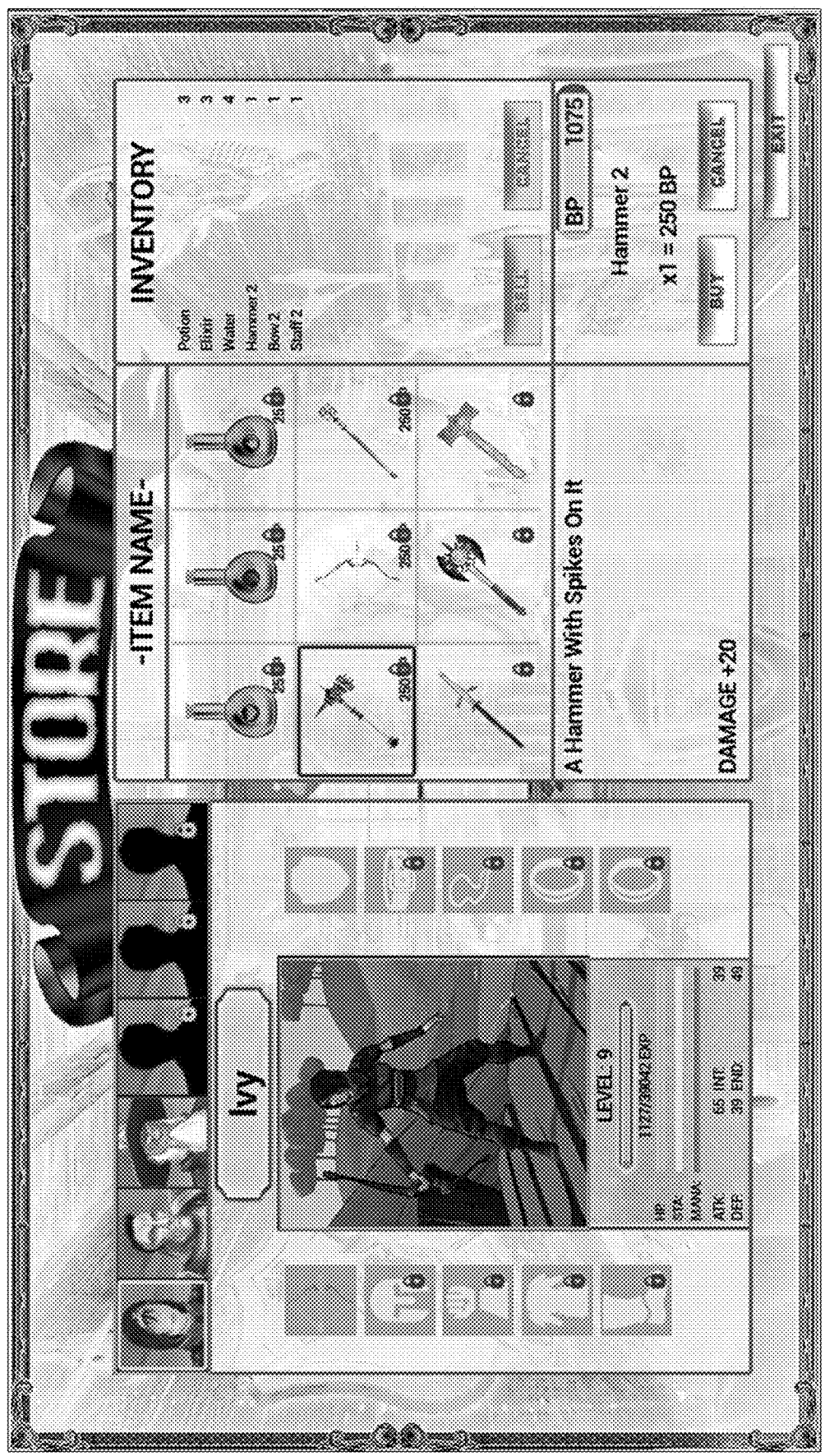

Game Store GUIs (such as, for example, that illustrated in FIG. 37). In at least one embodiment, a Game Store GUI may be configured or designed to enable players to buy or purchase items using points collected during gameplay. Purchasable items may include, for example, upgraded weapons, spells, potions, armor, and the like. In some embodiments, store items may not be purchased using credits and/or real money.

Figure 20:
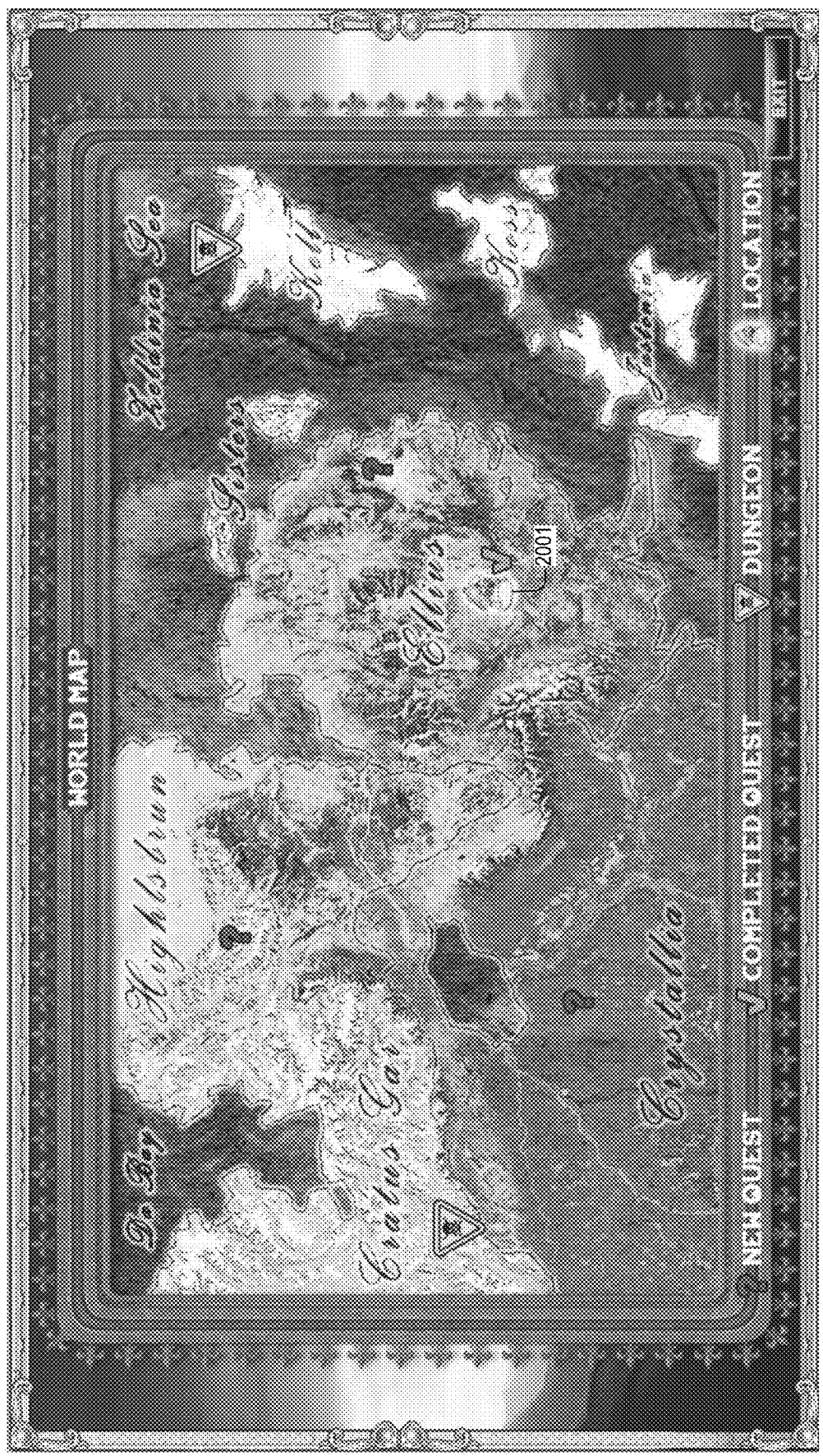

Game World Map GUIs (such as, for example, that illustrated in FIG. 20). In at least one embodiment, a Game World Map GUI may be configured or designed to enable players to: determine where they are in the game world; select & mark locations for travel direction; fast travel (i.e. from town to town without actually providing input to make the game characters literally walk to the specified destination); locate new quests; show completed quests; etc.

Quest Log/Journal GUIs and/or Game Objective GUIs—According to different embodiments, one or more Quest Log/Journal GUIs and/or Game Objective GUIs may be accessed via player interaction, for example, by clicking/touching/interacting with symbols displayed at one or more GUIs such as, for example: Game World Map GUIs, Game Store GUIs, Player Character Inventory GUIs, etc. For example, in one embodiment, when a player clicks on a quest marker icon/object displayed in a Game World Map GUI, additional information may be displayed relating to the selected quest marker icon/object.

Additional GUIs may also be displayed upon the occurrence of other game play event(s)/condition(s). For example, when a battle is completed, a "Battle Tally" GUI (e.g., as shown in FIG. 35) may be automatically and/or dynamically displayed to the player to inform the player of battle summary information such as, for example, what type of experience points were gained, items found, etc.

Returning to the example embodiment of FIG. 27, a HUD 2750 may be displayed which enables player(s) to observe multiple graphical elements and/or display panels configured within the main view on the game screen. As illustrated in the example embodiment of FIG. 27, the HUD has been configured or designed to display various types game-related information such as, for example: character health points (HP), character stamina points (STA), character magic points (MP), etc.

In the example embodiment of FIG. 27, it is assumed that the current player's character 2702 has been configured to have an associated wager multiplier attribute of 30× the wager denomination (e.g., $0.01). Accordingly, in this particular example, when a wager-based triggering event is detected during play of the hybrid arcade/wager-based game (e.g., such as, for example, when the player deals damage and/or destroys an NPC or damage and/or destroys another player's character), the gaming controller may respond by automatically placing and initiating (on behalf of the player) a $0.30 wager at the wager-based slot game 2720.

Figure 28:

FIG. 28 shows a screenshot of an alternate example embodiment of a RNG Hybrid Arcade/Wager-Based Game GUI 2800 which may be used for facilitating game play and wagering activities relating to one or more of the RNG hybrid arcade/wager-based gaming aspects disclosed herein. In the specific example embodiment of FIG. 28, display portion 2851 displays an RNG-based slot game interface 2860 offering multiple lines of wager. According to different embodiments, one or more of the multiple lines of wager may be selected and associated with one or more specified:

wager amount(s),
player weapon(s)/character(s),
wager-based triggering event(s),
etc.

For example, as illustrated in the example embodiment of FIG. 28, the player's character may be configured to correspond to a 3-line (or 3×) wager, where the amount of each line of wager is $0.50. Accordingly, in this particular example, when a wager-based triggering event is detected during play of the hybrid arcade/wager-based game, the gaming controller may respond by automatically placing and initiating (on behalf of the player) a multi-line wager at the wager-based slot game 2860, playing 3 lines and wagering $0.50 per line, for a total wager of $1.50.

Example Embodiment of RPG Hybrid Arcade/Wager-Based Gameplay

By way of illustration, the following example embodiment is intended to help illustrate at least some of the various features of the RPG hybrid arcade/wager-based game described herein. In this example, it is assumed that a patron selects various characters (e.g., different skills/abilities/races) to battle/destroy the enemy threat while advancing through a quest-like scenario. In a Role Playing Game, players may choose from different themed skills, such as, for example, fire, water, earth, wind & electrical elements which may be a basis for "spells" or "scrolls" or "enchantments" in which the player would use against NPC's. For example, a mage or cleric character may cast a fireball spell which would cause fire damage to an NPC. Also, in the same respect, a warrior or berserker character may have fire enchantments on their weapons that may inflict additional fire damage when striking NPC's.

In at least one embodiment, a player may acquire "skill points, battle points and/or experience points" from defeating NPC's which the player may then "spend" on their character to increase abilities and/or learn new skills. For example, a warrior character has just defeated a large boss-like NPC, upon doing so, the player is awarded (3) "points" which may be used by the player (e.g., if desired) to upgrade his/her character's abilities/game play characteristics, such as, for example:

a health, stamina or mana potion costs 1 point;
a fancy sword costs 2 points;
a fire imbued weapon rune costs 1 point;
a fire imbued armor rune costs 2 points;
a 10% health increase costs 3 points;
a heavy plate armor set costs 5 points;
etc.

The player may also choose to not spend points at the current time in order to save and gather more points for higher ranked (e.g., more costly) abilities and/or items.

According to different embodiments, the functionality of RPG hybrid arcade/wager-based gameplay movement may be based on a liner and or non-linear designs. Linear game design (such as, for example, "Half-Life"), allows limited "free range" of character movement (e.g., controlled via HID, XBOX controller). The level design and gameplay configuration may be configured or designed to eventually lead the player in a desired or predetermined direction or to a desired/predetermined location in the game. In contrast, in non-linear game designs, more commonly referred to as "open world" (e.g., such as, for example, "Grand Theft Auto V"), a player may be allowed to "roam" in any desired direction, as one would do in everyday life (e.g., where character movement is controlled via HID input, XBOX controller, etc.). Despite the vastly different player mobility modes of the various RPG hybrid arcade/wager-based game embodiments, at least a portion of their respective gameplay aspects/components may operate or function in substantially similar ways (e.g., destroy targets, find treasure, initiate wager-based gaming events based on arcade-style portion of game play, etc.).

In at least some embodiments of hybrid arcade/wager-based games, a player may choose from an assortment of characters, each of which may exhibit different abilities, fighting styles, race, gender, and some or all of which may have attributes and/or skills that may be "enhanced" while playing the game. To enhance ones character, a player (or player's character) may be granted experience points, skill points battle points, etc. Such character enhancements may be awarded/granted based on outcomes of events which occur during play of the arcade-style portion of the hybrid arcade/wager-based game such as, for example, standard wins, bonuses, win combinations, completion or achievement of tasks/goals, etc. For example, a player's completion of a battle may cause points to be tallied and added to the player characters stats. According to different embodiments, a player's (or player character's) associated skills may include a variety of different skill attributes, which for example may include, but are not limited to, one or more of the following (or combinations thereof):

damage;
defense;
power;
magic;
mana;
endurance;
health;
strength;
dexterity;
agility;
intelligence;
weapons;
spells;
and/or other types of player skill attributes associated with RPG games.

According to different embodiments, one or more of the player's associated skill attributes may be dynamically and individually adjustable (e.g., increased/decreased) based on various criteria such as, for example: event outcomes, objects collected, and/or other gameplay activities which may occur during play of the arcade-style portion of the hybrid arcade/wager-based game. However, in at least some embodiments, enhancing a character's skills/abilities may not affect the odds of winning a wager-based game event, particularly where the wager-based game event is based off of an RNG and results are predetermined. In this way, the player is incentivized to work towards building his/her character to become a powerful force to be reckoned with. An additional benefit in providing functionality for enabling a player to increase his/her gameplay skill attributes relates to the ability to periodically add visually appealing effects and designs that may be built upon throughout an extended period of gameplay.

In some embodiments, a leveling aspect may be utilized to denote a player's relative skill position in the virtual game world, which may be used to determine that character's likelihood of defeating enemies, which also may be "leveled." For example, in at least one embodiment, "leveling" may involve allowing a player to "spend" points on one or more character skill attributes (e.g., strength, dexterity, intelligence, etc.), to allow the player's character skill attribute to advance to a new level (e.g., leveling from 9 to 10), which, for example, may be based on acquiring required amounts of experience per each level gain (e.g., "You currently have 960 experience points "xp". You need a total of 1000 experience points to reach the next level;"). In at least some embodiments, the enemies and/or NPC's level of skill attribute(s) is configured to be similar to that of the player's character so as to promote fairness in battle, and to facilitate increased excitement during gameplay. For example, in one embodiment, assuming a player character's skill set may be at level 1 at the initial start of gameplay, most NPC's skill set(s) are also configured to be at level 1. By the time the player's skill has reached level 50, some or all NPC's skill(s) are also at level 50. In at least some embodiments, the player character may level, and the NPC's may level too.

Figure 26:
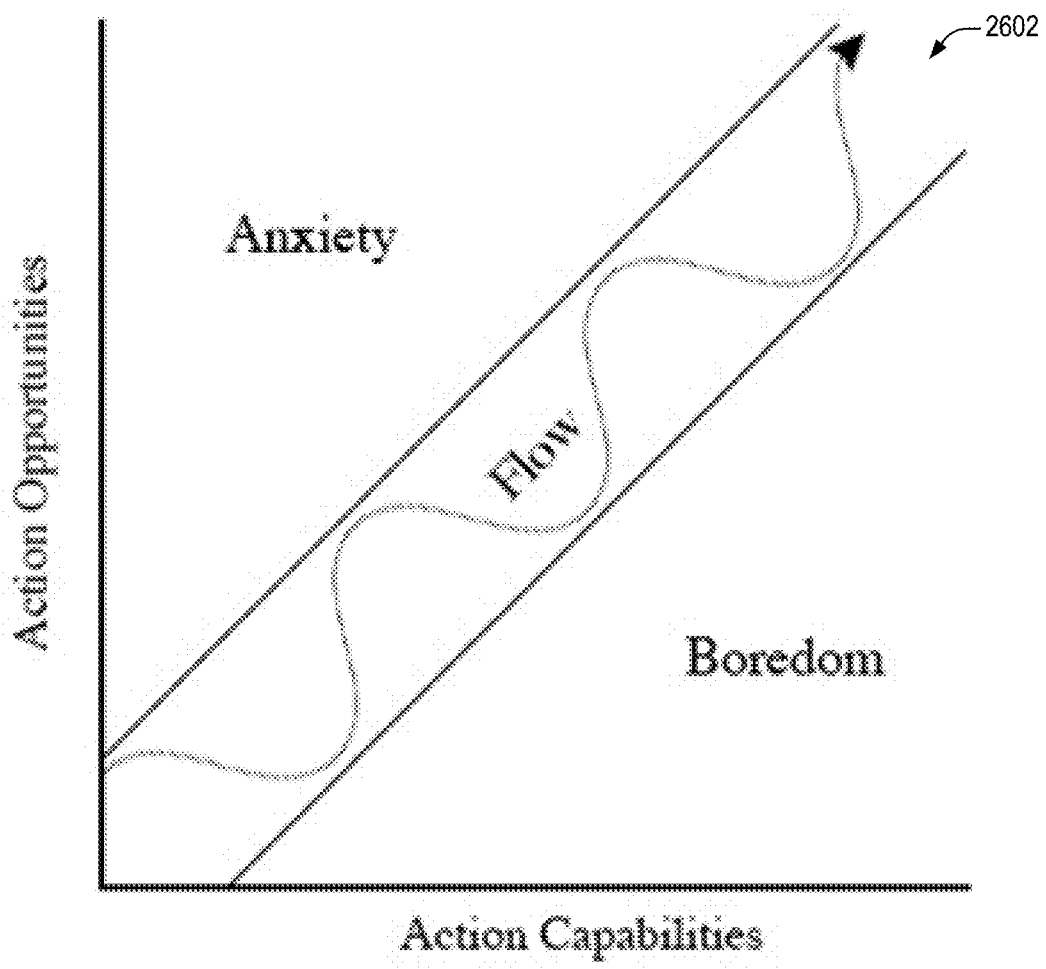
FIG. 26 shows a graph illustrating factors which may be taken into account for maximizing entertainment/enjoyment of hybrid arcade/wager-based games.

Additionally, in at least some embodiments, the layout of the gameplay and obstacles within may be configured or designed in such a way to create a "zone of happiness" in which the player increases their abilities, the NPC's they may face may be correctly suited to battle accordingly. A graphical illustration of this concept is shown, for example, in FIG. 26 shows a graph illustrating factors which may be taken into account for maximizing entertainment/enjoyment of hybrid arcade/wager-based games. As illustrated in the example graph of FIG. 26, the y-axis represents action opportunities in the hybrid arcade/wager-based game, and the x-axis represents action capabilities. A player may experience anxiety when playing the hybrid arcade/wager-based game, for example, in situations where there are relatively many action opportunities, but only relatively few action capabilities. Alternatively, a player may experience boredom when playing of the hybrid arcade/wager-based game, for example, in situations where there are relatively many action capabilities, but only relatively few action opportunities. A player's "zone of happiness" may occur during play of the hybrid arcade/wager-based game when there game play conditions present a relatively balanced mix of action opportunities and action capabilities, as illustrated in the "Flow" portion 2602 of FIG. 26.

In at least some embodiments, the hybrid arcade/wager-based game may be configured or designed to provide a constant increase of "character power and graphic effects" to both sides of the playing fields, thereby allowing for a continuously increasing range and variety of events, effects and moves that may satisfy the player, and imparting a sense of accomplishment for staying engaged in one particular game over an extended period of time.

In some RPG HAWG embodiments, various aspects relating to in-game characters and their respective gameplay battle abilities may include "timers" and/or "cool-downs" and/or "costs" for actions, such as, for example, attack moves. For example, while in battle, actions may have varying times in which they may be used. For illustrative purposes, imagine a knight character which has three attack moves: 1-Light, 2-Medium, and 3-Heavy. Each of these moves may have the potential to cause damage, however the amount of damage may increase going from Light to Heavy. With said increase of damage, to be fair in gameplay, the Heavy attack would have the longest timer of the three attacks. By doing so, the player may need to strategize their attacks in order to be the most efficient/effective in battle. Not only does a timer control attack use, but draining certain attributes by using said attacks may even further control attack usage.

For example, let's take the Heavy attack, and let's also say that when a player uses this attack, it costs 75% of the player's current total stamina points (see, e.g., STA portion of HUD 2750, FIG. 27) to use. In this particular example, it is assumed that the player's knight character currently has 100 stamina. Using the Heavy attack would cost 75 stamina—leaving the knight with 25 stamina left. Alternatively, a Medium attack would cost 50 stamina. Accordingly, if the player chooses to use the Heavy attack, that player won't be able to use the Medium attack on their next turn. Alternatively, if the player chooses to use the Medium attack, that player may be able to use another Medium attack on their next turn, but that would leave the knight with zero stamina, which may have other game-related consequences. Alternatively, since the Light attack only costs 25 stamina, the player's knight could use the light attack on a first turn, which may leave the knight "exhausted" because some or all of his stamina has been used. In some embodiments, stamina/health/mana character attributes may be regenerated during gameplay such as, for example, via potions, scrolls, turn-based regen (e.g., which may simply be skipping that characters turn to attack), magic wielding characters, time, and/or other possibilities (e.g., which may be to forfeit an attack for that turn).

In some embodiments, upon completing a battle (e.g., in which the player is victorious) experience points, battle points, and/or skill points may be tallied, and automated mechanisms may be provided to prevent a constant stacking and/or "farming" of points based on starting and losing the same particular battle. For example, in one embodiment, one or more of the wager-based triggering events may be based on damage and/or destruction of an NPC (e.g., Non Player Character), and points are tallied based on individual attacks. In such an embodiment, it may be possible for a player to: initiate a first battle, make a few attacks (e.g., without destroying the NPC) while getting points for those attacks, let the NPC destroy them, restart the same battle again, repeat the steps above until their points are "farmed" enough where they could get a plethora of potions, abilities, items, etc., some or all of which may be based off of the very first battle. Point farming to this particular extent may be considered undesirable, and automated mechanisms may be provided in the hybrid arcade/wager-based game to prevent players from taking advantage of leveling/farming related loopholes. One such mechanism is to tally each player's earned points/awards only after completing a battle, which encourages players to finish the battle in order to receive points/awards achieved during the battle. In some embodiments, once a player is engaged in a battle, the gameplay may be time based. For example, in at least one embodiment, if the player chooses to not interact with the game, the NPC's may continue to cycle and attack the player character until the player character and/or characters are destroyed. In some embodiments, the "cost of failure" may be having to restart the battle that was just lost. In this way, the "idle" game state of an hybrid arcade/wager-based game may be configured or designed to impart a visual sense of urgency (to the player(s)) to destroy the enemy threat.

Example RPG Hybrid Arcade/Wager-Based Game Walk-through

For purposes of illustration, an example walk-through of a specific embodiment of an RPG hybrid arcade/wager-based game will now be described by way of example with reference to the FIGS. 14-16, 18 and 27-28.

COIN IN—(e.g., 1402, FIG. 14; 1806, FIG. 18) Player inserts monetary value (e.g., cash, credit card, credit voucher, casino token, etc.) into hybrid arcade/wager-based gaming device. The gaming machine establishes credit amount, displays it, and waits for a trigger to initiate wagered gameplay.

Coin I/O setup determines amount. Credits established at the hybrid arcade/wager-based gaming device and displayed (e.g., 2716, FIG. 27) via a Graphical User Interface (e.g., GUI) and/or via Heads Up Display (HUD, see, e.g., FIGS. 27 and 28).

CONFIGURE/SELECT WAGER—(e.g., 1404, FIG. 14; 1808, FIG. 18) Player provides input to select wager amount(s) via the Human Interface Devices (e.g., HIDs). For example, in one embodiment, a player may choose a wager amount by using a Human Interface Device (e.g., "XBOX" controller) which is attached to the hybrid arcade/wager-based gaming device cabinet via cables and wires which link to internal mechanisms that determine interactions of the HID. The player may access an options and or settings menu by pressing a button on the controller (e.g., commonly "select"). The player may use the controller (e.g., via analog joystick) to navigate to the different wager amounts in order to make their desired selection (e.g., similar to pressing the wager amount buttons on current technology hybrid arcade/wager-based gaming devices). To assist the player with the pointing location of the analog joystick, a reticle may be displayed on screen and follows the movements of the analog joystick, similar to a mouse and a cursor on a common computer.

Changes to wager amounts may be detected by triggers (e.g., selectable interface/buttons) and depending on which one specifically is triggered, corresponding events may happen (e.g., changing from 1 line bet to 30 lines may display graphics and or animations to notify player as a response to their actions). For example, as illustrated in the example embodiment of FIG. 28, an RNG-based slot-type game of chance interface 2860 is displayed offering multiple lines of wager (e.g., up to a preconfigured maximum number of lines), which may be selected and associated with one or more specified wager amounts (e.g., which are used for placing automated wagers in connection with one or more wager-based game events which are initiated upon the occurrence of one or more wager-based triggering events). In some embodiments, the wager amounts (e.g., lines) may be based on standard slot machine functionality while each character has a list of moves that may be chosen to perform on each wagering event Alternatively, as illustrated in the example embodiment of FIG. 27, a virtual slot-type game of chance interface 2720 is displayed and configured/designed to offer a 1 line setup using different "Races/Guilds/Factions" as bet multipliers. The player may use the gaming device button panel to select or configure: a wager amount, a primary "weapon and/or attack" to use (such as, for example, an armored knight game character wielding a large two handed long sword"). As illustrated in the example embodiment of FIG. 27, the wagering denomination is $0.01 (e.g., 2714), and the selected game character/weapon (e.g., bow & arrow) is configured to correspond to a 30× wager of the wagering denomination (2712a), which is equivalent to a $0.30 wager per damage and/or destruction (e.g., of each NPC).

Example Walkthrough of RPG Arcade-Style Game Play Portion

PLAY—By way of illustration, this example walkthrough embodiment assumes the player has selected a character corresponding to a maximum wager amount, which in this particular example corresponds to a large armored knight using a flamberge.

Chapter 1—"The Fields of Desolation"

The scene starts by a quick cut scene giving an overview of the player's location in the world. You (i.e., "the player") find yourself outside of a recently destroyed fort, finding only a bloodstained note from a fellow knight. You are informed to head up the path and find Fort Grae, destroying any "dark monger hordes" (e.g., NPC's) you encounter along the way. You are warned that the road ahead is bleak and saturated with the blood of the fallen, and that dark forces thrive in such environments. No sooner than you close your helmet, you become surrounded by a small group of dark monger gremlins (e.g., dark monger entities "appear" from dark dusty swirls that materialize out of thin air—in areas where sanctity has been fouled, such as blood stained battlefields). The cut scene ends and gameplay begins.

In at least one embodiment, the introduction (or spawning) of a new NPC into the gaming environment represents an "NPC Spawning Event". In at least one embodiment, each spawned NPC may have associated therewith a respectively different, predetermined RNG-based outcome. For example, in some embodiments, each spawned NPC has associated therewith a respective RNG-based game of chance outcome, which has been determined before the initiation of the wager-based game event (e.g., before initiation of the RNG-based game of chance), and which has been determined before a wager-based triggering event has occurred for that particular NPC. In the present example, a respective NPC Spawning Event occurs for each of the dark monger gremlins which appear.

In at least one embodiment, each NPC Spawning Event may initiate, trigger or cause the gaming machine to perform or execute a plurality of operations for determining a respective RNG-based game of chance outcome to be associated with each spawned dark monger gremlin (NPC). For example, as illustrated in the example RPG HAWG procedure of FIG. 18, the plurality of operations may include, but are not limited to, one or more of the following (or combinations thereof):

Detecting an NPC Spawning Event associated with a spawned NPC.

Identifying the spawned NPC.

Causing the RNG to generate (1816) a predetermined RNG-based outcome for the identified, spawned NPC.

Associating the predetermined RNG-based outcome with a specific wager-based triggering event (e.g., destruction of the NPC) associated with the identified NPC.

Encrypting and saving the predetermined RNG-based outcome associated with the identified NPC.

For example, in at least one embodiment, when an NPC Spawning Event occurs in association with a specific NPC, the gaming device may respond by making a call to a Random Number Generator (RNG) (e.g., 1816, FIG. 18) in order to obtain a predetermined outcome of a future wager-based gaming event associated with the specific NPC. In some embodiments, the call to the Random Number Generator (RNG) may be made before the occurrence of a wager-based triggering event in order to predetermine an outcome of the future wager-based gaming event.

Returning to the description of RPG arcade-style game play, a dark monger gremlin approaches and does a small claw swipe attack to the knight. The knight's armor deflects most of the damage. It's time for you to interact—you may choose to attack the dark monger gremlin that just attacked, or you may choose to attack one of the other (e.g., other 6) gremlins. Upon choosing a target, there may be different styles of attacks to choose from. Once an attack is chosen, an attack animation may play showing the knight performing the chosen attack (e.g., making a mighty overhead chop with the flamberge). In some embodiments, the possibility may exist wherein the attack lends to a (e.g., predetermined) bonus and/or wild outcome that may display a different type of animation for the knight character (e.g., a free spin bonus granting 6 free spins), such as, for example, showing the knight spin 360 with flamberge outstretched dealing damage and destroying some or all (e.g., 6) gremlins.

In the present example, it is assumed that the knight damages one of the dark monger gremlins in the attack, and further assumed that the damage of the gremlin qualifies as an occurrence of a wager-based triggering event. In at least one embodiment, as illustrated in the example procedural embodiment of FIG. 18, when a wager-based triggering event is detected (1818) in association with an identified NPC (e.g., the damaged gremlin), the gaming device may be configured or designed to respond by automatically initiating and/or performing one or more operations, including, for example:

- Retrieving (1820) the predetermined RNG-based outcome for the identified NPC (associated with the wager-based triggering event).
- Using the predetermined RNG-based outcome to dynamically determine or calculate the wager-based gaming event symbols to be displayed in connection with the wager-based game event.
- Automatically initiating a wager-based game event (e.g., virtual slot reel spin) in connection with detected wager-based triggering event. In the present example, a maximum permitted wager amount may be placed on the outcome of a virtual slot reel spin, and the virtual slot reel spin initiated.
- Causing anticipation animation to be displayed at the gaming device display (e.g., spinning reels, NPC damage animations, etc.).
- Determining, using the predetermined RNG-based outcome, the final arrangement of symbols to be displayed in connection with the wager-based game event outcome (e.g., which is to be initiated in response to the detection of the wager-based triggering event associated with the identified NPC).
- Displaying (1822) the final arrangement of symbols (e.g., display final position of symbols of virtual slot reel spin) to convey the outcome of wager-based game event in accordance with the predetermined RNG-based outcome associated with the identified NPC. (e.g., based on outcome of the wager-based game of chance).
- Calculate and display updated information relating to payout/credits/distributions using the predetermined RNG-based outcome of the wager-based game of chance. Update player's credits based on payout from virtual slot reel spin.

In at least one embodiment, if the outcome of the wager-based game of chance is a win or payout, "loot piles" (e.g., 2705, FIG. 27), among other graphical representations, may be displayed adjacent to the damaged NPC. Player may also be notified of any free spins, bonus rounds and like scenario's that may accompany hybrid wager based gaming by graphic displays which may include sounds and animations.

In at least one embodiment, while one or more wager-based game event(s) is/are taking place, the player concurrently continues to engage in the RPG arcade-style gameplay portion. As your knight treks further down the path, you become startled by roars and a rumbling noise coming from the tree line off to the right. Ready for battle, CRACK, SNAP, a tree has been knocked over into the pathway. It was done so by a small group (3) of dark monger brukes (e.g., carnivorous oversized angry warthog/rhino-like creatures which are similar in behavior to prehistoric creatures known as Brontotherium/Embolotherium/Estemmenosuchus). The mighty knight has been surrounded by the brukes and is (e.g., still) ready for battle.

In the present example, the introduction of the bruke NPCs qualify as NPC Spawning Events (e.g., 1814), which causes the gaming machine to perform or execute a plurality of operations for generating (e.g., 1816) a respective, predetermined wager-based game event outcome to be associated with each spawned bruke (NPC). In at least one embodiment, these operations are transparent to the player, and may be performed without interrupting or interfering with the player's gameplay experience.

One of the brukes makes a charge attack on the knight knocking the player to the ground (e.g., some health was lost due to the force and size of the bruke) as the knight gets back due to his feet, it becomes his turn. With a mighty slice, one of the brukes hits the ground (e.g., destroyed). This event qualifies as a wager-based triggering event, and in response, a separate thread or instance of procedural operations 1818-1822 may be initiated to cause another wager-based game event to take place in connection with the destruction of the bruke. Any winnings or payouts based on this wager-based game event outcome may be automatically displayed, if applicable. While this wager-based game event is occurring, the player continues to engage in the RPG arcade-style gameplay portion, without interruption.

The next bruke moves in for an attack, with a miss. The knight gets to swing his money maker; another bruke down; another wager-based triggering event detected; and another wager-based game event initiated. A third bruke attacks with a powerful horn jab. It hurts the knight, but not as much as the knight is about to hurt the bruke. With another mighty slash, the third (e.g., final) bruke goes down, triggering another wager-based game event to be initiated.

The knight travels onward, cautiously, he is passing through a small cemetery, upon doing so his presence awakens a group of skeleton warriors. The introduction of the skeleton warrior NPCs qualify as NPC Spawning Events (e.g., 1814), which causes the gaming machine to perform or execute a plurality of operations for generating (e.g., 1816) a respective, predetermined wager-based game event outcome to be associated with each spawned skeleton warrior (NPC).

As the fearless knight battles the skeleton hoard, the player's total value of credits declines (e.g., due to repeated losses in recent wager-based game events) until the player's value of total credits drops below the max bet value. Upon detecting such an event (e.g., 1824, FIG. 18), the gaming device may automatically respond by notifying the player that the max bet character/weapon is not currently available, and by providing an opportunity for the player to change/re-configure the wagering parameters (e.g., 1825, FIG. 18), for example, by altering the weapon type used. By way of illustration, in the present example, the total wager amount may be dynamically changed by the player selecting a new weapon which has a lower associated bet multiplier value (e.g., from 30× (or 30 lines) to 10× (or 10 lines)). For example, the player may reduce the total wager amount by dynamically changing the knight's weapon to a one handed long sword and a shield. In some embodiments, during the wagering parameter reconfiguration, gaming device display may show the player's character in an idle pose. Additionally, in at least some embodiments, during the process of changing or reconfiguring the wagering parameters, the gaming device display may cycle through the various weapon skins/styles which may be available for selection by the player.

After the reconfiguration of the wagering parameters has been successfully completed, the player may resume play of the RPG hybrid arcade/wager-based game. In the present example, the player's knight now sports a long sword and shield for battling the remaining skeleton warrior hoard (and possibly accruing any applicable wins, bonuses, and/or wild scenarios).

In at least some embodiments, the RPG hybrid arcade/wager-based game may be configured or designed to provide opportunities in which the player is awarded specific "points" (e.g., mentioned previously) to upgrade their character stats. For example, by way of illustration, upon the destruction of the last skeleton warrior, graphics and/or animations may be displayed to the player indicating that the player may have not only won credits (e.g., if applicable), but has also "picked up" n "points."

One or more GUIs may be displayed to the player which are configured or designed to enable the player to view items, skills, and abilities that may be "purchased" with experience points, battle points, skill points, etc. In some embodiments, one or more GUIs may also be configured or designed to display character figures surrounded by areas into which selected objects (e.g., pendants, rings, runes, etc. from the players inventory (see, e.g., FIG. 36) or purchased from a virtual "store" (see, e.g., FIG. 37) may be dropped (e.g., based upon appropriate input from the player). For example, the player may choose to use these items to upgrade his or her armor, etc.

In at least some embodiments, the hybrid arcade/wager-based game may be configured or designed to offer the ability for a player to exchange earned points for other types of artifacts such as, for example: scrolls, gems, crystals, pendants and/or other artifacts that possess special abilities/attributes. For example, adding runes (e.g., or artifacts) may display exciting animations and graphics to the scene and gameplay, which also may increase damage and possibly add extra damage (e.g., fire damage, ice damage, etc.) and/or aid in defense (e.g., runes and/or skill increases may carry over to other weapons, spells, etc. so as to allow the player to keep their current character setup without having to "rebuild" each weapon/skill In some embodiments, runes/artifacts may be changed/swapped whenever the player desires and/or during permitted gameplay locations. In some embodiments, a brief "embellishment animation" may be automatically displayed in order to highlight any newly upgraded character abilities/skills/attributes.

In the present example, the player elects to "spend" one (1) point on a fire imbued weapon rune. The knight now has a fire imbued weapon and continues onward toward a building visible in the distance (e.g., Fort Grae). Game play advances.

As the knight approaches Fort Grae he gets cut off by a small battalion of dark mongers led by a lesser general. Don't be fooled by the "lesser general" title, they're big and nasty. They don't mind destroying their own forces to eliminate threats (e.g., blind rage attacks), and they view the knight as a threat. Before the nightmarish battle begins, the knight notices that there are fellow knights within the barricaded Fort Grae. Before the peaceful safety net sets in, the battalion sets it's bloodlust on you, the knight. The battle begins (e.g., possible boss round/bonus/similar to Zombie slot with "The Duke" as a boss and/or mini-boss scenario mentioned in a previous embodiment).

As the knight slices through the smaller cannon fodder, wager-based game events are initiated (e.g., in response to detection of various wager-based triggering events), and the player's total value of credits increases (e.g., due to repeated wins in recent wager-based game events) until the player's value of total credits exceeds the max bet value. Upon detecting such an event (e.g., 1824, FIG. 18), the gaming device may automatically respond by notifying the player that the max bet character/weapon is available, and by providing an opportunity for the player to change/re-configure the wagering parameters (e.g., 1825, FIG. 18), for example, by altering the weapon type used. In the present example, the player elects to change the knight's weapon to the flamberge weapon (which is associated with the max bet value). In doing so, the knight becomes "happy" being able to use his trusty flamberge, which is now fire imbued due to the previous purchase of the fire imbued weapon nine. The lesser general has been taking damage as the battle continues.

In some embodiments, RPG hybrid arcade/wager-based game may be configured or designed to provide opportunities such as a "backup bonus," where fellow knights (e.g., friendly NPCs within Fort Grae) may "offer free hits" on the enemy NPCs (e.g., via bow and arrow assault from the fort)" to assist with the battle. In at least one embodiment, should the player choose to accept the "backup bonus" offer, any activities performed by the friendly NPCs which causes or results in damage or destruction to the enemy NPCs may be treated by the hybrid arcade/wager-based game as if the player's knight had caused the enemy NPC damage/destruction (e.g., which may result in the automatic initiation of one or more wager-based game events on behalf of the player). Thus, for example, if one of the friendly NPCs were to shoot an arrow at an enemy NPC and destroy the enemy NPC, this activity may qualify as a wager-based triggering event, thereby triggering a wager-based game event to be initiated on behalf of the player. If the player's knight character possessed the "max bet" flamberge at the time when the enemy NPC was destroyed by the friendly NPC arrow, a max bet amount (e.g., 30-line bet of $0.01 per line) may correspond to the amount wagered on the wager-based game event triggered in response to the destruction of the enemy NPC.

Upon the dealing the final blow to the lesser general, an epic "death animation" may be shown to make the player feel accomplished (e.g., as well as displaying any applicable winnings). The doors to Fort Grae slowly open where you are greeted by tired, beaten, and relieved fellow knights. They have quest information for you, and this is just the beginning of your journey.

In at least some embodiments, one or more RPG-type hybrid arcade/wager-based games may be configured or designed to allow multiple active game characters to be controlled by a single player. This style of hybrid wager-based gameplay significantly increases the range of potential battling combinations which may be experienced by the player (e.g., based on wager attacks alone, and not counting the different types of characters and their skill sets).

In some embodiments, NPC may refer to "Non Player Character" which, for example, may include, but are not limited to, one or more of the following (or combinations thereof):

Beasts (air/land/sea)
Creatures (air/land/sea)
Cryptids (air/land/sea)
Mythicals (air/land/sea)
Monsters (air/land/sea)
Animals (air/land/sea)
Insects (air/land/sea)
Invertebrates (air/land/sea)
Mutants (air/land/sea)
Medieval (themed encapsulation)
Fantasy (themed encapsulation)
Science Fiction (themed encapsulation)
Historical (themed encapsulation)
Prehistoric (themed encapsulation)
Super Hero's
Super Villain's Ethereal Entities
Elementals
Devas
Dinosaurs
Undead
Humans
Humanoids
Robots
Cyborgs
Aliens
Yeti (Bigfoot)
Frankenstein
Werewolves
Mummies
Zombies
Vampires
Ghosts
Ghouls
Spirits
Fairies
Unicorns
Leprechauns
Ogres
Ores
Goblins
Gremlins
Golems
Trolls
Pegasus
Hydra
Phoenix
Dragons
Gods/Goddesses
Angels/Archangels
Demons
Devils
Kings
Queens
Princes
Princesses
Knights
Jesters
Wizards
Warlocks
Witches
Chimera
Worms
etc.

In some embodiments, game environmental objects may include, but are not limited to, one or more of the following (or combinations thereof):
Containers
Crates
Boxes
Chests
storage bins (closets, trunks, baskets, etc.)
bags (pouches, satchels, purses, etc.)
Lights
blocks
spheres/orbs (bubbles/etc.)
crystals
jewels
gems
rings
coins
pellets
particles
Elements (fire/water/etc.)
beams/bars (laser/light/wood/etc.)
geometric shapes
amorphous shapes
loot piles
teleportals
holograms
machines
electronics
vehicles
vessels
weapons
shrines
markers (tombstones/landmarks/etc.)
organics (plants etc.)
world/theme related devices (sci-fi/fantasy/fiction/etc.)
world/theme related components (sci-fi/fantasy/fiction/etc.)
sheets or planes (paper/force fields/fences/etc.)
structures
etc.

Sports/Motorsports RPG Embodiments

In other embodiments, the format or theme of the hybrid arcade/wager-based games may be directed to "sports" style arcade games (e.g., including motorsports), such as, for example, "NBA JAM", "Golden Tee", "San Francisco Rush", "Need for Speed", etc. Such games may feature a player character(s) and/or a player vehicle(s) and/or vessel(s), wherein the player has control over his or her character/vehicle via HID interaction (e.g., XBOX controller, steering wheel/foot-pedal combo (e.g., FIG. 25), etc.). Sports-type hybrid arcade/wager-based games (e.g., including motorsports) may be setup (e.g., built) completely different (e.g., from rail-type or RPG-type games), while still utilizing concepts, triggering mechanisms and gameplay criteria which may be common to some or all types of hybrid arcade/wager-based games.

In some embodiments, focus on the wager-based game event(s) may change depending on the structure, style, and theme of the Sports-type hybrid arcade/wager-based game. For example, in the Rail-themed and RPG-themed hybrid arcade/wager-based games, initiation of at least some of the wager-based gaming events were triggered in response to events/conditions which occurred to NPCs, such as for example, the destruction of an NPC, damage to an NPC, attack on an NPC, etc. In contrast, in sports-themed hybrid arcade/wager-based games, initiation of at least some of the wager-based gaming events may be automatically triggered in response to actions and/or activities performed by the player (or performed by the player's character).

For example, in sports-themed hybrid arcade/wager-based game embodiments involving characters (e.g., rather than vehicles/vessels), a player may control one or more characters, and based on the type of sport, specific gameplay actions or events may be configured or defined to correspond to wager-based triggering events (e.g., for triggering initiation of one or more wager-based game events). Examples of such specific gameplay actions or events may include, but are not limited to, one or more of the following (or combinations thereof):
Making a basket.
Scoring a touchdown.
Hitting a ball or other object.
Kicking a ball or other object.
Catching a ball or other object.
Kicking a goal.
Sinking a ball (e.g., birdie, bogey in golf).

Running a play.

Dodging an opponent.

Swinging something (e.g., racquet, tennis, ping pong, etc.).

Scoring one or more point(s) during gameplay.

Fouling an opponent.

Etc.

In sports-themed hybrid arcade/wager-based game embodiments involving vehicles/vessels (e.g., rather than characters), a player may control one or more "vehicles" and, based on the type of sport, specific gameplay actions or events may be configured or defined to correspond to wager-based triggering events (e.g., for triggering initiation of one or more wager-based game events). Examples of such specific gameplay actions or events may include, but are not limited to, one or more of the following (or combinations thereof):

Crossing checkpoints.

Dodging and/or evading items.

Collecting items.

Making laps.

Time based durations (e.g., drag racing, "endless-driver", oval-track).

Picking up virtual object(s).

Driving over/into a virtual object.

Crashing.

Avoiding collisions/objects.

Driving to specific regions/locations.

Passing opponent(s).

Etc.

In at least one embodiment, a "point" may be defined or interpreted as a term that references one gaining a level in score in relation to a specific game in which they are involved (e.g., as opposed to "points" that may be known in relation to EGM gameplay (e.g., leaderboard points) and/or player club card points). Depending on the specific type of sports game involved, one or more one or more specific sets of wager-based triggering events may be predefined for triggering initiation of one or more approved wager-based game events (e.g., RNG-based games of chance) which conform with regulatory/jurisdictional requirements.

Figure 29:
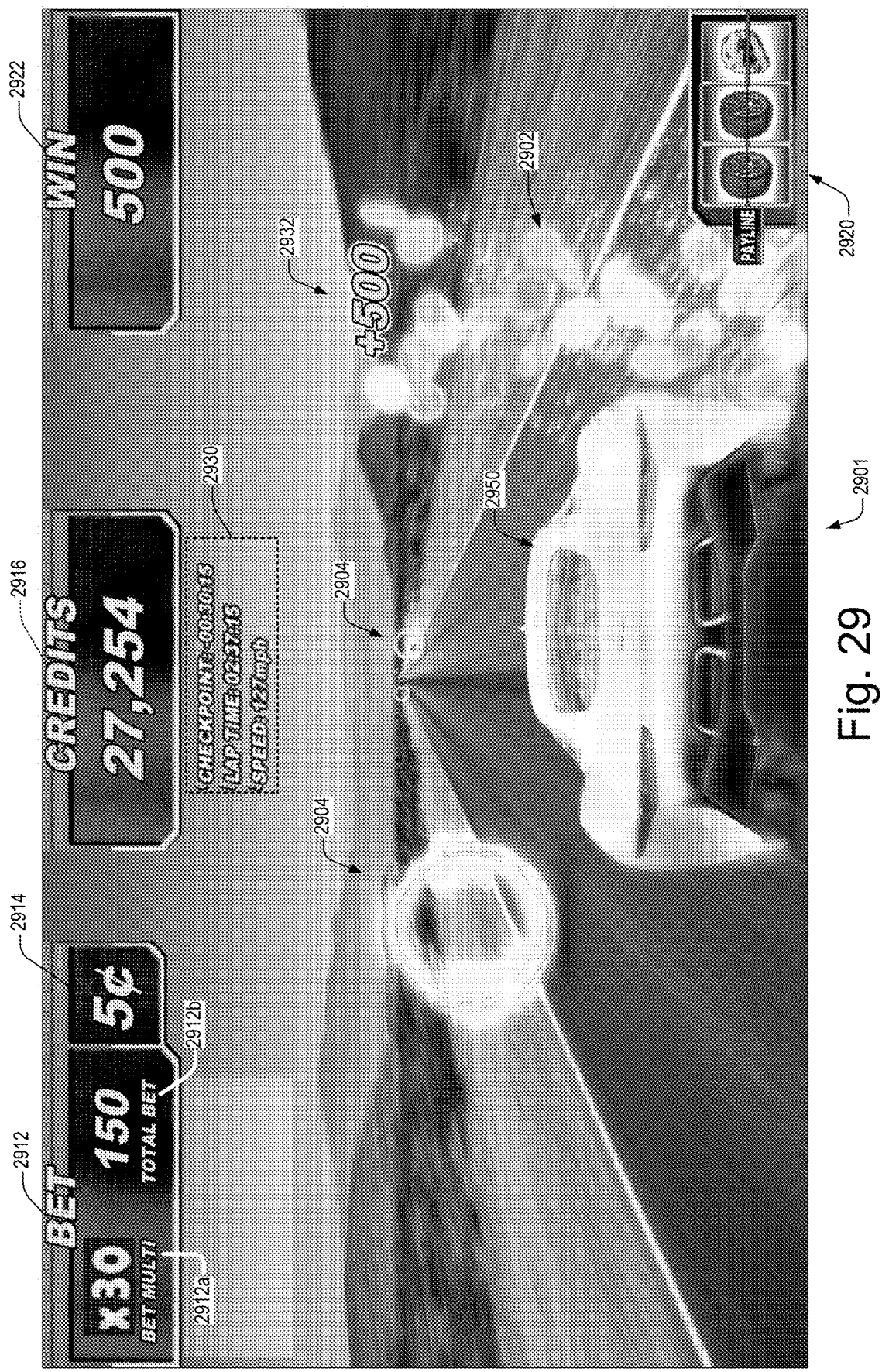

FIG. 29 shows an example screenshot GUI of a driving-type (or racing-type) hybrid arcade/wager-based game which is configured or designed to incorporate use of wager-based game of chance 2920 which, in this example embodiment, has been implemented using an RNG-based virtual slot reel game.

According to different embodiments, the driving-type hybrid arcade/wager-based game GUI 2900 which may be used for facilitating game play and wagering activities relating to one or more of the sports-type hybrid arcade/wager-based gaming aspects disclosed herein. For example, the driving-type hybrid arcade/wager-based game GUI 2900 may be configured or designed to display one or more of the following (or combinations thereof):

Player vehicle content (e.g., 2901). As illustrated in the example embodiment of FIG. 29, this may include one or more of the following (or combinations thereof): an image of the player's vehicle, an image of other player vehicles, a description of the vehicle(s), and/or other characteristics associated with the vehicle(s) such as, for example, vehicle classification, handling capabilities, speed, power, weapons, bet/wager multiplier value, etc.

Wagering content (e.g., 2912, 2914). In the specific example embodiment of FIG. 29, the displayed wagering content includes a wager value or wager denomination 2914 (e.g., $0.05) representing an amount to be automatically wagered for each wager-based event which occurs during play of the driving-type hybrid arcade/wager-based game. As illustrated in the example embodiment of FIG. 29 the displayed wagering content also includes bet/wager multiplier information 2912a (e.g., 30×), and a total bet/wager information 2912b (e.g., 150 total credits to be wagered for each wager-based game event). In at least one embodiment, the driving-type hybrid arcade/wager-based game may be configured or designed to offer the player a choice of different vehicles to operate/control, wherein each vehicle has associated therewith a respective set of performance attributes (e.g., top speed, power, handling ability, cornering ability, braking ability, etc.) and a respective bet/wager multiplier value (e.g., 1×, 5×, 10×, 30×, etc.). For example, as illustrated in the example embodiment of FIG. 29, the player's selected vehicle 2901 has an associated bet multiplier value of 30× (e.g., as indicated at 2912a).

Player credit information (e.g., 2916, 2922, 2932). In the specific example embodiment of FIG. 29, a first portion of player credit information 2922, 2932 may indicate recent credit(s) (e.g., "+500") awarded to the player (e.g., based on recent wager-based win event), and a second portion of player credit information 2916 may indicate the player's current amount of total credits (e.g., 27,254 credits).

Wager-based game of chance interface(s). In the specific example embodiment of FIG. 29, a RNG-based slot game interface 2920 is displayed offering a single line of wager.

Wager-based event outcome information (e.g., 2932, 2922). In the specific example embodiment of FIG. 29, the wager-based event outcome information 2932, 2922 shows an amount of credits awarded to the player (e.g., 500 credits), which, for example, may be based the outcome of the most recent wager-based event, as indicated by the payline symbols displayed at the virtual slot game interface 2920.

Vehicle/Gameplay status information (e.g., 2930), such as, for example:
Time of most recently passed checkpoint;
Most recent lap time;
Current speed;
And/or other types of game-play information relating to the player's vehicle activities.

Player score information. In at least one embodiment, a first portion of player score information may represent the player's current total score achieved during the driving-type hybrid arcade/wager-based game play session. In at least one embodiment, a second portion of player score information may represent the player's score or award which has been awarded to the player based on a game play event activity and/or outcome achieved during the driving-type hybrid arcade/wager-based game play session.

Scene/Background Graphics.

NPC graphics/content (e.g., display of one or more NPC vehicles).

Graphical content indicating payouts or awards (e.g., 2902).

Wager-based game event initiation object(s) (e.g., Wager Triggering object(s) 2904).

And/or other types of game-related content and/or wager-related content.

In at least one embodiment of a driving-type hybrid arcade/wager-based game, the player character may choose from an initial selection of vehicles, and additional vehicles may be unlocked as gameplay progresses. Before and/or during the driving/racing game play activities, the player may be notified to collect certain symbols during game play, such as, for example, "Wager Triggering object(s)" 2904 (FIG. 29) and/or other types of wager triggering symbols or wager initiation symbols. For example, in at least one embodiment, the Wager Triggering Ring(s) may be implemented as graphical elements comprised of bright flashing concentric rings and scintillating stars such as that illustrated at 2904, FIG. 29; and 3004, FIG. 30). In at least one embodiment, when the player's vehicle or character interacts with a Wager Triggering Ring during game play (e.g., by driving over it/through it; by causing the player's character to touch, grab, or move into it) such interaction(s) may qualify as wager-based triggering event(s), each of which may automatically initiate a separate wager-based gaming event to occur (e.g., a wagered spin of RNG-based slot game).

For example, as illustrated in the example embodiment of FIG. 29, "Wager Triggering object(s)" 2904 may be spread out and spaced within the desired distances to achieve regulatory wager initiations. Some Wager Triggering object(s) may also be manipulated, for example, to increase/decrease wagering activity (e.g., see FIGS. 17-1708).

For the player who enjoys gambling faster (e.g., in reference to the current driving example) the ability to "drive faster" may increase the frequency of wagering events since, for example, the player is able to interact with more Wager Triggering object(s) in a given time interval. However, faster speeds may lead to elevated difficulty in control. If a player "crashes", they may restart from a previous checkpoint and/or be reset at current position (e.g., current position resets may be based on bonus symbols and/or points). In at least some embodiments, there is no cost of failure.

One of the benefits of using symbols such as Wager Triggering object(s) to initiate wager-based game events, is that it provides player with the ability to selectively initiate a wager-based game event and/or to selectively cause a wager-based triggering event to occur, as desired. For example, in embodiments where a wager-based triggering event occurs when the player's character collects a Wager Triggering Ring, the player may elect to not initiate any wagers during play of the hybrid arcade/wager-based game, for example, by avoiding collection of Wager Triggering object(s). In this way, the frequency and pace of the wagering events may be directly controlled by the player during active play of the arcade-style portion of the hybrid arcade/wager-based game.

A related benefit of using symbols such as Wager Triggering object(s) to initiate wager-based game events, is that it provides the ability for each player to establish and control his/her preferred pace of gambling during play of the hybrid arcade/wager-based game. For example, by purposefully interacting with Wager Triggering object(s) relatively infrequently during gameplay, a player may maintain a relatively slow pace of gambling during play of the hybrid arcade/wager-based game. In contrast, by purposefully interacting with Wager Triggering object(s) relatively frequently during gameplay, a player may maintain a relatively fast pace of gambling during play of the hybrid arcade/wager-based game.

By way of illustration, let's say a player enjoys gambling slowly, e.g., "pressing the spin button" and waiting for the animations, enjoying the moment, having a sip of their drink, looking around the casino between spins, then spinning again in the same manner. This particular player could experience a similar "relaxed" level of gambling during play of a driving-type hybrid arcade/wager-based game, for example, by selectively choosing when to interact with a Wager Triggering Ring. For example, during gameplay, the player may control the direction of the vehicle so as to avoid interacting with one or more Wager Triggering object(s). When the player is ready to initiate another wager-based spin of the virtual slot reel, the player may choose steer the vehicle so that it interacts with the next displayed "Wager Ring," thereby initiating a wager-based gaming event (e.g., virtual slot reel spin). The player may relax/enjoy the moment, and then continue on.

In contrast, a fast paced player (who prefers faster paced gambling) may purposefully chose to drive relatively fast, and steer his/her vehicle so as to interact with each Wager Triggering object which is displayed during gameplay, thereby initiating multiple wager-based gaming events (e.g., virtual slot reel spins) within a given time interval in order to maintain a relatively fast pace of gambling during play of the hybrid arcade/wager-based game.

In at least one embodiment, the slow paced player and fast paced player could each be playing the same driving-type hybrid arcade/wager-based game at two different, adjacent gaming machines, and have completely different gameplay experiences. Yet both players may be enjoying themselves equally as much due to the flexibility of design of the hybrid arcade/wager-based game configuration and the ability for each player to establish and control his/her preferred pace of gambling during play of the hybrid arcade/wager-based game.

According to different embodiments, each Wager Triggering object introduced into the gaming environment may have associated therewith a respectively different, predetermined RNG-based outcome. For example, in at least one embodiment, when an identified Wager Triggering object is initially introduced (e.g., and displayed) in the gaming environment, the gaming device may respond by making a call to a Random Number Generator (RNG) in order to obtain a predetermined outcome of a future wager-based gaming event which will be initiated in response to the player's vehicle/character interacting with the identified Wager Triggering object. In some embodiments, the predetermined RNG-based game of chance outcome associated with a given Wager Triggering object is generated/determined before the initiation of the corresponding RNG-based game of chance, and is generated/determined before the player's vehicle/character has interacted with the identified Wager Triggering object.

At least some hybrid arcade/wager-based game embodiments may be configured or designed to provide the ability to selectively toggle certain HUD elements, timers, checkpoints, and the like. Additionally, at least some hybrid arcade/wager-based game embodiments may be configured or designed to provide capability of supporting multiplayer events and/or tournaments (e.g., in which timer-based events occur). For example, a casino property may have a promotion setup where groups of people/teams may be "racing" to get the most "spins" within a specific timeframe. In doing so, timers, points, and other various details may be displayed to the patron(s).

In other sports-type hybrid arcade/wager-based game embodiments, similar mechanisms may be implemented for enabling a player to selectively control the pace of wager-based game events. For example, in sports-type hybrid arcade/wager-based game embodiments involving characters (e.g., basketball-themed games, football-themed games, soccer-themed games, baseball-themed games, hockey-themed games, etc.) Wager Triggering object(s) and/or other symbols for triggering wager-based game events may be distributed at various locations of the virtual game play field/arena/court of the hybrid arcade/wager-based game. A player may selectively choose to navigate his/her character, during gameplay, to interact with one or more Wager Triggering object(s) (to thereby trigger initiation of one or more wager-based game event) and/or to avoid interacting with one or more Wager Triggering object(s) (to thereby prevent initiation of one or more wager-based game events). One example of such an embodiment is illustrated in FIG. 30.

Figure 30:
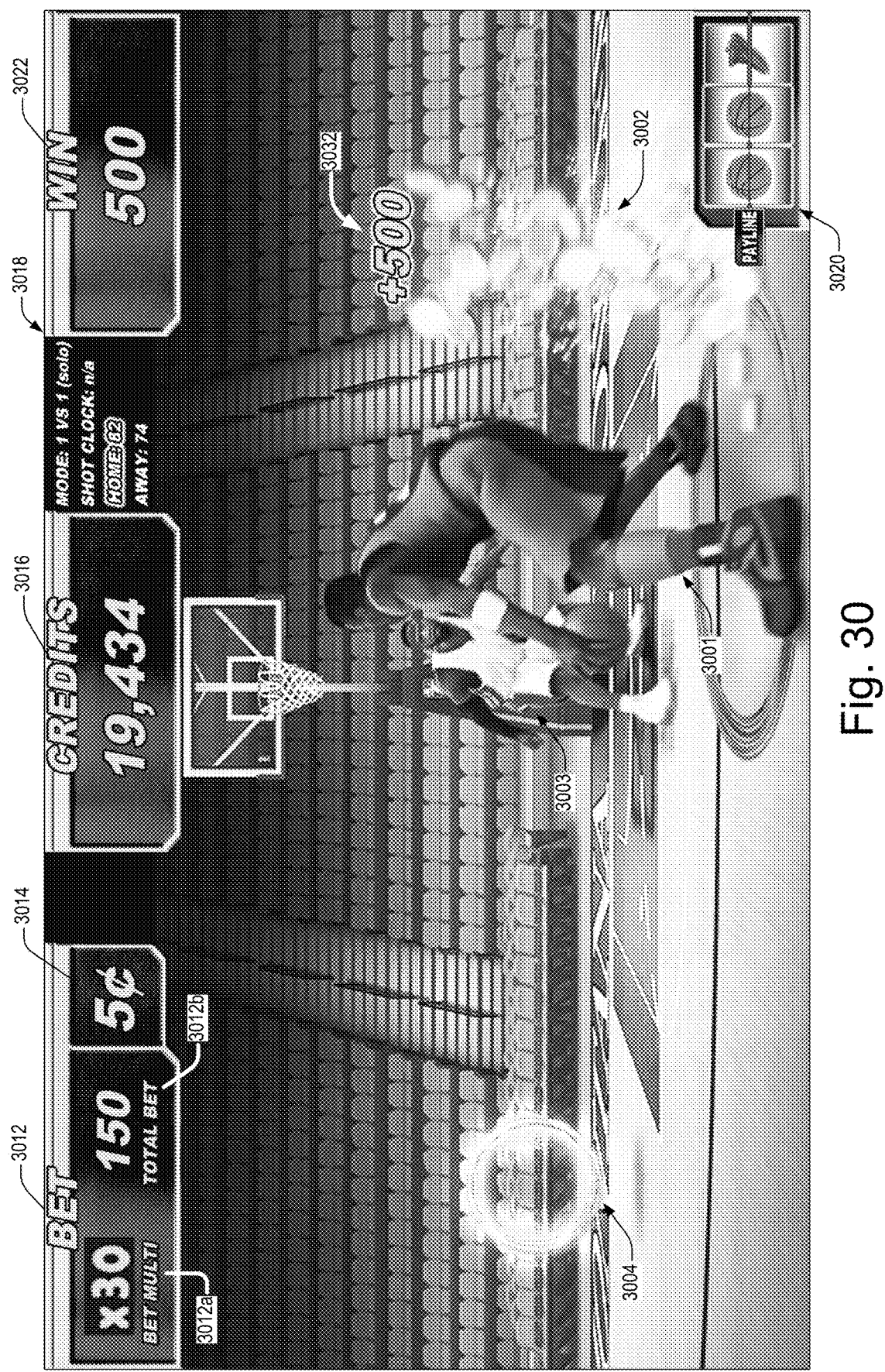
Figure 31:
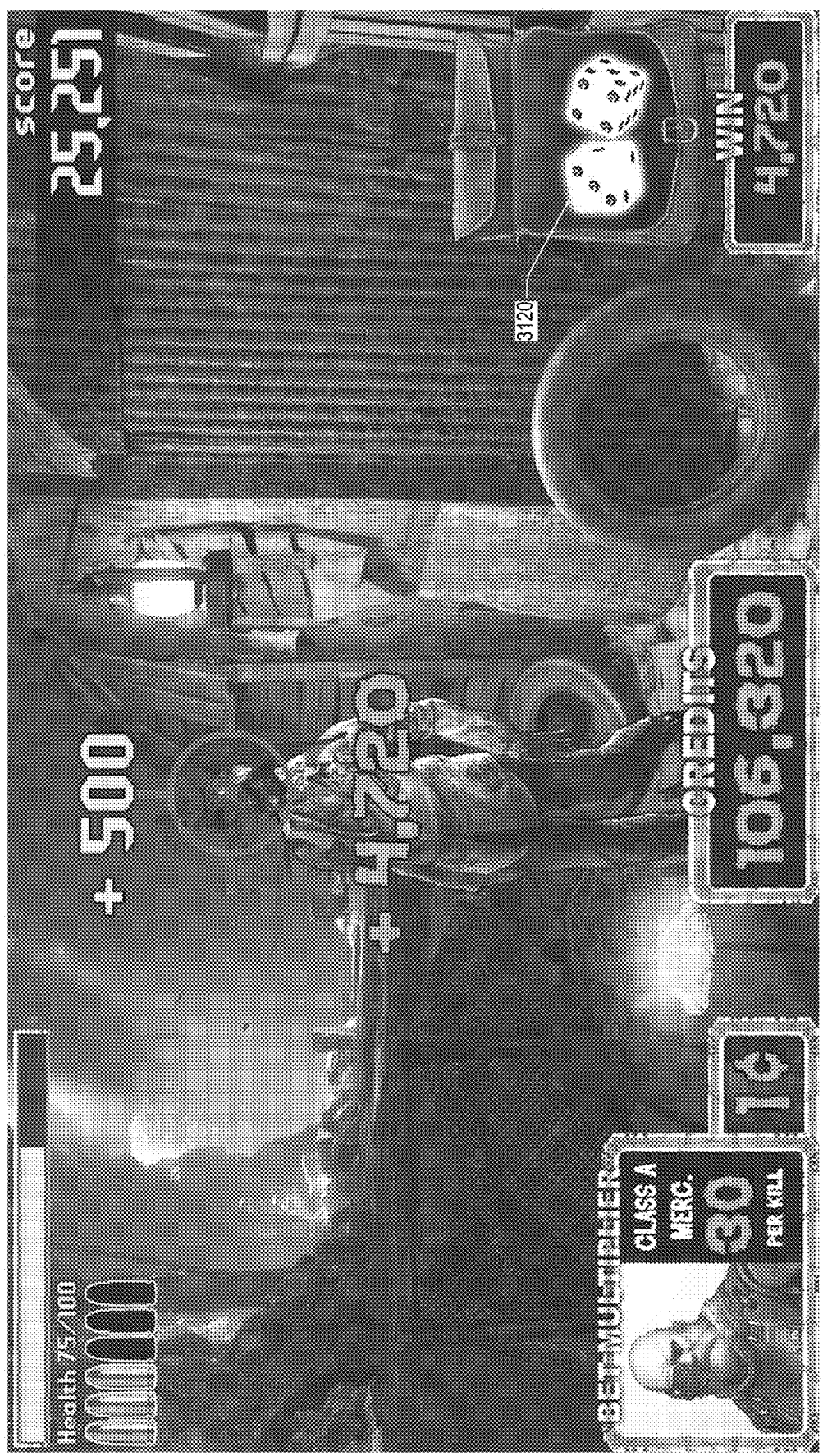
Figure 32:
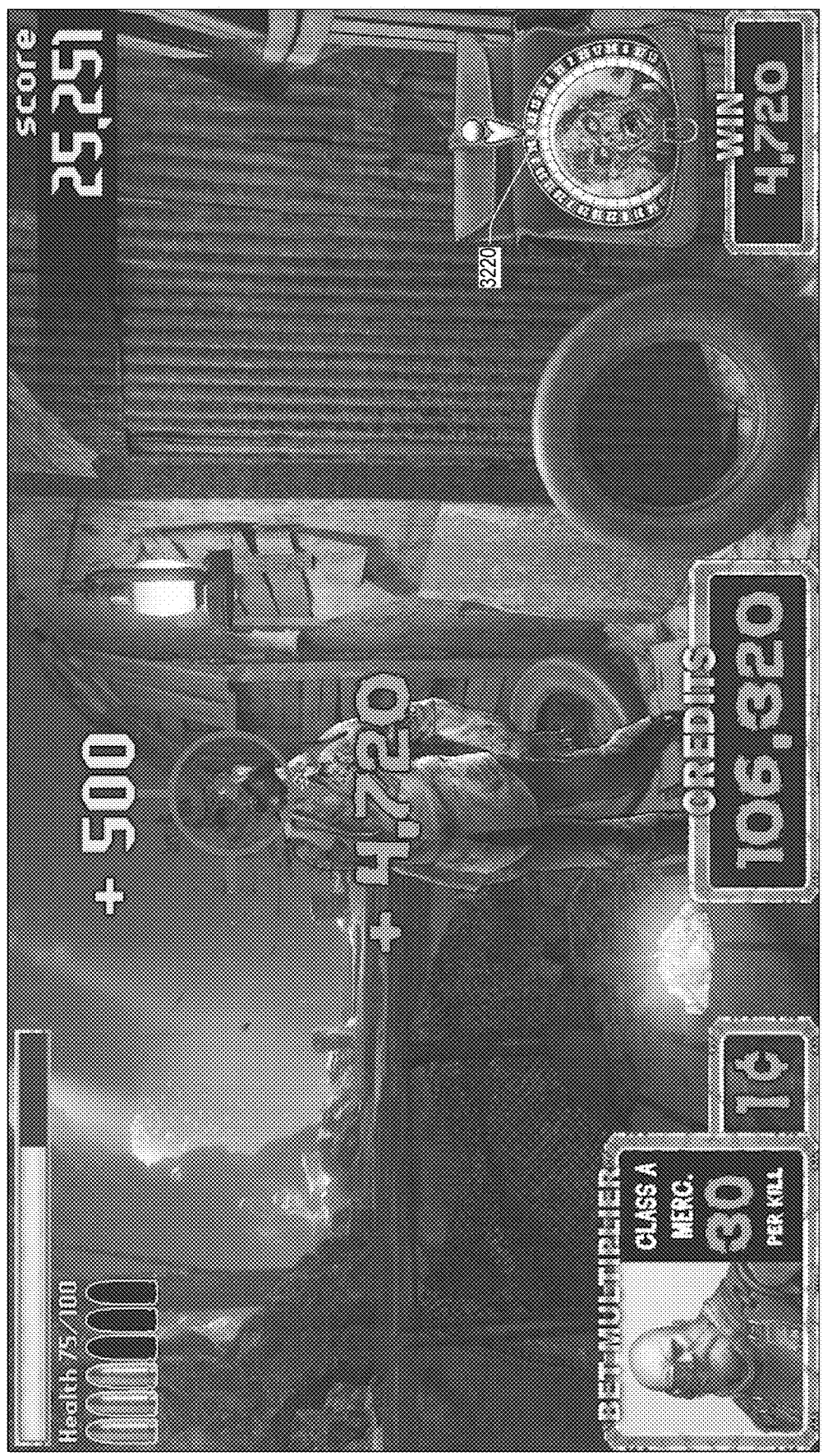
Figure 33:
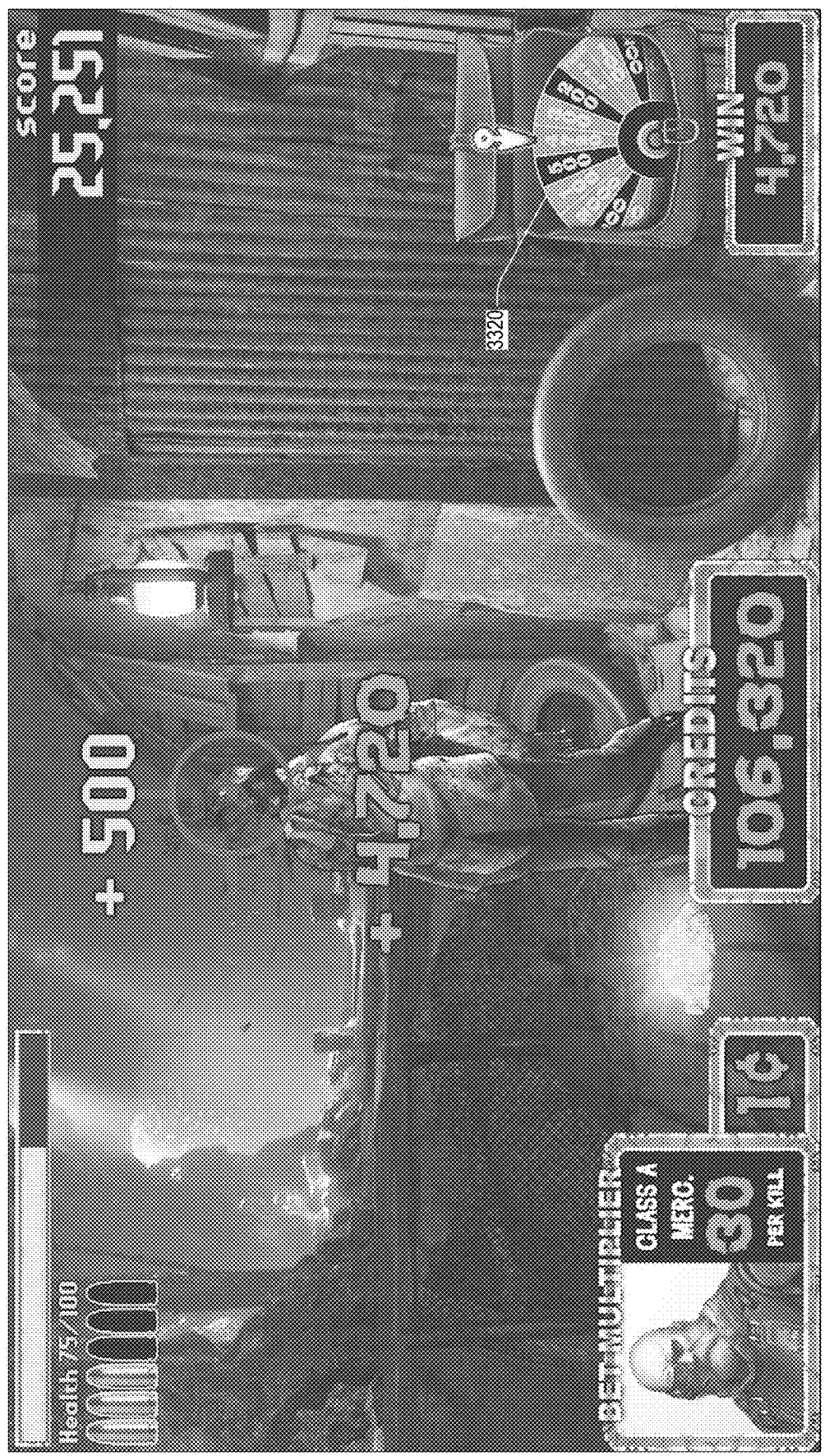
Figure 34:

FIG. 30 shows an example screenshot GUI of a basketball-type hybrid arcade/wager-based game which is configured or designed to incorporate use of wager-based game of chance 3020 which, in this example embodiment, has been implemented using an RNG-based virtual slot reel game.

According to different embodiments, the basketball-themed, sports-type hybrid arcade/wager-based game GUI 3000 which may be used for facilitating game play and wagering activities relating to one or more of the sports-type hybrid arcade/wager-based gaming aspects disclosed herein. For example, the basketball-themed, sports-type hybrid arcade/wager-based game GUI 3000 may be configured or designed to display one or more of the following (or combinations thereof):

Player character content (e.g., 3001). As illustrated in the example embodiment of FIG. 30, this may include one or more of the following (or combinations thereof): an image of the player's character, an image of other player characters, a description of the character(s), and/or other characteristics associated with the character(s) such as, for example, character classification, sports-related skills, height, speed, power, experience, bet/wager multiplier value, etc.

Wagering content (e.g., 3012, 3014). In the specific example embodiment of FIG. 30, the displayed wagering content includes a wager value or wager denomination 3014 (e.g., $0.05) representing an amount to be automatically wagered for each wager-based event which occurs during play of the basketball-themed, sports-type hybrid arcade/wager-based game. As illustrated in the example embodiment of FIG. 30 the displayed wagering content also includes bet/wager multiplier information 3012a (e.g., 30×), and a total bet/wager information 3012b (e.g., 150 total credits to be wagered for each wager-based game event). In at least one embodiment, the basketball-themed, sports-type hybrid arcade/wager-based game may be configured or designed to offer the player a choice of different characters (e.g., virtual basketball players) to control, wherein each character has associated therewith a respective set of skills/attributes (e.g., height, weight, speed, jumping ability, shooting ability, dribbling ability, etc.) and a respective bet/wager multiplier value (e.g., 1×, 5×, 10×, 30×, etc.). For example, as illustrated in the example embodiment of FIG. 30, the player's selected character 3001 has an associated bet multiplier value of 30× (e.g., as indicated at 3012a).

Player credit information (e.g., 3016, 3022, 3032). In the specific example embodiment of FIG. 30, a first portion of player credit information 3022, 3032 may indicate recent credit(s) (e.g., "+500") awarded to the player (e.g., based on recent wager-based win event), and a second portion of player credit information 3016 may indicate the player's current amount of total credits (e.g., 19,434 credits).

Wager-based game of chance interface(s). In the specific example embodiment of FIG. 30, a RNG-based slot game interface 3020 is displayed offering a single line of wager.

Wager-based event outcome information (e.g., 3032, 3022). In the specific example embodiment of FIG. 30, the wager-based event outcome information 3032, 3022 shows an amount of credits awarded to the player (e.g., 500 credits), which, for example, may be based on the outcome of the most recent wager-based event, as indicated by the payline symbols displayed at the virtual slot game interface 3020.

Character/Gameplay status information (e.g., 3018), such as, for example:
Game Mode (e.g., 1 VS 1)
Timer Information (e.g., Shot Clock)
Scores relating to sports game being played (e.g., Home: 82/Away: 74).
Status information relating to penalties, fouls, etc.
Player health status information.
Team roster information.
Character statistics information.
Game-related timing information such as, for example, shot-clock time, total game time remaining, total game time elapsed, current period, etc.
Other types of sports game related status information commonly displayed in connection with real-world sporting events.
And/or other types of game-play information relating to the player's character activities.

Player score information. In at least one embodiment, a first portion of player score information may represent the player's current total score achieved during the basketball-themed, sports-type hybrid arcade/wager-based game play session. In at least one embodiment, a second portion of player score information may represent the player's score or award which has been awarded to the player based on a game play event activity and/or outcome achieved during the basketball-themed, sports-type hybrid arcade/wager-based game play session.

Scene/Background Graphics.
NPC graphics/content (e.g., display of one or more NPC characters 3003).
Graphical content indicating payouts or awards (e.g., 3002).
Wager-based game event initiation object(s) (e.g., Wager Triggering object(s) 3004).
And/or other types of game-related content and/or wager-related content.

In at least some embodiments (such as, for example, sport-type hybrid arcade/wager-based game embodiments), Wager Triggering object(s) may "spawn" in view of the player. Depending on which way the player's camera is facing, the Wager Triggering object(s) may spawn (or respawn) in the portion of gaming environment which is visible to the player. For example, in a basketball-themed sports-type hybrid arcade/wager-based game, different Wager Triggering object(s) may be continuously spawned and/or re-spawned at various locations within the displayed gaming environment. In some embodiments, the position(s)/location(s) of at least some of the displayed Wager Triggering object(s) may be statically determined without regard to game play activities (e.g., a respective Wager Triggering Ring is always spawned or re-spawned under each basket). In some embodiments, the /position(s)/location(s) of at least some of the displayed Wager Triggering object(s) may be dynamically determined based on game play activities. For example, in one embodiment, a Wager Triggering Ring may be caused to spawn near the backboard in response to game play activities presenting an opportunity for a player's character to go for a rebound off the backboard.

Some Wager Triggering object(s) may be located at respectively fixed positions/locations in the gaming environment. Other Wager Triggering object(s) may dynamically change their position(s)/location(s) during game play. For example, in one embodiment, one or more Wager Triggering object(s) may be linked or attached to the basketball's location. When the basketball is moved in the gaming environment, the associated Wager Triggering object(s) moves with it.

In some embodiments, some of the Wager Triggering objects may move along a path (e.g., vertical, horizontal, abstract, etc.). For example, a Wager Triggering object that spawns around the opponent's ball may move along with the movement of the opponent's character. In some embodiments, some of the displayed Wager Triggering objects may jiggle or spin (along with specific accompanied graphics/animations etc.) while remaining at a relatively fixed position. For example, Wager Triggering object(s) that populate the court and/or net areas may jiggle or spin while remaining at relatively fixed positions.

In some embodiments, one or more spawned Wager Triggering object(s) may be dynamically removed from the gaming environment in response to various condition(s), event(s), and/or criteria. For example, a spawned Wager Triggering object may be automatically removed from the gaming environment after a player has interacted with the Wager Triggering object a predetermined number of times (e.g., one time, two times, three times, etc.). In some embodiments, a spawned Wager Triggering object may be automatically removed from the gaming environment after a wager-based game event has been initiated in response to player interaction with the Wager Triggering object. In some embodiments, a spawned Wager Triggering object may be automatically removed from the gaming environment after a predetermined amount of time has elapsed. In some embodiments, a spawned Wager Triggering object may be automatically removed from the gaming environment after specific event(s) and/or condition(s) have occurred during gameplay.

In multi-player games, different sets of Wager Triggering object(s) may be associated with specific player(s)/player character(s). For example, in one embodiment, a first set of spawned Wager Triggering objects may be associated with a first player of a hybrid arcade/wager-based game, and a second set of spawned Wager Triggering objects may be associated with a second player who may be concurrently participating in the hybrid arcade/wager-based game. In some embodiments, the different sets of Wager Triggering object(s) may each have respectively different visual characteristics (e.g., shape, color, etc.) to enable player to distinguish between Wager Triggering object(s) associated with the various players of the multiplayer hybrid arcade/wager-based game.

By way of illustration, in one embodiment of a basketball-themed hybrid arcade/wager-based game, the gaming device may be configured to dynamically spawn a Wager Triggering object at or near each net/hoop location, and to dynamically spawn other Wager Triggering object(s) throughout the span of the basketball court. When the player's character approaches the net to make a basket and interacts with a first Wager Triggering object, this may cause the triggering of a wager-based game event (e.g., causing initiation of a wager event, and distribution of winnings, if applicable), and may also cause the first Wager Triggering object (with which the player's character interacted) to be removed from the game play environment. In response, another (new) Wager Triggering object may spawn (or respawn) at the net location where the basket was just scored. Similarly, one or more Wager Triggering object(s) distributed at other locations of the court may automatically and/or dynamically respawn after being interacted with by one or more player character(s). However, in at least some embodiments, at least some of these Wager Triggering object(s) may respawn in new/different locations (e.g., at least some of these Wager Triggering object(s) may not respawn in the same location(s) each time).

For purposes of illustration, it is assumed that the player scores a basket, and possession of the ball is then awarded to the other team. If the player's character then performs a successful steal, or successfully blocks the opponent's shot, each of these events may trigger a respective wagering event (all of which may be clearly defined to the player via pay tables, game rules, etc.).

In some embodiments, it may be desirable control the timing and/or placement of the spawning/respawning of one or more Wager Triggering object(s). For example, in one embodiment, it may be desirable to delay respawning of a Wager Triggering object at the basketball (e.g., when the opponent has possession of the ball) until the basketball traverses approximately a half court distance. In this way, the player is incentivized to wait to steal the ball (e.g., until after the ball crosses the half-court line), thereby allowing for more time to pass between wagering events (e.g., if desired).

Depending on the sport, theme, location, game world size, etc. (as well as other aspects of design difference), the Wager Triggering object(s) may be distributed throughout the game world in various dynamic locations (e.g., similar to that of NPCs spawning events occurring throughout the Zombie HAWG game world).

In some sports themed HAWG embodiments, where the other team has the ball, during the duration of the other teams ball possession, the ball itself may have some sort of visible animation/graphic surrounding it (e.g., sparkles, stars, glowing radiance, etc.) to convey to the player that a wager-based game event may be triggered if the player steals the ball from the other team.

In some driving themed and/or racing styled HAWG embodiments, the placements and interactions with the Wager Triggering object(s) may be configured or designed to be similar to that of other sports themed hybrid arcade/wager-based games. For example, depending on the style of race game, the player may be prevented from re-visiting locations/regions where the player's character has previously interacted with one or more Wager Triggering object(s) (e.g. a linear styled race game).

In the example embodiment of FIG. 29, the Wager Triggering objects 2904 that are visible in the gaming environment GUI 2901 have already been spawned. In this example, it is assumed that the player's vehicle 2950 has just interacted with a Wager Triggering object (e.g., at region 2902 indicated by gold coins), thereby automatically initiating a wager-based spin of the virtual slot reel interface 2920. In this example, it is assumed that the outcome of the virtual slot reel spin is a payout of 500 credits to the player (e.g., as shown at 2932). A graphical representation of interaction with the Wager Triggering object (and Wager Triggering object's location and associated wager-based game event) is shown via 2902. In one embodiment, the player's vehicle may never pass through that location again. In other embodiments where the racetrack is styled after a popular NASCAR track (e.g., which is typically oval in shape), the player may have the possibility of passing through the same location again and interacting with a newly spawned (or respawned) Wager Triggering object at (or near) that location (e.g., on the next go around of the track/next lap/etc.).

Player Event Based Wager Triggering Associations

In at least some hybrid arcade/wager-based game embodiments where one or more wager-based triggering events are based on specifically defined player character game play activities, a respective, predetermined RNG-based game of chance outcome may be generated/determined before (e.g., in advance of) the occurrence of each specific player character game play activity which causes or triggers a wager event. Examples of such player character game play activities may include, but are not limited to, one or more of the following (or combinations which may include, but are not limited to, one or more of the following (or combinations thereof):

blocking a shot;
stealing a ball;
jumping in the air;
doing a flip;
firing a weapon;
casting a spell;
initiating a power punch;
jumping
ducking
scoring a goal
specific interaction(s) with objects;
specific interaction(s) with other players;
etc.;

For example, in one embodiment, a wager-based triggering event may be defined to occur whenever a player's character performs a flip during game play. In this specific example, before the player's character performs a flip during game play, the gaming device may make a call to the Random Number Generator (RNG) in order to obtain a predetermined outcome of a future wager-based gaming event which may be subsequently initiated if/when the system detects that the player's character has performed a flip during game play. Upon detecting the next occurrence of a player character flip event, a wager-based game event will be automatically initiated by the system, and the outcome of the wager-based game event will correspond to the predetermined RNG outcome. Thereafter, the gaming device may make another call to the Random Number Generator (RNG) to obtain a next predetermined outcome to be associated with a next wager-based game event which will be triggered by the player's character performing another flip during game play.

By way of illustration, a player may initiate a wager-based triggering event, such as, for example, when a player character does a "ninja flip" while jumping. In this specific example, a player character may be able to jump repeatedly. In order to properly utilize HAWG's functionality, the code of the game may implement or initiate a series of calls, checks, and/or other operations such as, for example:

Determine if a player's character did in fact jump;
Determine if, while the player's character was airborne, it performed a "ninja flip";
(Assuming player's character performed a "ninja flip") retrieve the pre-predetermined RNG outcome associated with the detected wager-based triggering event;
Display wager event outcome to the player (and calculate winnings, if applicable);
Generate and store another new pre-predetermined RNG for a next player's character "ninja flip" event;
In some embodiments, some of all of the above-described activities may occur while the player's character is still in the air (e.g., w/in a few milliseconds)

To further elaborate, let's say the player's character in the above example just landed back on the ground and the player decided to immediately do another "ninja flip" jump (e.g., immediately after touchdown). Upon the next jump, the some or all of the activities described immediately above may repeat. If the nature of gameplay were to continually jump and do flips, this process may continue until the player is satisfied with the gambling duration and/or no longer has credits to fund gameplay.

In some hybrid arcade/wager-based game embodiments, the occurrence of various types of scoring events during gameplay (e.g., scoring a field goal, scoring a basket, scoring a touchdown, scoring a run, scoring a goal, sinking ball in hole, etc.) may trigger the automatic initiation of one or more wager-based game event(s), thereby allowing players to get a "real win" feel (e.g., if winnings are applicable). In at least some such embodiments, an occurrence of such a scoring event during gameplay may be treated by the hybrid arcade/wager-based game as the occurrence of a wager-based triggering event, which, in turn, may trigger the automatic initiation of a respective wager-based game event. For example, as illustrated in the basketball-themed hybrid arcade/wager-based game GUI FIG. 30, the court may have multiple Wager Triggering object(s) 3004 distributed throughout. A player may choose to navigate his/her character (e.g., 3001) in various directions, such as, for example: (a) towards a displayed Wager Triggering Ring to thereby initiate one or more wager-based gaming events; (b) away from the displayed Wager Triggering object(s) to thereby prevent initiation any wager-based gaming events; and/or (c) directly towards the basket to score (e.g., which, in some embodiments, may also trigger initiation of a wager-based gaming event).

One perceived benefit of configuring or designing a sports-type hybrid arcade/wager-based game to initiate a wager-based game event in response to an occurrence of a game-related scoring event is that it helps to create a positive association (e.g., in the player's mind) between a game-based achievement (e.g., scoring of a basket), and the associated wager-based game event. Consequently, such a positive association may help encourage the player to have thoughts or perceptions such as, for example, "my luck may come when I score an actual basket" (e.g., the "real win" perception). This comparison to gameplay may be comparatively similar to the comparison made between the "fast" and "slow" paced gamblers—each is based on player interaction, the methods & designs thereof, and the visual and mental relationships between said elements which promote a fun and flexible environment capable of providing satisfactory results to target specific and wide-ranged demographics.

Wager Configuration/Selection

According to different embodiments, there are multiple ways in which a player's wagering preferences may be selected/configured in a given hybrid arcade/wager-based game. By way of illustration, a few simplified examples (using only characters) are described below.

A player may select from various characters (etc.), wherein each of the individual characters is configured or designed to have associated therewith a respective bet line value (e.g., 1-line, 3-lines, 5-lines, 10-lines, 30-lines etc.) and/or wager multiplier value (e.g., 1×, 3×, 8×, 10×, 25×, 30×, etc.).

A player may select from various characters (etc.), wherein each character has associated therewith a respective set of attacks, weapons, abilities, skills, etc., and wherein each set of attacks/weapons/abilities/skills/etc. has associated therewith a respective bet line value and/or wager multiplier value.

A player may select from various characters (etc.), and use a standard wager selection process for wager selection/configuration (e.g., in which the player manually selects desired wagering criteria such as, for example, base wagering amount, number of bet line(s) to be wagered, wager multiplier value(s), etc.

Etc.

FIGS. 38-42 illustrate example tables of different types of wager-related parameters which may be used for implementing wager configuration/selection in different types of hybrid arcade/wager-based games. In some embodiments, at least a portion of the various wager-related parameters illustrated in FIGS. 38-42 may be coded into hybrid arcade/wager-based game software/hardware, and utilized for defining and/or determining the different sets of pre-configured wager-related parameters which may be available for player selection in a given hybrid arcade/wager-based game.

For example, FIG. 38 shows an example of different types of wager-related parameters which may be used for implementing wager configuration/selection in an RPG-type hybrid arcade/wager-based game. In the specific example embodiment of FIG. 38, the defined wager-related parameters specify:

Wager-based game event is implemented as a virtual slot-type reel game (3 reels, 1 line), in which symbols appear in consecutive reels beginning with the far left reel 3810.

Various player selectable character(s) 3820 include: a Knight, an Archer, and a Wizard.

Each player character has associated therewith a respective set of wager-based triggering event actions 3820 (which may be initiated by the player), where each wager-based triggering event action has a corresponding bet/wager multiplier value (e.g., 1×, 2×, 3×, 5×, 10×). For example, if the player is controlling a Knight character and causes the Knight to perform a "360 slash" move, this activity will trigger an automatic wager-based spin of the virtual slot reel, where a 3× wager multiplier will be applied to the base wagering denomination. If the player is controlling an Archer character and causes the Archer to perform a "single arrow shot" move, this activity will trigger an automatic wager-based spin of the virtual slot reel, where a 1× wager multiplier will be applied to the base wagering denomination. If the player is controlling a Wizard character and causes the Wizard to initiate a "bolide shower" spell, this activity will trigger an automatic wager-based spin of the virtual slot reel, where a 10× wager multiplier will be applied to the base wagering denomination.

Figure 43:
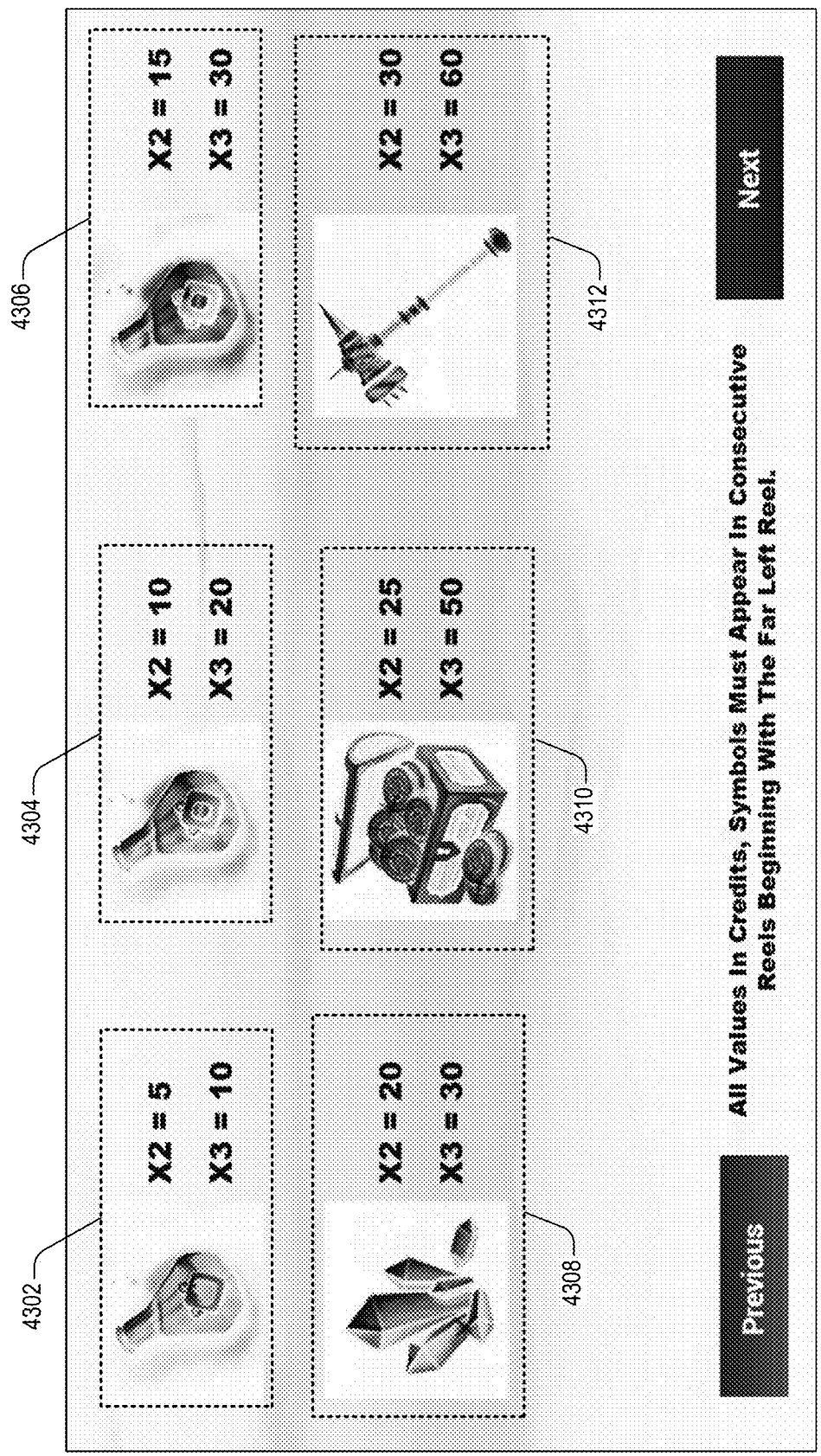
FIGS. 43-45 illustrate example screenshots of various Payout Table GUIs associated with various wager-based game event outcome(s).

Payout Table 3830 defines the various payout amount(s) (e.g., in credits) based on the outcome of the virtual slot reel spin (e.g., based on the final symbols displayed at the wager line of the virtual slot reel). A graphical representation of Payout Table 3830 is illustrated in FIG. 43.

In one embodiment, the RPG hybrid arcade/wager-based game implemented at an EGM may be configured or designed to enable a player to selectively choose from a set of characters, and the basis for wager differentiation is reflected via which move, ability, skill, spell, etc. is initiated by the player and performed by the player's character (e.g., after wager funding and/or during play at) the EGM. In some embodiments, the "max bet" or relatively highest wager multiplier value may correspond to the "strongest" moves/abilities for a given character, and the "min bet" or relatively lowest wager multiplier value may correspond to the "weakest" moves/abilities for that character.

FIG. 39 shows an example of different types of wager-related parameters which may be used for implementing wager configuration/selection in a First Person-type hybrid arcade/wager-based game. In the specific example embodiment of FIG. 39, the defined wager-related parameters specify:

Wager-based game event is implemented as a virtual slot-type reel game (3 reels, 1 line), in which symbols appear in consecutive reels beginning with the far left reel 3910.

Various player selectable character(s) 3920 including different classes of Mercenaries with different types of weapons.

Each Mercenary class/weapon has associated therewith a corresponding bet/wager multiplier value (e.g., 1×, 2×, 3×, 5×, 10×). For example, if the player is controlling a Mercenary flanker character which uses a 357 magnum weapon, and this character causes a wager-based triggering event to occur, an automatic wager-based spin of the virtual slot reel will be initiated, where a 2× wager multiplier will be applied to the base wagering denomination. If the player is controlling a Mercenary ranger character which uses an assault rifle weapon, and this character causes a wager-based triggering event to occur, an automatic wager-based spin of the virtual slot reel will be initiated, where a 5× wager multiplier will be applied to the base wagering denomination.

Figure 44:
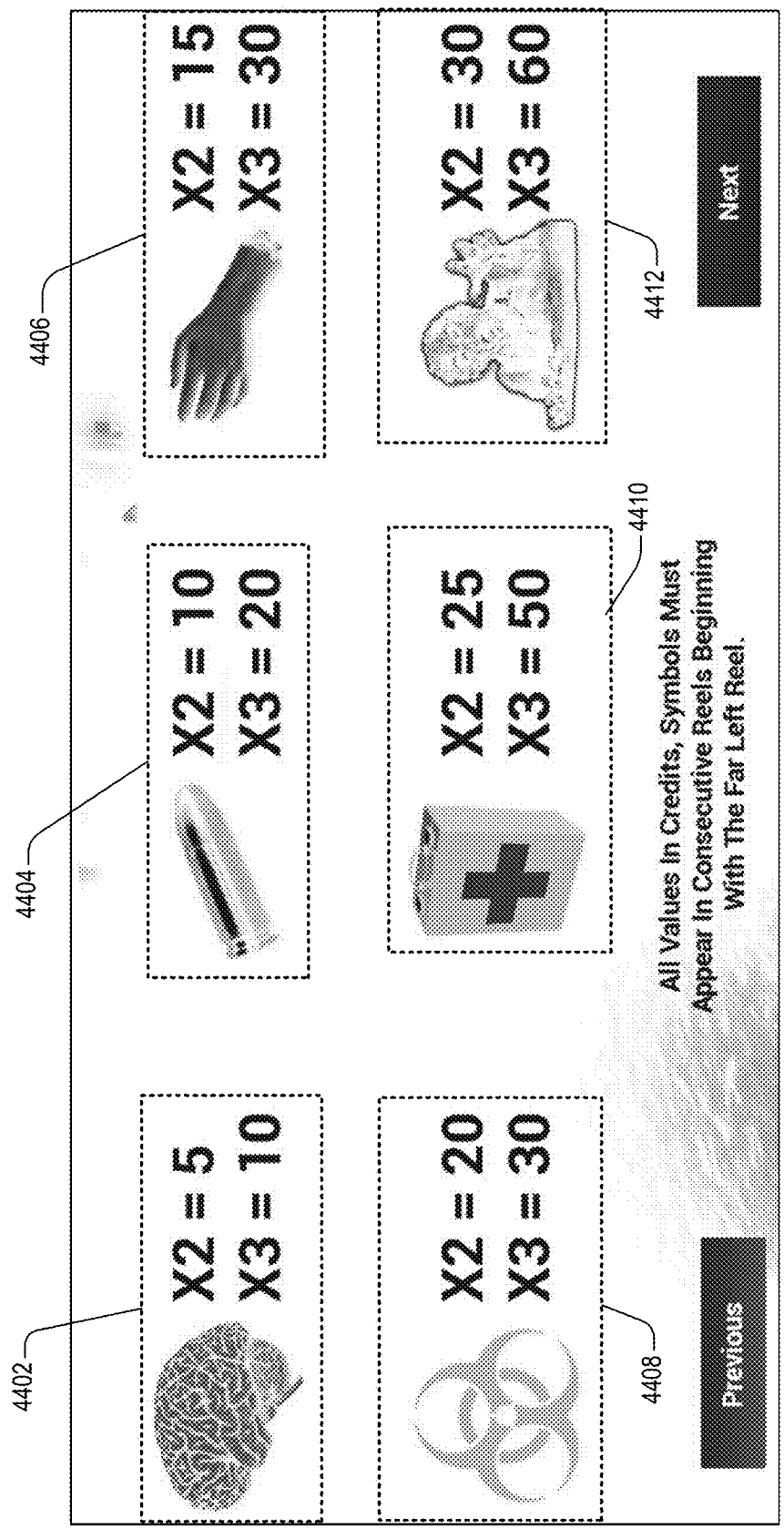
Figure 45:
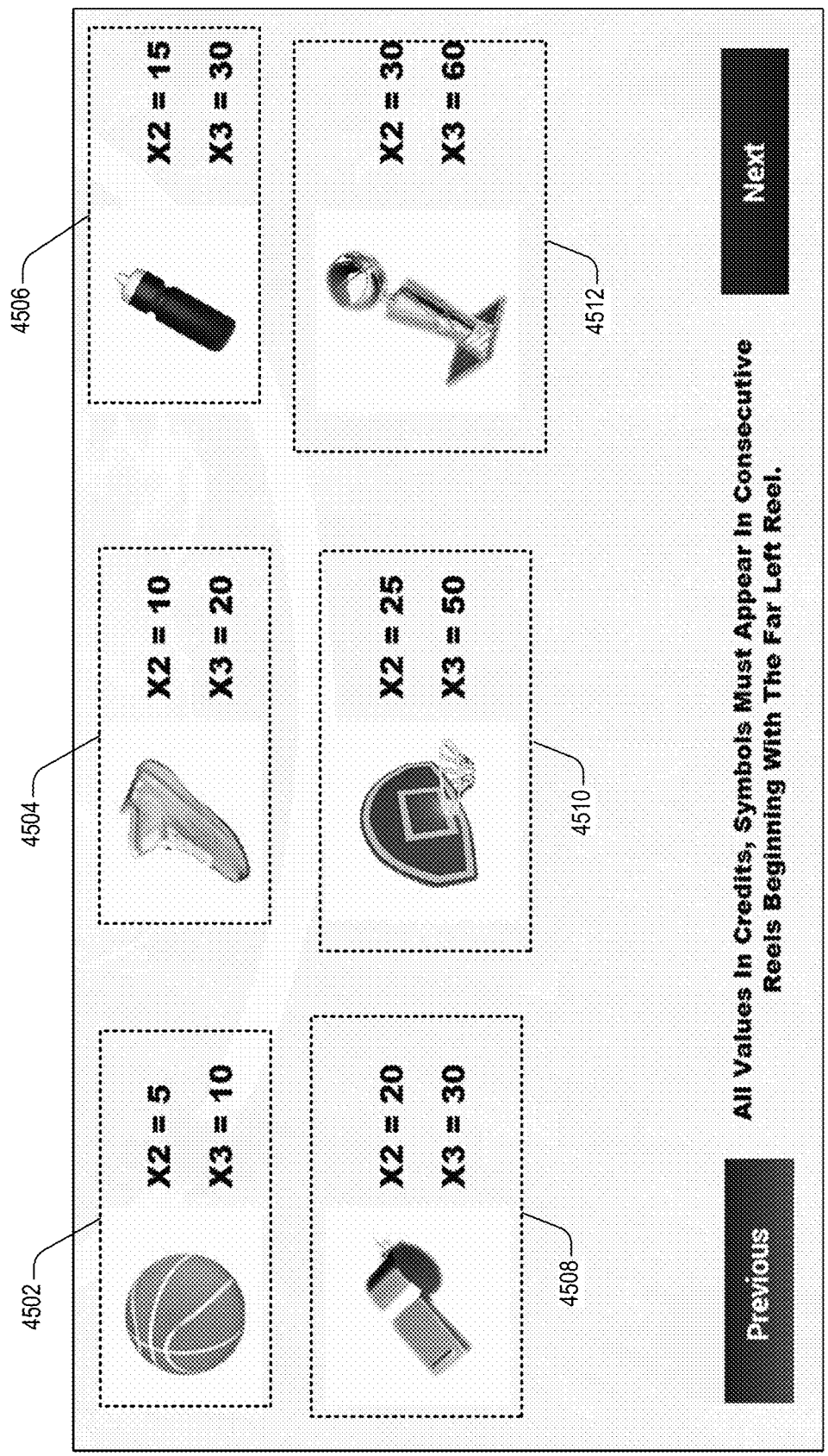

Payout Table 3930 defines the various payout amount(s) (e.g., in credits) based on the outcome of the virtual slot reel spin (e.g., based on the final symbols displayed at the wager line of the virtual slot reel). A graphical representation of Payout Table 3930 is illustrated in FIG. 44.

In one example, a First Person hybrid arcade/wager-based game may be configured or designed to enable a player to select from various characters, where each character has associated therewith a corresponding bet/wager multiplier value. For example, in the previously described Zombie HAWG example (e.g., of FIG. 11), it is assumed that the player has selected a Heavily Armored Mercenary having a corresponding 30× bet multiplier.

FIG. 40 shows a different example of wager-related parameters which may be used for implementing wager configuration/selection in a First Person-type hybrid arcade/wager-based game. In the specific example embodiment of FIG. 40, the defined wager-related parameters specify:

Wager-based game event is implemented as a virtual slot-type reel game (3 reels, 1 line), in which symbols appear in consecutive reels beginning with the far left reel 4010.

Various player selectable character(s) 4020 including different classes of Mercenaries with different types of weapons.

Each Mercenary/weapon class has associated therewith a respective set of wager-based triggering event actions 4020 (which may be initiated by the player), where each wager-based triggering event action has a corresponding bet/wager multiplier value (e.g., 1×, 2×, 3×, 5×, 10×). For example, if the player is controlling a Scout character (which uses a 9 mm pistol), and causes the Scout character to perform a "double shot" move, this activity will trigger an automatic wager-based spin of the virtual slot reel, where the amount wagered is 5× the base wagering denomination. If the player is controlling a Ranger character and causes the Ranger to perform a "ninja kick w/l shot" move, this activity will trigger an automatic wager-based spin of the virtual slot reel, where a 3× wager multiplier will be applied to base wagering denomination. If the player is controlling a Heavy Riot character and causes the Heavy Riot character to initiate a "multi-burst shot" move, this activity will trigger an automatic wager-based spin of the virtual slot reel, where a 10× wager multiplier will be applied to base wagering denomination.

Payout table 4030 defines the various payout amount(s) (e.g., in credits) based on the outcome of the virtual slot reel spin (e.g., based on the final symbols displayed at the wager line of the virtual slot reel).

FIG. 41 shows an example of different types of wager-related parameters which may be used for implementing wager configuration/selection in a Sports-type, driving-themed hybrid arcade/wager-based game. In the specific example embodiment of FIG. 41, the defined wager-related parameters specify:

Wager-based game event is implemented as a virtual slot-type reel game (3 reels, 1 line), in which symbols appear in consecutive reels beginning with the far left reel 4110.

Various player selectable vehicle(s) 4120 including different types/classes of vehicles, each of which may have respectively different driving/handling characteristics.

In this particular embodiment, the hybrid arcade/wager-based game is configured or designed to enable the player to manually select the wager multiplier (e.g., from available options of 1×, 2×, 3×, 5×, 10×). For example, in one embodiment, if the player is controlling Ford GT vehicle and has selected a 10× wager multiplier value, when the player causes the vehicle to interact with a Wager Triggering object, an automatic wager-based spin of the virtual slot reel will be initiated, where a 10× wager multiplier will be applied to the base wagering denomination.

In other embodiments (not shown), each player vehicle may have associated therewith a corresponding bet/wager multiplier value (e.g., 1×, 2×, 3×, 5×, 10×, etc.). For example, in one embodiment, a Ford GT vehicle may have a corresponding 3× wager multiplier value, and a Chevrolet Corvette GTR may have a corresponding 5× wager multiplier value. If the player is controlling Ford GT vehicle and causes the vehicle to interact with a Wager Triggering object, an automatic wager-based spin of the virtual slot reel will be initiated, where a 3× wager multiplier may be applied to the base wagering denomination. Similarly, if the player is controlling Chevrolet Corvette GTR vehicle and causes the vehicle to interact with a Wager Triggering object, an automatic wager-based spin of the virtual slot reel may be initiated, where a 5× wager multiplier will be applied to the base wagering denomination.

Payout table 4130 defines the various payout amount(s) (e.g., in credits) based on the outcome of the virtual slot reel spin (e.g., based on the final symbols displayed at the wager line of the virtual slot reel).

FIG. 42 shows an example of different types of wager-related parameters which may be used for implementing wager configuration/selection in a Sports-type, basketball-themed hybrid arcade/wager-based game. In the specific example embodiment of FIG. 42, the defined wager-related parameters specify:

Wager-based game event is implemented as a virtual slot-type reel game (3 reels, 1 line), in which symbols appear in consecutive reels beginning with the far left reel 4210.

Various types of player initiated action(s)/event(s) 4220 (e.g., performed by the player's character), each of which may correspond to a respective wager-based triggering event.

In this particular embodiment, the hybrid arcade/wager-based game is configured or designed to enable the player to manually select the wager multiplier (e.g., from available options of 1×, 2×, 3×, 5×, 10×). For example, in one embodiment, if the player has selected a 5× wager multiplier value, and causes his character to shoot the basketball and score a basket (e.g., qualifying as a "basket interaction point"), an automatic wager-based spin of the virtual slot reel may be initiated, where a 5× wager multiplier will be applied to the base wagering denomination.

In other embodiments (not shown), each player action/event may have associated therewith a corresponding bet/wager multiplier value (e.g., 1×, 2×, 3×, 5×, 10×, etc.). For example, in one embodiment, a basket interaction event may have a corresponding 3× wager multiplier value, and a ball interaction event may have a corresponding 5× wager multiplier value. If the player causes his character to score a basket (e.g., qualifying as a "basket interaction event"), an automatic wager-based spin of the virtual slot reel will be initiated, where a 3× wager multiplier will be applied to the base wagering denomination. Similarly, If the player causes his character to steal the basketball from an opponent (e.g., qualifying as a "ball interaction event"), an automatic wager-based spin of the virtual slot reel will be initiated, where a 5× wager multiplier will be applied to the base wagering denomination.

Payout table 4230 defines the various payout amount(s) (e.g., in credits) based on the outcome of the virtual slot reel spin (e.g., based on the final symbols displayed at the wager line of the virtual slot reel).

In the above examples, the wagering outcomes may be based on a series of themed slot reel symbols rather than a specific type of NPC battled (e.g. the destruction of a tiny gremlin may net the same winnings as a demon boss etc.). This may help to avoid the need of using large and possibly confusing pay tables wherein hundreds of different NPC's and/or "Wager Triggering objects" may need to be shown. Using themed reel symbols allows HAWG design to remain clean and simple to play and understand like standard slot machines.

In at least some embodiments, the number and/or type of activities which may be performed by a player's character may depend on various wager-related parameters, such as, for example, the number of lines of the virtual slot interface being wagered upon. For example, referring to the RPG HAWG example of FIG. 38 (which is designed to utilize a virtual 3 reel 1 line slot interface), each character may only have as many moves as bet multiplier selections allowed. In this simplified example, each player character may only have 5 moves/abilities each (e.g., corresponding to their respective wager multipliers 1×, 2×, 3×, 5×, 10×), and depending on which one is selected, a specific sequence of player character animation would play when initiated. In other embodiments, if we change our example to a multiple line slot interface (e.g., as illustrated in FIG. 28), depending on the amount of lines, reels, style of gameplay, and wager triggering events, the number and type of player character moves/abilities available to be selected by the player (e.g., for each RPG character) may be substantially increased. Additionally, in at least some embodiments, the number and type of player character moves/abilities available to be selected by the player (e.g., for each RPG character) may be automatically and dynamically increased/decreased depending on the number of wager lines selected by the player. For example, in one embodiment, if the player selects a 2-line slot wager option, the player's may automatically be provided with the ability to perform an additional "healing" ability (e.g., in addition to the character's other 5 available activities/abilities). Depending on the nature of the gameplay and pay table details, the player may in fact initiate a wager-based event by simply healing themselves during a round of play.

Similar techniques may be implemented for sports related hybrid arcade/wager-based games. For example, in a basketball-themed hybrid arcade/wager-based game, a player may be able to initiate a wager based event by stealing the ball from an opponent. Other factors influencing how the wager initiation is handled may include, but are not limited to, one or more of the following (or combinations thereof):
   style of activity involved (e.g., layup, slam dunk, etc.);
   total wager amount;
   wager multiplier amount;
   base wager denomination amount;
   etc.

For example, in one embodiment, a "super-dunk bonus" opportunity may be made available only if the player selects the "max bet" and other game conditions are met, such as, for example, the player's character performs a slam dunk, and a predetermined symbol appears on the bet line of the slot game interface. A player could successfully play and slam dunk all day long (getting wins if applicable), but if they are only betting minimum (or are only betting less than "max bet"), such activity may not meet the specific requirements needed to initiate additional enhanced outcomes, payouts, bonuses, awards, etc. In at least some embodiments, some or all of these gaming/wagering rules are clearly defined to the player in a manner which conforms with appropriate gaming jurisdictions and/or regulations.

In situations where player character interaction is with a net, goal, bucket, cup, etc., these regions may be configured or designed as wager triggering event (or Wager Triggering object) "spawn regions" (each spawn region generating and storing a respective, pre-determined RNG for each event which may occur at that spawn region). In some embodiments, Wager Triggering object(s) may be dynamically generated and displayed at one or more of the spawn regions. In some embodiments, visual graphics, logo's, and/or animations may be dynamically displayed at one or more of the spawn regions.

At least some embodiments of hybrid arcade/wager-based games may not require that character selection be associated with wager or line multipliers. For example, in some hybrid arcade/wager-based game embodiments, the player may be allowed to dynamically select the wager-related parameters (e.g., line/bet multiplier(s), wager denomination(s), etc.) to be applied to the wager-based game event(s). For example, a basketball-themed hybrid arcade/wager-based game may be configured or designed to enable a player to dynamically assemble his team by selecting from numerous characters of different teams. The individual team player character may have no correspondence to line/bet multipliers, etc. The player may independently select a desired wager multiplier value or multi-line value (e.g., 5 lines betting), and no matter which player character on the player's team initiates a wager based event, the outcome is based on the player's initial wager/line selection and the chance of appropriate symbols appearing accordingly.

Example Random Number Generator (RNG) Embodiment(S)

According to different embodiments, one or more different types of RNG engines may be utilized to generate random numbers, game event outcome(s), and/or wager event outcome(s). For example, in at least one embodiment, an RNG engine may be implemented using a standard Mersenne Twister algorithm.

Initializing and Seeding

Upon initialization of the RNG engine, it may generate a seed value based on values of several different parameters, such as, for example:
   Current time in milliseconds,
   Process ID of the current process,
   The address of the current time variable, and
   The last seed value used.

After generating all of the variables, they are all multiplied by the last seed value. An XOR operator is applied to the current time variable, with a variable based on the bits for the current time shifted to the right by 11. In at least one embodiment, the seed value is determined by using an XOR operator to combine all four of the variables.

Background Generation

After initialization the RNG engine may start generating numbers on a separate thread. This thread may be constantly running in the background resulting in millions of numbers being discarded per second.

Generating RNG Number(s)

When a component of the hybrid arcade/wager-based game requests a random number, it may call the GetRandomNumberRange function one or more times (e.g., depending on the number of reels). For example, for a 3 reel slot game, the GetRandomNumberRange function may be called three (3) times (e.g., 1 RNG call per reel).

In some hybrid arcade/wager-based game embodiments, one or more calls to the RNG engine may occur each time an NPC is spawned in the game. For example, if a new NPC is spawned in a hybrid arcade/wager-based game which uses a 3 reel virtual slot game to implement wager-based game events, three separate GetRandomNumberRange function calls may be made to the RNG engine to obtain 3 different random numbers, which represent a predetermined outcome of the wager-based 3-reel slot game event which will be initiated if/when the newly spawned NPC is destroyed (or damaged in some embodiments).

Similarly, in hybrid arcade/wager-based game embodiments which utilize symbols (e.g., such as Wager Triggering object(s)) to initiate wager-based game events, one or more calls to the RNG engine may occur each time a new Wager Triggering Symbol is "spawned" or introduced into the gaming environment. For example, if a new Wager Triggering Symbol is introduced into the gaming environment of a driving-type hybrid arcade/wager-based game which uses a 3 reel virtual slot game to implement wager-based game events, three separate GetRandomNumberRange function calls may be made to the RNG engine to obtain 3 different random numbers, which represent a predetermined outcome of the wager-based 3-reel slot game event which will be initiated if/when the player's character or vehicle interacts with the identified Wager Triggering Symbol.

In at least one embodiment, the GetRandomNumberRange function may utilize 2 parameters representing, for example, a minimum value (e.g., zero) and a maximum value (e.g., 255). When the number is generated by the RNG engine, it may need to be scaled to fit inside the minimum and maximum values. In one embodiment, the value of each generated RNG number may be automatically scaled by performing the following operations:

1. Increase the maximum value by 1 so when we mod it later we can achieve the maximum number.
2. Set the limit of the number to equal the difference between the min and max. This will represent how many numbers we can generate.
3. Use integer division to get the largest number that our limit will mod evenly into our RNG's Maximum number.
4. Generate a number from the RNG engine.
5. Check to see if the number is larger than our mod evenly number. If we don't do this, then a lower number has the potential to show more often than higher numbers generated by the RNG engine generator. Comparing it to a large evenly modded number will help ensure that each number has the same chance of being called by disregarding the numbers that are higher than this.
6. If the number is larger than our mod evenly number, we discard it and generate another number.
7. Repeat operations 5 and 6 (above) until a number is found/identified.
8. Mod the identified number generated by our limit, and add the minimum amount to it. This will give us the final RNG number.

Using the RNG Engine Number(s)

In one embodiment, the 3 numbers that are generated in connection with the spawning of an identified NPC (or Wager Triggering Symbol) are securely encrypted and stored inside of (or otherwise stored in a manner which associated with or linked to) the identified NPC/Wager Triggering Symbol, in the order that the 3 RNG numbers were generated.

If/when the identified NPC is subsequently killed or destroyed (or damaged in some embodiment), or if the player's character/vehicle interacts with the identified Wager Triggering Symbol (destroying and/or damaging such object) we access and use the 3 stored RNG numbers (in order) to check the positions of each reel. These positions are then compared to a math model to get the award value. Thereafter, assuming no errors detected, the award value and reels are displayed for the user to see.

FIG. 1 illustrates a simplified block diagram of a specific example embodiment of a Hybrid Arcade/Wager-Based (e.g., "HAWG") Gaming System 100 which may be implemented via a computerized data network. As described in greater detail herein, different embodiments of Hybrid Arcade/Wager-Based Gaming Systems may be configured, designed, and/or operable to provide various different types of operations, functionalities, and/or features generally relating to Hybrid Arcade/Wager-Based Gaming System technology. Further, as described in greater detail herein, many of the various operations, functionalities, and/or features of the Hybrid Arcade/Wager-Based Gaming System(s) disclosed herein may provide may enable or provide different types of advantages and/or benefits to different entities interacting with the Hybrid Arcade/Wager-Based Gaming System(s).

According to different embodiments, at least some Hybrid Arcade/Wager-Based Gaming System(s) may be configured, designed, and/or operable to provide a number of different advantages and/or benefits and/or may be operable to initiate, and/or enable various different types of operations, functionalities, and/or features, such as, for example, one or more of those described and/or referenced herein.

According to different embodiments, at least a portion of the various functions, actions, operations, and activities performed by one or more component(s) of the Hybrid Arcade/Wager-Based Gaming System may be initiated in response to detection of one or more conditions, events, and/or other criteria satisfying one or more different types of minimum threshold criteria, such as, for example, one or more of those described and/or referenced herein.

According to different embodiments, at least a portion of the various types of functions, operations, actions, and/or other features provided by the Hybrid Arcade/Wager-Based Gaming System may be implemented at one or more client systems(s), at one or more System Server(s), and/or combinations thereof.

According to different embodiments, the Hybrid Arcade/Wager-Based Gaming System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Hybrid Arcade/Wager-Based Gaming System may include one or more types of systems, components, devices, processes, etc. (e.g., or combinations thereof) described and/or referenced herein.

According to different embodiments, the Hybrid Arcade/Wager-Based Gaming (e.g., HAWG) System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Hybrid Arcade/Wager-Based Gaming System may include one or more of the following types of systems, components, devices, processes, etc. (e.g., or combinations thereof):

Casino Gaming System Server(s) 120—In at least one embodiment, the Casino Gaming System Server(s) may be operable to perform and/or implement various types of functions, operations, actions, and/or other features such as those described or referenced herein.

Other Gaming Network(s) 140

Client Computer System(s) 130

$3^{rd}$ Party System(s) 150

Internet & Cellular Network(s) 110

Remote Database System(s) 180

Remote System(s)/Service(s) 170, which, for example, may include, but are not limited to, one or more of the following (e.g., or combinations thereof):

Content provider servers/services

Media Streaming servers/services

Database storage/access/query servers/services
Financial transaction servers/services
Payment gateway servers/services
Electronic commerce servers/services
Event management/scheduling servers/services
Etc.

Mobile Device(s) 160—In at least one embodiment, the Mobile Device(s) may be operable to perform and/or implement various types of functions, operations, actions, and/or other features such as those described or referenced herein.

etc.

In at least one embodiment, the Hybrid Arcade/Wager-Based Gaming System may be operable to utilize and/or generate various different types of data and/or other types of information when performing specific tasks and/or operations. This may include, for example, input data/information and/or output data/information. For example, in at least one embodiment, the Hybrid Arcade/Wager-Based Gaming System may be operable to access, process, and/or otherwise utilize information from one or more different types of sources, such as, for example, one or more local and/or remote memories, devices and/or systems. Additionally, in at least one embodiment, the Hybrid Arcade/Wager-Based Gaming System may be operable to generate one or more different types of output data/information, which, for example, may be stored in memory of one or more local and/or remote devices and/or systems. Examples of different types of input data/information and/or output data/information which may be accessed and/or utilized by the Hybrid Arcade/Wager-Based Gaming System may include, but are not limited to, one or more of those described and/or referenced herein.

According to specific embodiments, multiple instances or threads of the Hybrid Arcade/Wager-Based Gaming System may be concurrently implemented and/or initiated via the use of one or more processors and/or other combinations of hardware and/or hardware and software. For example, in at least some embodiments, various aspects, features, and/or functionalities of the Hybrid Arcade/Wager-Based Gaming System may be performed, implemented and/or initiated by one or more of the various systems, components, systems, devices, procedures, processes, etc., described and/or referenced herein.

In at least one embodiment, a given instance of the Hybrid Arcade/Wager-Based Gaming System may access and/or utilize information from one or more associated databases. In at least one embodiment, at least a portion of the database information may be accessed via communication with one or more local and/or remote memory devices. Examples of different types of data which may be accessed by the Hybrid Arcade/Wager-Based Gaming System may include, but are not limited to, one or more of those described and/or referenced herein.

According to different embodiments, various different types of encryption/decryption techniques may be used to facilitate secure communications between devices in Hybrid Arcade/Wager-Based Gaming System(s) and/or Hybrid Arcade/Wager-Based Gaming Network(s). Examples of the various types of security techniques which may be used may include, but are not limited to, one or more of the following (e.g., or combinations thereof): random number generators, SHA-1 (e.g., Secured Hashing Algorithm), MD2, MD5, DES (e.g., Digital Encryption Standard), 3DES (e.g., Triple DES), RC4 (e.g., Rivest Cipher), ARC4 (e.g., related to RC4), TKIP (e.g., Temporal Key Integrity Protocol, uses RC4), AES (e.g., Advanced Encryption Standard), RSA, DSA, DH, NTRU, and ECC (e.g., elliptic curve cryptography), PKA (e.g., Private Key Authentication), Device-Unique Secret Key and other cryptographic key data, SSL, etc. Other security features contemplated may include use of well-known hardware-based and/or software-based security components, and/or any other known or yet to be devised security and/or hardware and encryption/decryption processes implemented in hardware and/or software.

According to different embodiments, one or more different threads or instances of the Hybrid Arcade/Wager-Based Gaming System may be initiated in response to detection of one or more conditions or events satisfying one or more different types of minimum threshold criteria for triggering initiation of at least one instance of the Hybrid Arcade/Wager-Based Gaming System. Various examples of conditions or events which may trigger initiation and/or implementation of one or more different threads or instances of the Hybrid Arcade/Wager-Based Gaming System may include, but are not limited to, one or more of those described and/or referenced herein.

It will be appreciated that the Hybrid Arcade/Wager-Based Gaming System of FIG. 1 is but one example from a wide range of Hybrid Arcade/Wager-Based Gaming System embodiments which may be implemented. Other embodiments of the Hybrid Arcade/Wager-Based Gaming System (e.g., not shown) may include additional, fewer and/or different components/features that those illustrated in the example Hybrid Arcade/Wager-Based Gaming System embodiment of FIG. 1.

Generally, the Hybrid Arcade/Wager-Based Gaming techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the Hybrid Arcade/Wager-Based Gaming techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, system servers, cloud computing systems, network devices, etc.

Figure 2:
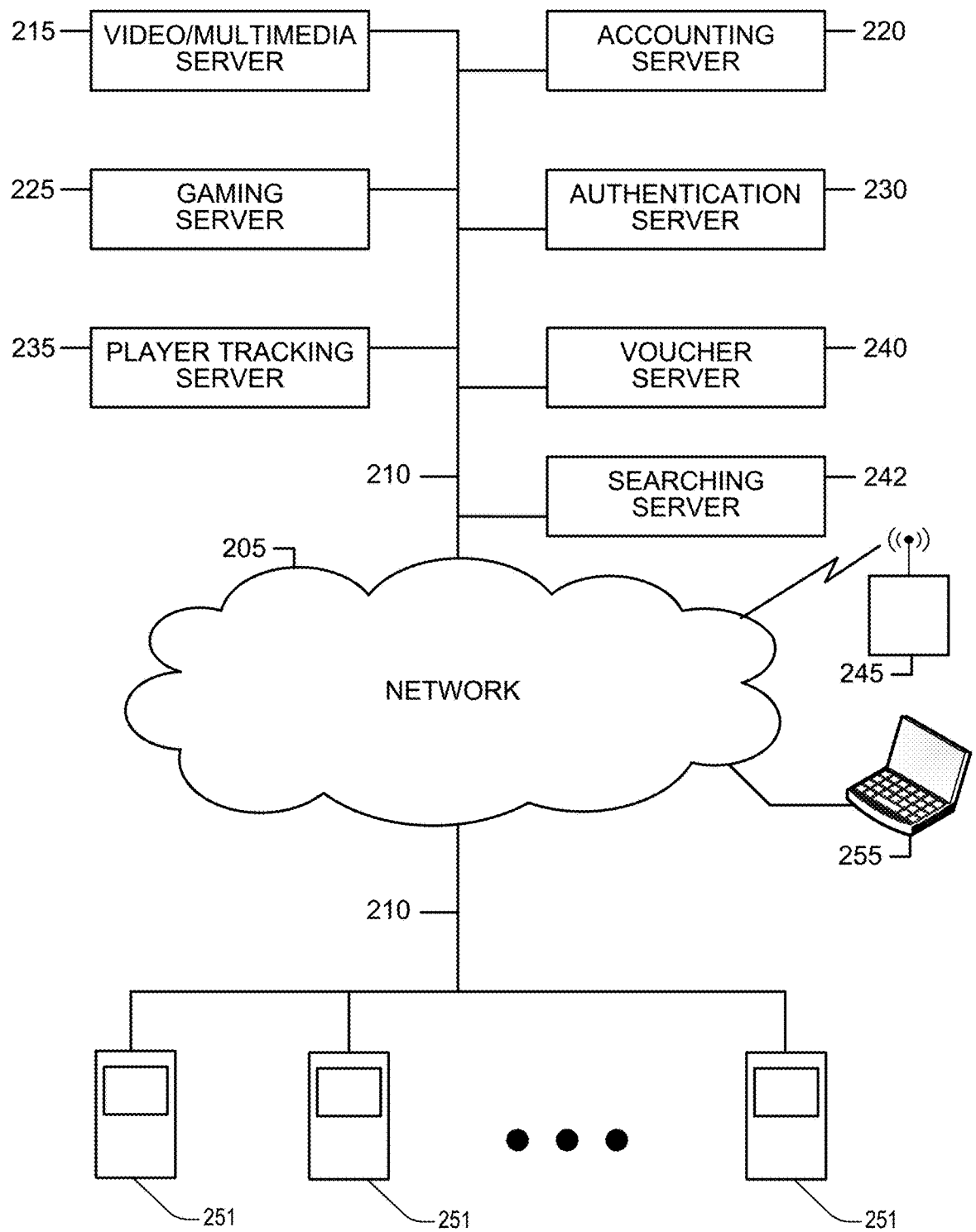
FIG. 2 shows an example block diagram of an electronic gaming system 200 in accordance with a specific embodiment.

FIG. 2 shows an example block diagram of an electronic gaming system 200 in accordance with a specific embodiment. Electronic gaming system 200 may include electronic gaming devices (e.g., electronic gaming terminals, electronic gaming machines, wager-based video gaming machines, etc.) 251, which may be coupled to network 205 via a network link 210. Network 205 may be the internet or a private network. One or more video streams may be received at video/multimedia server 215 from EGDs 251. Video/Multimedia server 215 may transmit one or more of these video streams to one or more: mobile devices 245, 255, electronic gaming devices (e.g., EGD) 251, and/or other remote electronic device. Video/Multimedia server 215 may transmit these video streams via network link 210 and network 205.

Electronic gaming system 200 may include an accounting/transaction server 220, a gaming server 225, an authentication server 230, a player tracking server 235, a voucher server 240, and a searching server 242.

Accounting/transaction server 220 may compile, track, store, and/or monitor cash flows, voucher transactions, winning vouchers, losing vouchers, and/or other transaction data for the casino operator and for the players. Transaction data may include the number of wagers, the size of these wagers, the date and time for these wagers, the identity of the players making these wagers, and the frequency of the wagers. Accounting/transaction server 220 may generate tax information relating to these wagers. Accounting/transaction server 220 may generate profit/loss reports for predetermined gaming options, contingent gaming options, predetermined betting structures, and/or outcome categories.

Gaming server 225 may generate gaming options based on predetermined betting structures and/or outcome categories. These gaming options may be predetermined gaming options, contingent gaming options, and/or any other gaming option disclosed in this disclosure.

Authentication server 230 may determine the validity of vouchers, players' identity, and/or an outcome for a gaming event.

Player tracking server 235 may track a player's betting activity, a player's preferences (e.g., language, drinks, font, sound level, etc.). Based on data obtained by player tracking server 235, a player may be eligible for gaming rewards (e.g., free play), promotions, and/or other awards (e.g., complimentary food, drinks, lodging, concerts, etc.).

Voucher server 240 may generate a voucher, which may include data relating to gaming options. For example, data relating to the structure may be generated. If there is a time deadline, that information may be generated by voucher server 240. Vouchers may be physical (e.g., paper) or digital.

Searching server 242 may implement a search on one or more gaming devices to obtain gaming data. Searching server 242 may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop up window, a text message, an email, a voice message, a video message and the like. Searching server 242 may implement a wagering function, which may be an automatic wagering mechanism. These functions of searching server 242 may be integrated into one or more servers.

Searching server 242 may include one or more searching structures, one or more searching algorithms, and/or any other searching mechanisms. In general, the search structures may cover which hybrid arcade/wager-based games paid out the most money during a time period, which hybrid arcade/wager-based games kept the most money from players during a time period, which hybrid arcade/wager-based games are most popular (e.g., top games), which hybrid arcade/wager-based games are least popular, which hybrid arcade/wager-based games have the most amount of money wager during a period, which hybrid arcade/wager-based games have the highest wager volume, which hybrid arcade/wager-based games are more volatile (e.g., volatility, or deviation from the statistical norms, of wager volume, wager amount, pay out, etc.) during a time period, and the like. Search may also be associated with location queries, time queries, and/or people queries.

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific game types and/or themes (e.g., first person shooter types, first person rail types, TV themes, Movie themes, multiplayer types, etc.). Searching structure may search one or more of these games.

In another example, the searching structure may be based on a player's preferences, past transactional history, player input, a particular game, a particular EGD, a particular casino, a particular location within a casino, game outcomes over a time period, payout over a time period, and/or any other criteria.

Figure 3:
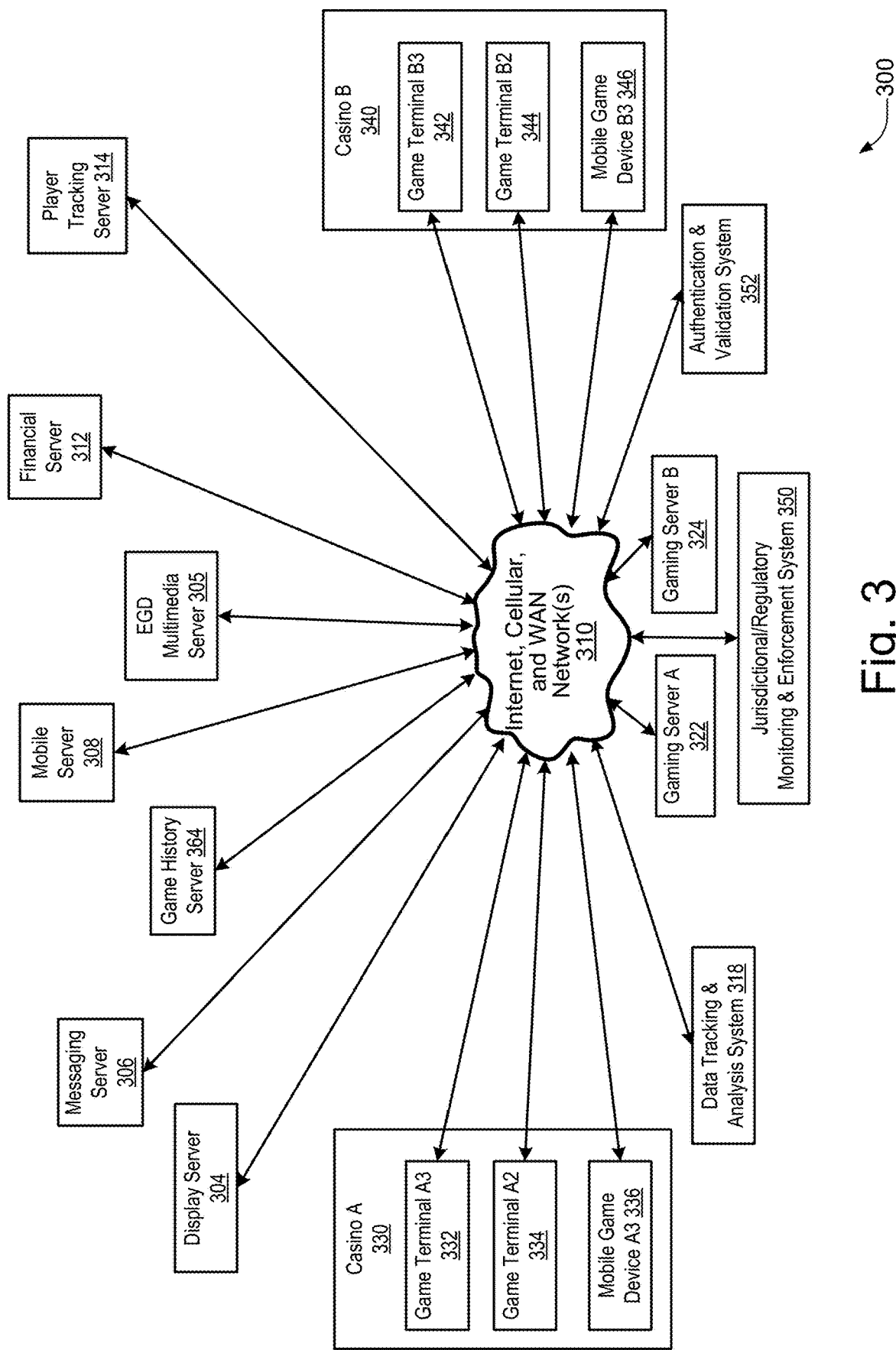
FIG. 3 illustrates a network diagram of an example embodiment of a Gaming Network 300 which may be configured or designed to implement various hybrid arcade/wager-based gaming techniques described and/or referenced herein.

Searching algorithms may be dynamic searching programs, which may be modified based on one or more past results. In one example, the search algorithm may determine that a specific triggering event occurs with a ninety percent success rate on a first EGD, a ten percent success rate on a second EGD, a fifty percent success rate on a third EGD, and a seventy percent success rate on a fourth EGD. The search algorithm may generate a search priority based on the probability of success, which may lead to the first EGD being searched first, the fourth EGD being searched second, the third EGD being searched third, and the second EGD being searched fourth. Search algorithm may utilize any dynamic feedback procedure to enhance current and/or future searching results FIG. 3 illustrates a network diagram of an example embodiment of a Gaming Network 300 which may be configured or designed to implement various hybrid arcade/wager-based gaming techniques described and/or referenced herein. As described in greater detail herein, different embodiments of Gaming Networks may be configured, designed, and/or operable to provide various different types of operations, functionalities, and/or features generally relating to Gaming Network technology. Further, as described in greater detail herein, many of the various operations, functionalities, and/or features of the Gaming Network(s) and/or Gaming System(s) disclosed herein may provide may enable or provide different types of advantages and/or benefits to different entities interacting with the Gaming Network(s).

According to different embodiments, at least some Gaming Network(s) may be configured, designed, and/or operable to provide a number of different advantages and/or benefits and/or may be operable to initiate, and/or enable various different types of operations, functionalities, and/or features, such as, for example, one or more of the following (e.g., or combinations thereof):

Enable real-world casino venues to securely and legally provide opportunities for their players/players to participate in online or network-based wager-based gaming sessions. Examples of various types of games which may be played may include, but are not limited to, one or more hybrid arcade/wager-based game(s) such as those described and/or referenced herein.

Enable casino venues to provide opportunities for their players/players to participate in live, multiplayer, wager-based, arcade-style video games where players from different casinos, different locations, and/or different EGDs, are able to compete against one another in a multiplayer, hybrid arcade/wager-based gaming environment. In at least one embodiment, players can be located at the same and/or at remote gaming venues that are connected via a wide area network such as the Internet, cellular networks, VPNs, cloud-based networks, etc.

Utilize live electronic gaming device dealers and attendants for conducting the wager-based, arcade-style video games.

Deploy electronic gaming devices (e.g., EGDs) in multiple different physical casino venues, and utilize the EGDs for enabling casino players/players to participate in wager-based, arcade-style video games.

Players may be allowed to manually switch or change their opponents (e.g., in heads-up game play).

Players may be automatically switched (e.g., by gaming system) to play different opponents (e.g., auto switching feature; useful for tournament play).

Gaming system may perform automated matching of players in tournament (e.g., based on various criteria such as, for example: skill level, experience, random, social relationships, etc.). In at least one embodiment, multi-property network connections between various different casino venues (e.g., located at different geographic locations) may be implemented and utilized to facilitate pairing of and/or participation by remote players.

In at least one embodiment, a central clearing house may be utilized for financial transactions (e.g., deposit, debit of player accounts, payouts, lines of credit, etc.) relating to the hybrid arcade/wager-based game sessions.

Various types of game play rules may be implemented and automatically enforced for the hybrid arcade/wager-based game sessions, such as, for example: time limit per play, amount per wager, max wager, maximum wager, rules to facilitate speed of game play, rules imposed for conformance with regulatory or jurisdiction requirements, etc. For example, in one embodiment, if a player failed to make a wager within an allotted time interval, the system may be configured or designed to automatically enter default wager for that player.

According to different embodiments, the Gaming Network 300 may include a plurality of different types of components, devices, modules, processes, systems, etc., which, for example, may be implemented and/or instantiated via the use of hardware and/or combinations of hardware and software. For example, as illustrated in the example embodiment of FIG. 3, the Gaming Network may include one or more of the following types of systems, components, devices, processes, etc. (e.g., or combinations thereof):

Display System Server(s) 304. In at least one embodiment, the Display System Server(s) may be configured or designed to implement and/or facilitate management of content (e.g., graphics, images, text, video fees, etc.) to be displayed and/or presented at one or more EGDs (e.g., or at one or more groups of EGDs), dealer displays, administrator displays, etc.

EGD Multimedia System Server(s) 305. In at least one embodiment, the Table Multimedia System Server(s) may be configured or designed to generate, implement and/or facilitate management of content (e.g., graphics, images, text, video fees, audio feeds, etc.), which, for example, is to be streamed or provided to one or more EGDs (e.g., or to one or more groups of EGDs).

Messaging System Server(s) 306. In at least one embodiment, the Messaging System Server(s) may be configured or designed to implement and/or facilitate management of messaging and/or other communications among and between the various systems, components, devices, EGDs, players, dealers, and administrators of the gaming network.

Mobile System Server(s) 308. In at least one embodiment, the Mobile System Server(s) may be configured or designed to implement and/or facilitate management of communications and/or data exchanged with various types of mobile devices, including for example: player-managed mobile devices (e.g., smart phones, PDAs, tablets, mobile computers), casino-managed mobile devices (e.g., mobile gaming devices), etc.

Financial System Server(s) 312. In at least one embodiment, the Financial System Server(s) may be configured or designed to implement and/or facilitate tracking, management, reporting, and storage of financial data and financial transactions relating to one or more hybrid arcade/wager-based game sessions. For example, at least some Financial System Server(s) may be configured or designed to keep track of the game accounting (e.g., money in, money out) for a virtual hybrid arcade/wager-based game being played, and may also be configured or designed to handle various financial transactions relating to player wagers and payouts. For example, in at least one embodiment, Financial Servers may be configured or designed to monitor each remote player's account information, and may also manage or handle funds transfers between each player's account and the active game server (e.g., associated with the player's game session).

Player Tracking System Server(s) 314. In at least one embodiment, the Player Tracking System Server(s) may be configured or designed to implement and/or facilitate management and exchange of player tracking information associated with one or more EGDs, hybrid arcade/wager-based game sessions, etc. In at least one embodiment, a Player Tracking System Server may include at least one database that tracks each player's hands, wins/losses, bet amounts, player preferences, etc., in the network. In at least one embodiment, the presenting and/or awarding of promotions, bonuses, rewards, achievements, etc., may be based on a player's play patterns, time, games selected, bet amount for each game type, etc. A Player Tracking System Server may also help establish a player's preferences, which assists the casino in their promotional efforts to: award player comps (e.g., loyalty points); decide which promotion(s) are appropriate; generate bonuses; etc.

Data Tracking & Analysis System(s) 318. In at least one embodiment, the Data Tracking & Analysis System(s) may be configured or designed to implement and/or facilitate management and analysis of game data. For example, in one embodiment the Data Tracking & Analysis System(s) may be configured or designed to aggregate multisite hybrid arcade/wager-based gaming trends, local wins, jackpots, etc.

Gaming System Server(s) (e.g., 322, 324). In at least one embodiment, different game servers may be configured or designed to be dedicated to one or more specifically designated type(s) of game(s). Each game server has game logic to host one of more virtual hybrid arcade/ wager-based game sessions. At least some game server(s) may also be capable of keeping track of the game accounting (e.g., money in, money out) for a virtual hybrid arcade/wager-based game being played, and/or for updating the Financial Servers at the end of each game. The game server(s) may also operable to generate the EGD graphics primitives (e.g., game virtual objects and game states), and may further be operable to update EGDs when a game state change (e.g., new card dealt, player upped the ante, player folds/busts, etc.) has been detected.

Jurisdictional/Regulatory Monitoring & Enforcement System(s) 350. In at least one embodiment, the Jurisdictional/Regulatory Monitoring & Enforcement System(s) may be configured or designed to handle tracking, monitoring, reporting, and enforcement of specific regulatory requirements relating to wager-based gameplay activities in one or more jurisdictions.

Authentication & Validation System(s) 352. According to different embodiments, the Authentication & Validation System(s) may be configured or designed to determine and/or authenticate the identity of the current player at a given EGD. For example, in one embodiment, the current player may be required to perform a log in process at the EGD in order to access one or more features. Alternatively, the EGD may be adapted to automatically determine the identity of the current player based upon one or more external signals such as, for example, scanning of a barcode of a player tracking card, an RFID tag or badge worn by the current player which provides a wireless signal to the EGD for determining the identity of the current player. In at least one implementation, various security features may be incorporated into the EGD to prevent unauthorized players from engaging in certain types of activities at the EGD. In some embodiments, the Authentication & Validation System(s) may be configured or designed to authenticate and/or validate various types of hardware and/or software components, such as, for example, hardware/software components residing at a remote EGDs, game play information, wager information, player information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for all purposes.

Casino Venues (e.g., 330, 340). In at least one embodiment, each casino venue may correspond to a real-world, physical casino which is located at a particular geographic location. In some embodiments, a portion of the multiple different casino venues may be affiliated with each other (e.g., Harrah's Las Vegas, Harrah's London). In other embodiments, at least a portion of the multiple different casino venues do not share any affiliation with each other.

Electronic gaming devices (e.g., EGDs) 332, 334, 336, 342, 344, 346. As described in greater detail herein, the EGDs may be configured or designed to facilitate and enable players to participate in wager-based, arcade-style video game sessions (e.g., and/or other types of hybrid arcade/wager-based game sessions). Different EGDs may be physically located in one or more different casino venues, and may be connected via a communication network. In some embodiments, EGDs may be implemented as stationary machines. In some embodiments, at least some EGDs may be implemented using mobile devices (e.g., tablets, smartphones, laptops, PC's, and the like).

Internet, Cellular, and WAN Network(s) 310

Game History Server(s) 364. In at least one embodiment, the Game History Server(s) may be configured or designed to track all (e.g., or selected) game types and game play history for all (e.g., or selected) hybrid arcade/wager-based games. In some embodiments, a Game History Server may also assist the casino manager in case of disputes between players and the casino by, for example, providing the ability to "replay" (e.g., by virtually recreating the game events) the game in dispute, step by step, based on previously stored game states. Such dispute resolution capability is a desirable feature in hybrid arcade/wager-based game environments.

Remote Database System(s) which, for example, may be operable to store and provide access to various types of information and data described herein.

Remote System Server(s)/Service(s), which, for example, may include, but are not limited to, one or more of the following (e.g., or combinations thereof):
Content provider servers/services
Media Streaming servers/services
Database storage/access/query servers/services
Financial transaction servers/services
Payment gateway servers/services
Electronic commerce servers/services
Event management/scheduling servers/services
Etc.

Figure 6:
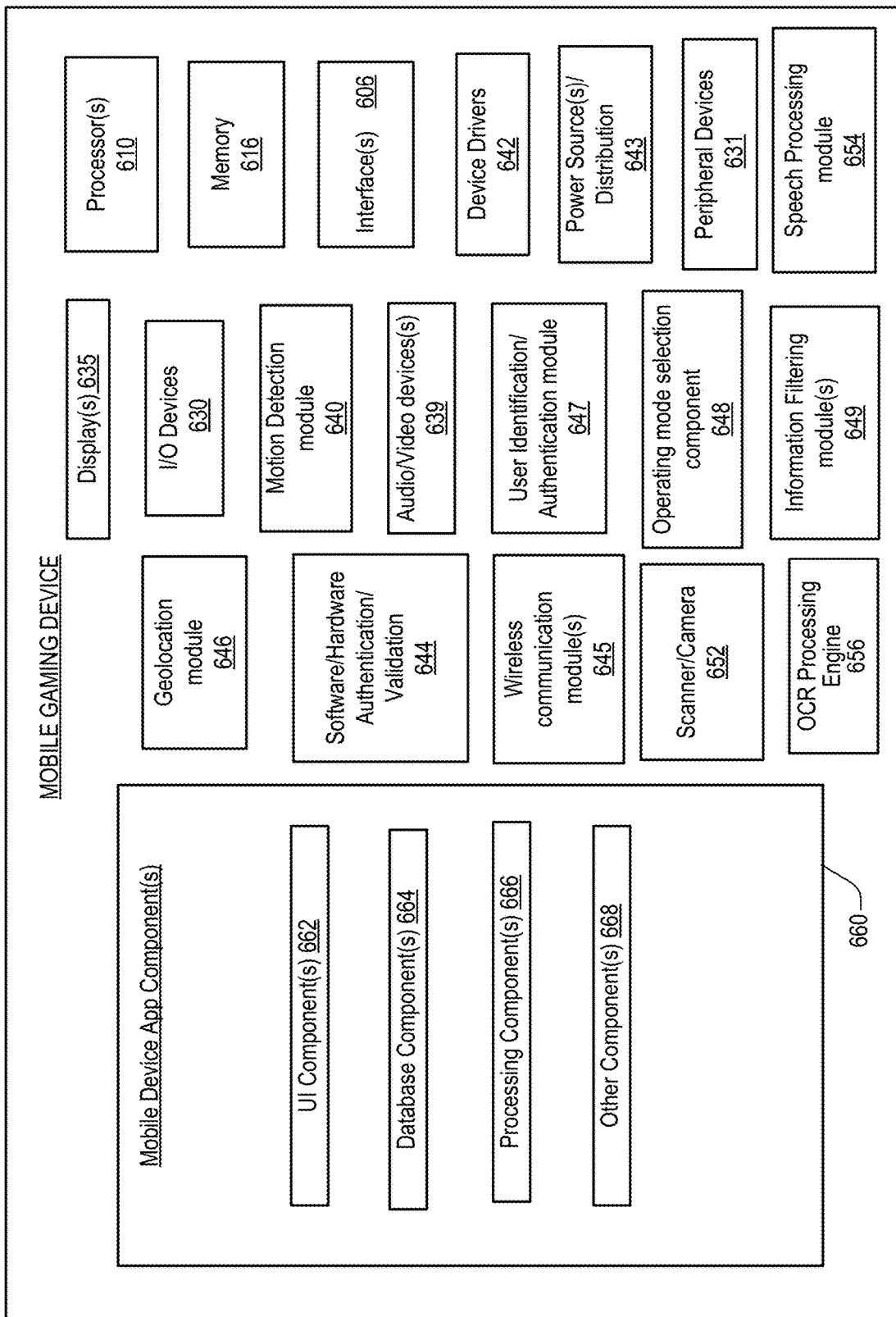
FIG. 6 is a simplified block diagram of an exemplary mobile gaming device 600 in accordance with a specific embodiment.

Mobile Game Device(s) 336, 346—In at least one embodiment, the Mobile Device(s) may be operable to perform and/or implement various types of functions, operations, actions, and/or other features such as those described or referenced herein (e.g., such as those illustrated and/or described with respect to FIG. 6).

According to specific embodiments, a variety of different game states may be used to characterize the state of current and/or past events which are occurring (e.g., or have occurred) at a given EGD. For example, in one embodiment, at any given time in a game, a valid current game state may be used to characterize the state of game play (e.g., and/or other related events, such as, for example, mode of operation of the EGD, etc.) at that particular time. In at least one embodiment, multiple different states may be used to characterize different states or events which occur at the EGD at any given time. In one embodiment, when faced with ambiguity of game state, a single state embodiment forces a decision such that one valid current game state is chosen. In a multiple state embodiment, multiple possible game states may exist simultaneously at any given time in a game, and at the end of the game or at any point in the middle of the game, the EGD may analyze the different game states and select one of them based on certain criteria. Thus, for example, when faced with ambiguity of game state, the multiple state embodiment(s) allow all potential game states to exist and move forward, thus deferring the decision of choosing one game state to a later point in the game. The multiple game state embodiment(s) may also be more effective in handling ambiguous data or game state scenarios.

According to specific embodiments, a variety of different entities may be used (e.g., either singly or in combination) to track the progress of game states which occur at a given gaming EGD. Examples of such entities may include, but are not limited to, one or more of the following (e.g., or combination thereof): master controller system, display system, gaming system, local game tracking component(s), remote game tracking component(s), etc. Examples of various game tracking components may include, but are not limited to: automated sensors, manually operated sensors, video cameras, intelligent playing card shoes, RFID readers/writers, RFID tagged chips, objects displaying machine readable code/patterns, etc.

According to a specific embodiment, local game tracking components at the EGD may be operable to automatically monitor game play activities at the EGD, and/or to automatically identify key events which may trigger a transition of game state from one state to another as a game progresses. Depending upon the type of game being played at the gaming table, examples of possible key events may include, but are not limited to, one or more of the following (e.g., or combination thereof):

start of a new hybrid arcade/wager-based gaming session;
end of a current hybrid arcade/wager-based gaming session;
start of a virtual slot wheel spin;
game start event;
game end event;
detection of event for triggering initiation of wager-based event (e.g., destroying a zombie on screen triggers spin of virtual slot reel, and subsequent payout/credit award);
detection of event for triggering end of wager-based event (e.g., slot wheel spin, etc.);
detection of event for triggering initiation of randomized game play event;
detection of event for triggering end of randomized game play event;
initial wager period start;
initial wager period end;
subsequent wager period start;
subsequent wager period end;
payout period start;
payout period end;
etc.

FIGS. 4, 5, 6, and 19 show block diagrams of different example embodiments of electronic gaming machines (e.g., EGMs) or electronic gaming devices ("EGDs) which may be used for facilitating, enabling, initiating, and/or implementing one or more of the hybrid arcade/wager-based gaming aspects described herein.

Figure 4:
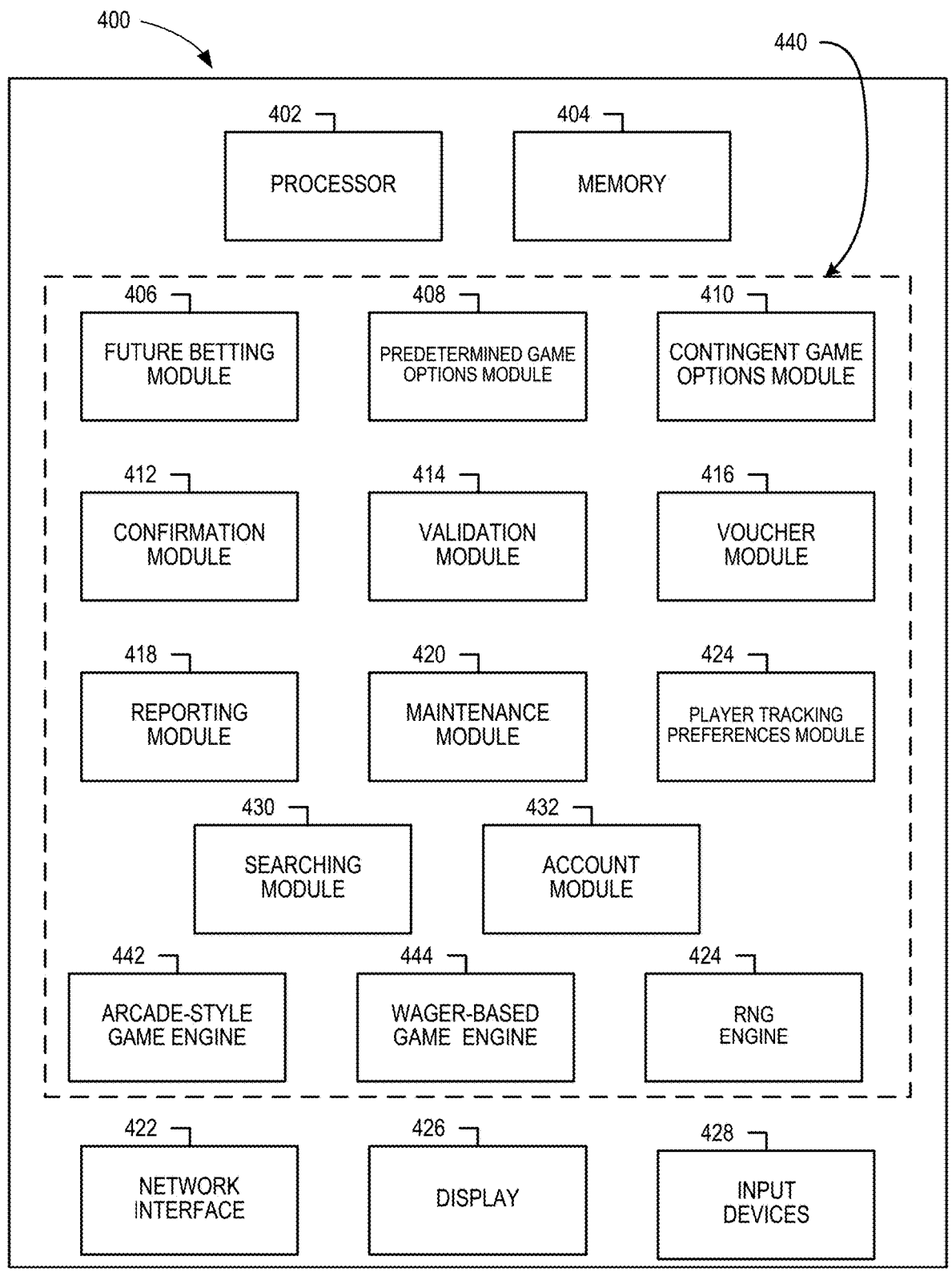
FIG. 4 shows a block diagram of electronic gaming device 400, in accordance with a specific embodiment.

FIG. 4 shows a block diagram 400 of electronic gaming device 400, in accordance with a specific embodiment. Electronic gaming device 400 may include a processor 402, a memory 404, a network interface 422, input devices 428, and a display 426.

Processor 402 may generate gaming options based on predetermined betting structures and/or outcome categories. Predetermined betting structures may utilize more than one outcome category to generate via processor 402 gaming options. Predetermined betting structures may combine any outcome category with any other outcome category to gaming options.

Processor 402 may offer a gaming option which is structured so that the gaming option relates to more than one EGD. Processor 402 may generate contingent gaming options and/or predetermined gaming options. Contingent gaming options 410 may be structures such that when a triggering event occurs over one or more than one gaming event, racing event, and/or sporting event, the wager is activated.

Network interface 422 may allow electronic gaming device 400 to communicate with remote devices/systems such as, for example, video/multimedia server(s), accounting/transaction server(s), gaming server(s), authentication server(s), player tracking server(s), voucher server(s), etc.

Input devices 428 may be mechanical buttons, electronic buttons, a touchscreen, a microphone, cameras, an optical scanner, or any combination thereof. Input devices 428 may be utilized to make a wager, to make an offer to buy or sell a voucher, to determine a voucher's worth, to cash in a voucher, to modify (e.g., change sound level, configuration, font, language, etc.) electronic gaming device 400, to select a movie or music, to select type of content to be displayed on main and/or auxiliary screen(s) of EGD, or any combination thereof.

Arcade-Style Game Engine 442 may be configured or designed to manage the arcade-style game play portion (or entertainment portion) of the hybrid arcade/wager-based game.

Wager-Based Game Engine 444 may be configured or designed to manage the wager-based game event portion(s) of the hybrid arcade/wager-based game.

Random Number Generator (RNG) Engine 446 may include software and/or hardware algorithm and/or processes which are used to generate random outcomes, and may be used by the Wager-Based Game Engine to generate wager-based game event outcomes, at least a portion of which may correspond to predetermined wager-based game event outcomes (as described in greater detail below).

Display 426 may show video streams from one or more gaming devices, gaming objects from one or more gaming devices, computer generated graphics, predetermined gaming options, and/or contingent gaming options.

Memory 404 may include various memory modules 440. Memory 404 via various memory modules 440 may include a future betting module 406, a predetermined game options module 408, a contingent game options module 410, a confirmation module 412, a validation module 414, a voucher module 416, a reporting module 418, a maintenance module 420, a player tracking preferences module 424, a searching module 430, and an account module 432.

Future betting module 406 may store data relating to the predetermined betting structure. Processor 402 may utilize data in future betting module 406 to generate predetermined gaming options and/or contingent gaming options. Any other processor (e g, gaming server 225, any virtualized gaming server, etc.) may implement these functions of processor 402.

Predetermined game options module 408 may store data relating to predetermined gaming options, which may be offered to a player.

Contingent game options module 410 may store data relating to contingent gaming options, which may be offered to a player.

Confirmation module 412 may utilize data received from a voucher, the transaction history of the voucher (e.g., the voucher changed hands in a secondary market), and/or the identity of the player to confirm the value of the voucher. In another example, confirmation module 412 may utilize game event data, along with voucher data to confirm the value of the voucher.

Validation module 414 may utilize data received from a voucher to confirm the validity of the voucher.

Voucher module 416 may store data relating to generated vouchers, redeemed vouchers, bought vouchers, and/or sold vouchers.

Reporting module 418 may generate reports related to a performance of electronic gaming device 400, electronic gaming system(s), hybrid arcade/wager-based game(s), video streams, gaming objects, credit device(s), identification device(s), etc.

In one implementation, reporting module 418 may reside on a central server and can aggregate and generate real time statistics on betting activities at one or more hybrid arcade/wager-based games at one or more participating casino's. The aggregate betting statistics may include trends (e.g., aggregate daily wager volume and wager amount by game types, by casinos, and the like), top games with the most payouts, top tables with the most payouts, top search structures used by players, most popular hybrid arcade/wager-based game(s) by wager volume, most searched for game, hybrid arcade/wager-based game(s) with least payouts, weekly trends, monthly trends, and other statistics related to game plays, wagers, people, location, and searches.

The information and statistics generated by the server-based reporting module 418 can be displayed publicly or privately. For example, popular trending and statistical information on wager volume and wager amount for the top ten hybrid arcade/wager-based games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Maintenance module 420 may track any maintenance that is implemented on electronic gaming device 400 and/or electronic gaming system 200. Maintenance module 420 may schedule preventative maintenance and/or request a service call based on a device error.

Player tracking preferences module 424 may compile and track data associated with a players preferences.

Searching module 430 may include one or more searching structures, one or more searching algorithms, and/or any other searching mechanisms. The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., baccarat tables, roulette tables, blackjack tables, poker tables, craps tables, Sic Bo tables, etc.). Searching structure may search one or more of these games.

In another example, the searching structure may be based on a player's preferences, past transactional history, player input, a particular hybrid arcade/wager-based game or game type, a particular EGD, a particular casino, a particular location within a casino, game outcomes over a time period, payout over a time period, and/or any other criteria. Searching algorithms may be dynamic searching programs, which may be modified based on one or more past results, as described previously.

In another example, the search algorithm may generate a search priority based on the probability of success various events and/or conditions, as described previously. In some embodiments, the search algorithm may utilize any dynamic feedback procedure to enhance current and/or future searching results.

Account module 432 may include data relating to an account balance, a wager limit, a number of wagers placed, credit limits, any other player information, and/or any other account information.

Data from account module 432 may be utilized to determine whether a wager may be accepted. For example, when a search has determined a triggering event, the device and/or system may determine whether to allow this wager based on one or more of a wager amount, a number of wagers, a wager limit, an account balance, and/or any other criteria.

In at least one embodiment, at least a portion of the modules discussed in block diagram 400 may reside locally in gaming terminal 400. However, in at least some embodiments, the functions performed by these modules may be implemented in one or more remote servers. For instance, modules 406-420 and 424 may each be on a remote server, communicating with gaming terminal 400 via a network interface such as Ethernet in a local or a wide area network topology. In some implementations, these servers may be physical servers in a data center. In some other implementations, these servers may be virtualized. In yet some other implementations, the functions performed by these modules may be implemented as web services. For example, the predetermined game options module 408 may be implemented in software as a web service provider. Gaming terminal 400 would make service requests over the web for the available predetermined wager options to be displayed. Regardless of how the modules and their respective functions are implemented, the interoperability with the gaming terminal 400 is seamless.

In one implementation, reporting module 418 may reside on a central server and can aggregate and generate real time statistics on betting activities at one or more hybrid arcade/wager-based games at one or more participating casino's. The aggregate betting statistics may include trends (e.g., aggregate daily wager volume and wager amount by game types, by casinos, and the like), top games with the most payouts, top EGDs with the most payouts, top search structures used by players, most popular hybrid arcade/wager-based game(s) by wager volume, most searched for game(s), EGDs with least payouts, weekly trends, monthly trends, and other statistics related to game plays, wagers, people, location, and searches.

The information and statistics generated by the server-based reporting module 418 can be displayed publicly or privately. For example, popular trending and statistical information on wager volume and wager amount for the top ten hybrid arcade/wager-based games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Figure 5:
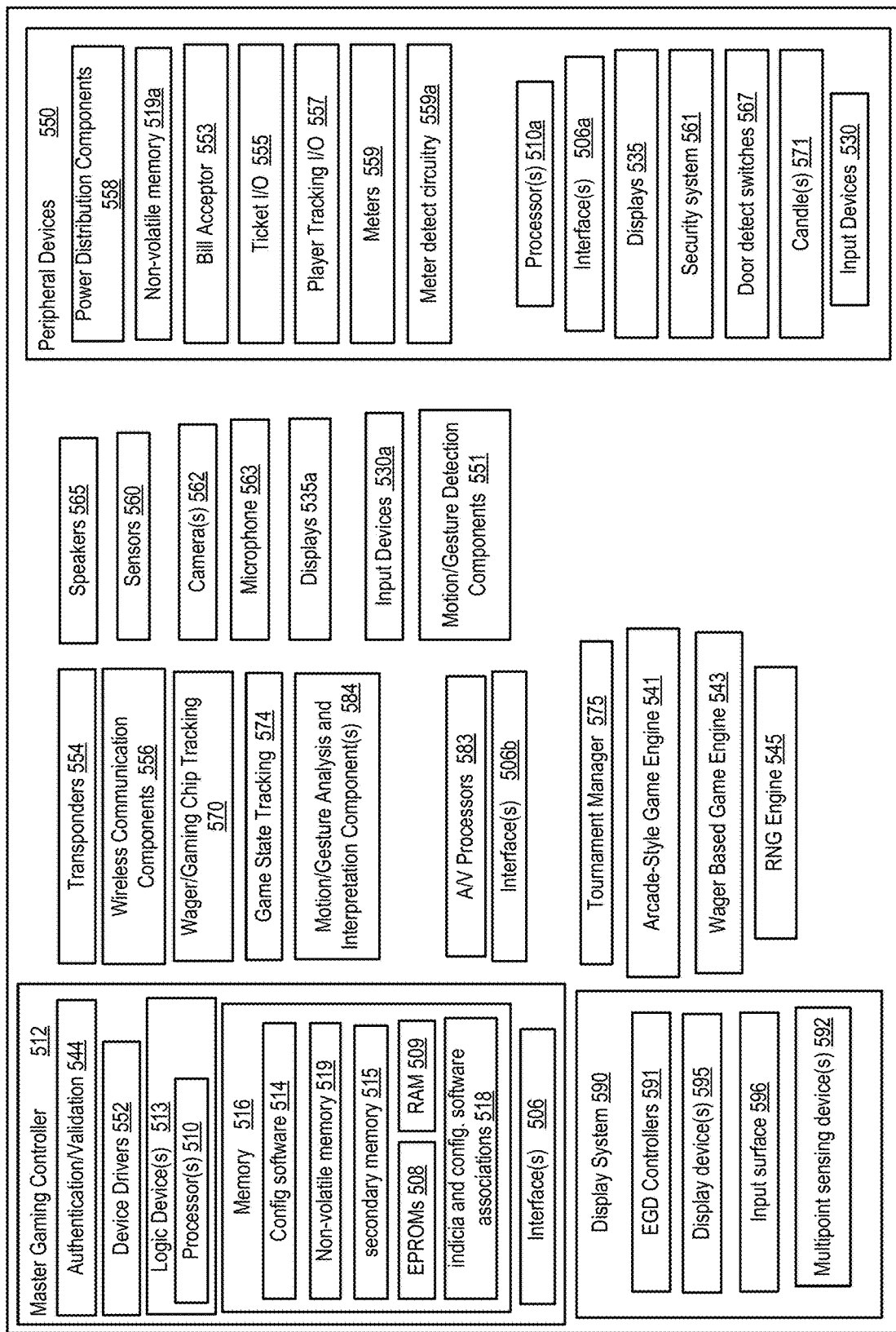
FIG. 5 is a simplified block diagram of an exemplary intelligent electronic gaming system 500 in accordance with a specific embodiment.

FIG. 5 is a simplified block diagram of an exemplary intelligent multi-player electronic gaming system 500 in accordance with a specific embodiment. In some embodiments, gaming system 500 may be implemented as a gaming server. In other embodiments, gaming system 500 may be implemented as an electronic gaming machine (e.g., EGM) or electronic gaming device (e.g., EGD).

As illustrated in the embodiment of FIG. 5, gaming system 500 includes at least one processor 510, at least one interface 506, and memory 516. Additionally, as illustrated in the example embodiment of FIG. 5, gaming system 500 includes at least one master gaming controller 512, a multi-touch sensor and display system 590, a plurality of peripheral device components 550, and various other components, devices, systems such as, for example, one or more of the following (e.g., or combinations thereof):

Arcade-Style Game Engine(s) 541;
Wager-Based Game Engine(s) 543;
RNG Engine(s) 545;
Candle control system which, for example, may include functionality for determining and/or controlling the appearances of one or more candles, etc.;
Transponders 554;
Wireless communication components 556;
Gaming chip/wager token tracking components 570;
Games state tracking components 574;
Motion/gesture analysis and interpretation components 584.
Audio/video processors 583 which, for example, may include functionality for detecting, analyzing and/or managing various types of audio and/or video information relating to various activities at the gaming system.
Various interfaces 506b (e.g., for communicating with other devices, components, systems, etc.);
Tournament manager 575;
Sensors 560;
One or more cameras 562;
One or more microphones 563;
Secondary display(s) 535a;
Input devices 530a;
Motion/gesture detection components 551;
Peripheral Devices 550;

Arcade-Style Game Engine(s) 541 may be configured or designed to manage the arcade-style game play portion (or entertainment portion) of the hybrid arcade/wager-based game.

Wager-Based Game Engine(s) 543 may be configured or designed to manage the wager-based game event portion(s) of the hybrid arcade/wager-based game.

Random Number Generator (RNG) Engine(s) 545 may include software and/or hardware algorithm and/or processes which are used to generate random outcomes, and may be used by the Wager-Based Game Engine to generate wager-based game event outcomes, at least a portion of which may correspond to predetermined wager-based game event outcomes (as described in greater detail below). One or more cameras (e.g., 562) may be used to monitor, stream and/or record image content and/or video content relating to persons or objects within each camera's view. For example, in at least one embodiment where the gaming system is implemented as an EGD, camera 562 may be used to generate a live, real-time video feed of a player (e.g., or other person) who is currently interacting with the EGD. In some embodiments, camera 562 may be used to verify a user's identity (e.g., by authenticating detected facial features), and/or may be used to monitor or tract facial expressions and/or eye movements of a user or player who is interacting with the gaming system.

In at least one embodiment, display system 590 may include one or more of the following (e.g., or combinations thereof):

EGD controllers 591;
Multipoint sensing device(s) 592 (e.g., multi-touch surface sensors/components);
Display device(s) 595;
Input/touch surface 596;
Etc.

According to various embodiments, display surface(s) 595 may include one or more display screens utilizing various types of display technologies such as, for example, one or more of the following (e.g., or combinations thereof): LCDs (e.g., Liquid Crystal Display), Plasma, OLEDs (e.g., Organic Light Emitting Display), TOLED (e.g., Transparent Organic Light Emitting Display), Flexible (e.g., F) OLEDs, Active matrix (e.g., AM) OLED, Passive matrix (e.g., PM) OLED, Phosphor-escent (e.g., PH) OLEDs, SEDs (e.g., surface-conduction electron-emitter display), EPD (e.g., ElectroPhoretic display), FEDs (e.g., Field Emission Displays) and/or other suitable display technology. EPD displays may be provided by E-ink of Cambridge, Mass. OLED displays of the type list above may be provided by Universal Display Corporation, Ewing, N.J.

In at least one embodiment, master gaming controller 512 may include one or more of the following (e.g., or combinations thereof):

Authentication/validation components 544;
Device drivers 552;
Logic devices 513, which may include one or more processors 510;
Memory 516, which may include one or more of the following (e.g., or combinations thereof): configuration software 514, non-volatile memory 519, EPROMS 508, RAM 509, associations 518 between indicia and configuration software, etc.;
Interfaces 506;
Etc.

In at least one embodiment, Peripheral Devices 550 may include one or more of the following (e.g., or combinations thereof):

Power distribution components 558;
Non-volatile memory 519a (e.g., and/or other types of memory);
Bill acceptor 553;
Ticket I/O 555;
Player tracking I/O 557;
Meters 559 (e.g., hard and/or soft meters);
Meter detect circuitry 559a;
Processor(s) 510a;
Interface(s) 506a;
Display(s) 535;
Independent security system 561;
Door detect switches 567;
Candles, etc. 571;
Input devices 530;
Etc.

In one implementation, processor 510 and master gaming controller 512 are included in a logic device 513 enclosed in a logic device housing. The processor 510 may include any conventional processor or logic device configured to execute software allowing various configuration and reconfiguration tasks such as, for example: a) communicating with a remote source via communication interface 506, such as a server that stores authentication information or games; b) converting signals read by an interface to a format corresponding to that used by software or memory in the gaming system; c) accessing memory to configure or reconfigure game parameters in the memory according to indicia read from the device; d) communicating with interfaces, various peripheral devices and/or I/O devices; e) operating peripheral devices such as, for example, card readers, paper ticket readers, etc.; f) operating various I/O devices such as, for example, displays 535, input devices 530; etc. For instance, the processor 510 may send messages including game play information to the displays 535 to inform players of game play/event information, wagering information, and/or other desired information.

In at least one implementation, the gaming system may include card readers such as used with credit cards, or other identification code reading devices to allow or require player identification in connection with play of the card game and associated recording of game action. Such a player identification interface can be implemented in the form of a variety of magnetic card readers commercially available for reading a player-specific identification information. The player-specific information can be provided on specially constructed magnetic cards issued by a casino, or magnetically coded credit cards or debit cards frequently used with national credit organizations such as VISA, MASTERCARD, AMERICAN EXPRESS, or banks and other institutions.

The gaming system may include other types of participant identification mechanisms which may use a fingerprint image, eye blood vessel image reader, or other suitable biological information to confirm identity of the player. Such personalized identification information could also be used to confirm credit use of a smart card, transponder, and/or player's personal player input device (e.g., UID).

The gaming system 500 also includes memory 516 which may include, for example, volatile memory (e.g., RAM 509), non-volatile memory 519 (e.g., disk memory, FLASH memory, EPROMs, etc.), unalterable memory (e.g., EPROMs 508), etc. The memory may be configured or designed to store, for example: 1) configuration software 514 such as all the parameters and settings for a game playable on the gaming system; 2) associations 518 between configuration indicia read from a device with one or more parameters and settings; 3) communication protocols allowing the processor 510 to communicate with peripheral devices and I/O devices 4) a secondary memory storage device 515 such as a non-volatile memory device, configured to store gaming software related information (e.g., the gaming software related information and memory may be used to store various audio files and games not currently being used and invoked in a configuration or reconfiguration); 5) communication transport protocols (e.g., such as, for example, TCP/IP, USB, Firewire, IEEE1394, Bluetooth, IEEE 802.11× (e.g., IEEE 802.11 standards), hiperlan/2, HomeRF, etc.) for allowing the gaming system to communicate with local and non-local devices using such protocols; etc. In one implementation, the master gaming controller 512 communicates using a serial communication protocol. A few examples of serial communication protocols that may be used to communicate with the master gaming controller include but are not limited to USB, RS-232 and Netplex (e.g., a proprietary protocol developed by IGT, Reno, Nev.).

A plurality of device drivers 552 may be stored in memory 516. Example of different types of device drivers may include device drivers for gaming system components, device drivers for gaming system components, etc. Typically, the device drivers 552 utilize a communication protocol of some type that enables communication with a particular physical device. The device driver abstracts the hardware implementation of a device. For example, a device drive may be written for each type of card reader that may be potentially connected to the gaming system. Examples of communication protocols used to implement the device drivers include Netplex, USB, Serial, Ethernet, Firewire, I/0 debouncer, direct memory map, serial, PCI, parallel, RF, Bluetooth™, near-field communications (e.g., using near-field magnetics), 802.11 (e.g., WiFi), etc. Netplex is a proprietary IGT standard while the others are open standards. According to a specific embodiment, when one type of a particular device is exchanged for another type of the particular device, a new device driver may be loaded from the memory 516 by the processor 510 to allow communication with the device. For instance, one type of card reader in gaming system 500 may be replaced with a second type of card reader where device drivers for both card readers are stored in the memory 516.

In some embodiments, the software units stored in the memory 516 may be upgraded as needed. For instance, when the memory 516 is a hard drive, new games, game options, various new parameters, new settings for existing parameters, new settings for new parameters, device drivers, and new communication protocols may be uploaded to the memory from the master gaming controller 512 or from some other external device. As another example, when the memory 516 includes a CD/DVD drive including a CD/DVD designed or configured to store game options, parameters, and settings, the software stored in the memory may be upgraded by replacing a first CD/DVD with a second CD/DVD. In yet another example, when the memory 516 uses one or more flash memory 519 or EPROM 508 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming system 500 may also include various authentication and/or validation components 544 which may be used for authenticating/validating specified gaming system components such as, for example, hardware components, software components, firmware components, information stored in the gaming system memory 516, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

Sensors 560 may include, for example, optical sensors, pressure sensors, RF sensors, Infrared sensors, motion sensors, audio sensors, image sensors, thermal sensors, biometric sensors, etc. As mentioned previously, such sensors may be used for a variety of functions such as, for example: detecting the presence and/or monetary amount of gaming chips which have been placed within a player's wagering zone; detecting (e.g., in real time) the presence and/or monetary amount of gaming chips which are within the player's personal space; etc.

In one implementation, at least a portion of the sensors 560 and/or input devices 530 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming system player may include input functionality for enabling players to provide their game play decisions/instructions (e.g., and/or other input) to the EGD using the touch keys and/or other player control sensors/buttons. Additionally, such input functionality may also be used for allowing players to provide input to other devices in the casino gaming network (e.g., such as, for example, player tracking systems, side wagering systems, etc.)

Wireless communication components 556 may include one or more communication interfaces having different architectures and utilizing a variety of protocols such as, for example, 802.11 (e.g., WiFi), 802.15 (e.g., including Bluetooth™), 802.16 (e.g., WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

An example of a near-field communication protocol is the ECMA-340 "Near Field Communication-Interface and Protocol (e.g., NFCIP-1)", published by ECMA International (e.g., www.ecma-international.org), herein incorporated by reference in its entirety for all purposes. It will be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 5 devices using such wireless communication protocols.

Power distribution components 558 may include, for example, components or devices which are operable for providing wireless power to other devices. For example, in one implementation, the power distribution components 558 may include a magnetic induction system which is adapted to provide wireless power to one or more portable UIDs at the gaming system. In one implementation, a UID docking region may include a power distribution component which is able to recharge a UID placed within the UID docking region without requiring metal-to-metal contact.

In at least one embodiment, motion/gesture detection component(s) 551 may be configured or designed to detect player movements and/or gestures and/or other input data from the player. In some embodiments, each gaming system may have its own respective motion/gesture detection component(s). In other embodiments, motion/gesture detection component(s) 551 may be implemented as a separate subsystem of the gaming system which is not associated with any one specific gaming system or device.

Figure 19:
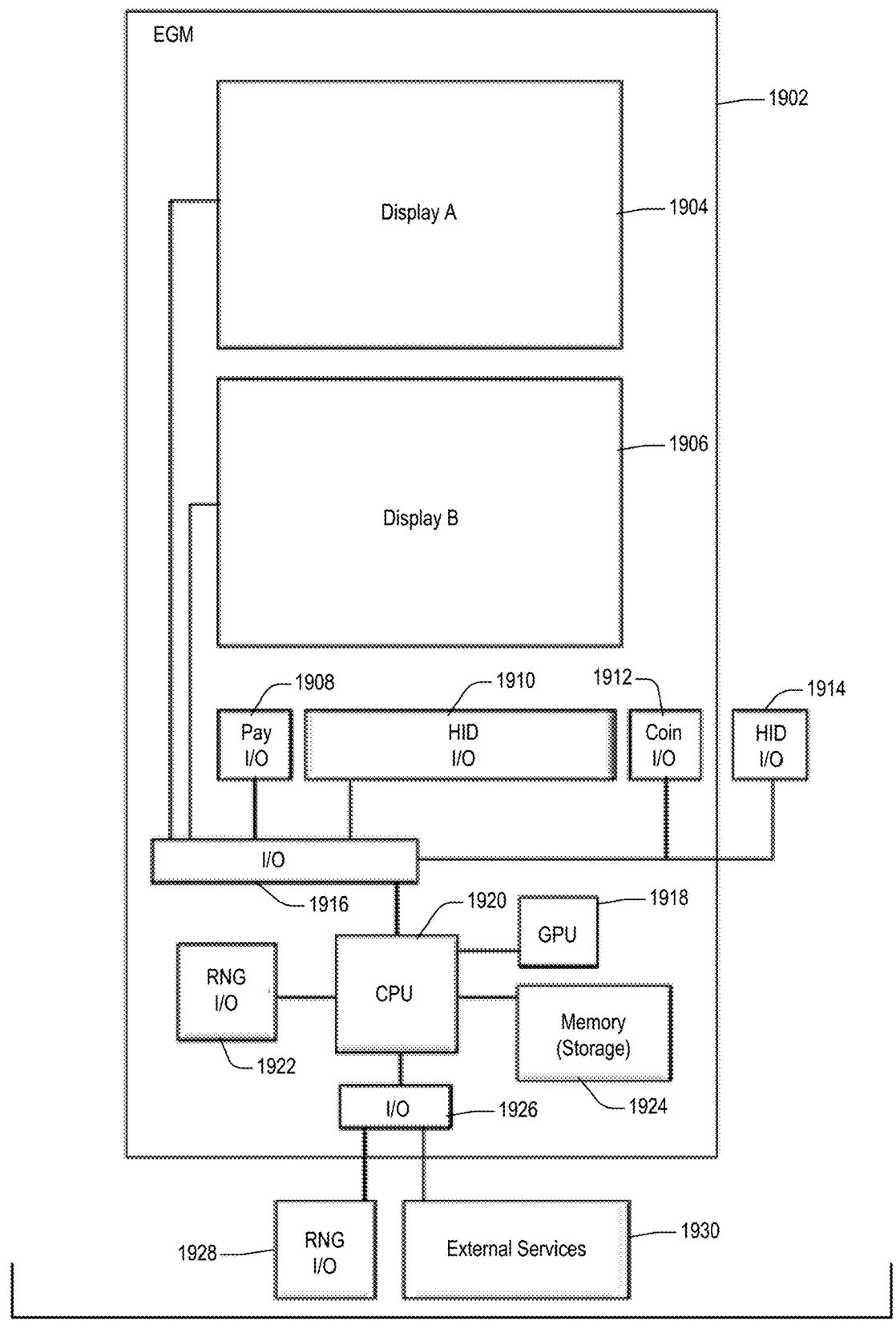
FIG. 19 shows a block diagram of electronic gaming machine (e.g., EGM), in accordance with a specific embodiment.

FIG. 19 shows an example block diagram of an alternate embodiment of an electronic gaming machine which may be configured or designed to implement one or more of the hybrid arcade/wager-based gaming aspects described herein. As illustrated in the example embodiment of FIG. 19, the electronic gaming machine 1900 may include, but are not limited to, one or more of the following component(s) (or combinations thereof):
  One or more display(s) (1904, 1906).
  HID I/O component(s) (1910, 1914).
  Payout I/O component(s) (1908).
  Cash/Credit/Coin I/O c component(s) (1912).
  CPUs/Processor(s)/Gaming Controller(s) (1920).
  Memory (1924).
  One or more Graphics Processor(s) (GPU) (1918).
  RNG Engine component(s) (1922, 1928).
  Other I/O component(s) (1916, 1926).
  Interface(s) to one or more External Services (1930).

FIG. 6 is a simplified block diagram of an exemplary mobile gaming device 600 in accordance with a specific embodiment. In at least one embodiment, one or more players may participate in a wager-based, arcade-style video game session using mobile gaming devices. In at least some embodiments, the mobile gaming device may be configured or designed to include or provide functionality which is similar to that of an electronic gaming device (e.g., EGD) such as that described, for example, in FIG. 4.

As illustrated in the example of FIG. 6, mobile gaming device 600 may include a variety of components, modules and/or systems for providing various functionality. For example, as illustrated in FIG. 6, mobile gaming device 600 may include Mobile Device Application components (e.g., 660), which, for example, may include, but are not limited to, one or more of the following (e.g., or combinations thereof):
  UI Components 662 such as those illustrated, described, and/or referenced herein.
  Database Components 664 such as those illustrated, described, and/or referenced herein.
  Processing Components 666 such as those illustrated, described, and/or referenced herein.
  Other Components 668 which, for example, may include components for facilitating and/or enabling the mobile gaming device to perform and/or initiate various types of operations, activities, functions such as those described herein.

In at least one embodiment, the mobile gaming device may include Mobile Device App Component(s) which have been configured or designed to provide functionality for enabling or implementing at least a portion of the various hybrid arcade/wager-based game techniques at the mobile gaming device.

According to specific embodiments, various aspects, features, and/or functionalities of the mobile gaming device may be performed, implemented and/or initiated by one or more of the following types of systems, components, systems, devices, procedures, processes, etc. (e.g., or combinations thereof):
  Processor(s) 610
  Device Drivers 642
  Memory 616
  Interface(s) 606
  Power Source(s)/Distribution 643
  Geolocation module 646
  Display(s) 635
  I/O Devices 630
  Audio/Video devices(s) 639
  Peripheral Devices 631
  Motion Detection module 640
  User Identification/Authentication module 647
  Client App Component(s) 660
  Other Component(s) 668
  UI Component(s) 662
  Database Component(s) 664
  Processing Component(s) 666
  Software/Hardware Authentication/Validation 644
  Wireless communication module(s) 645
  Information Filtering module(s) 649
  Operating mode selection component 648
  Speech Processing module 654
  Scanner/Camera 652
  OCR Processing Engine 656
  etc.

Figure 7:
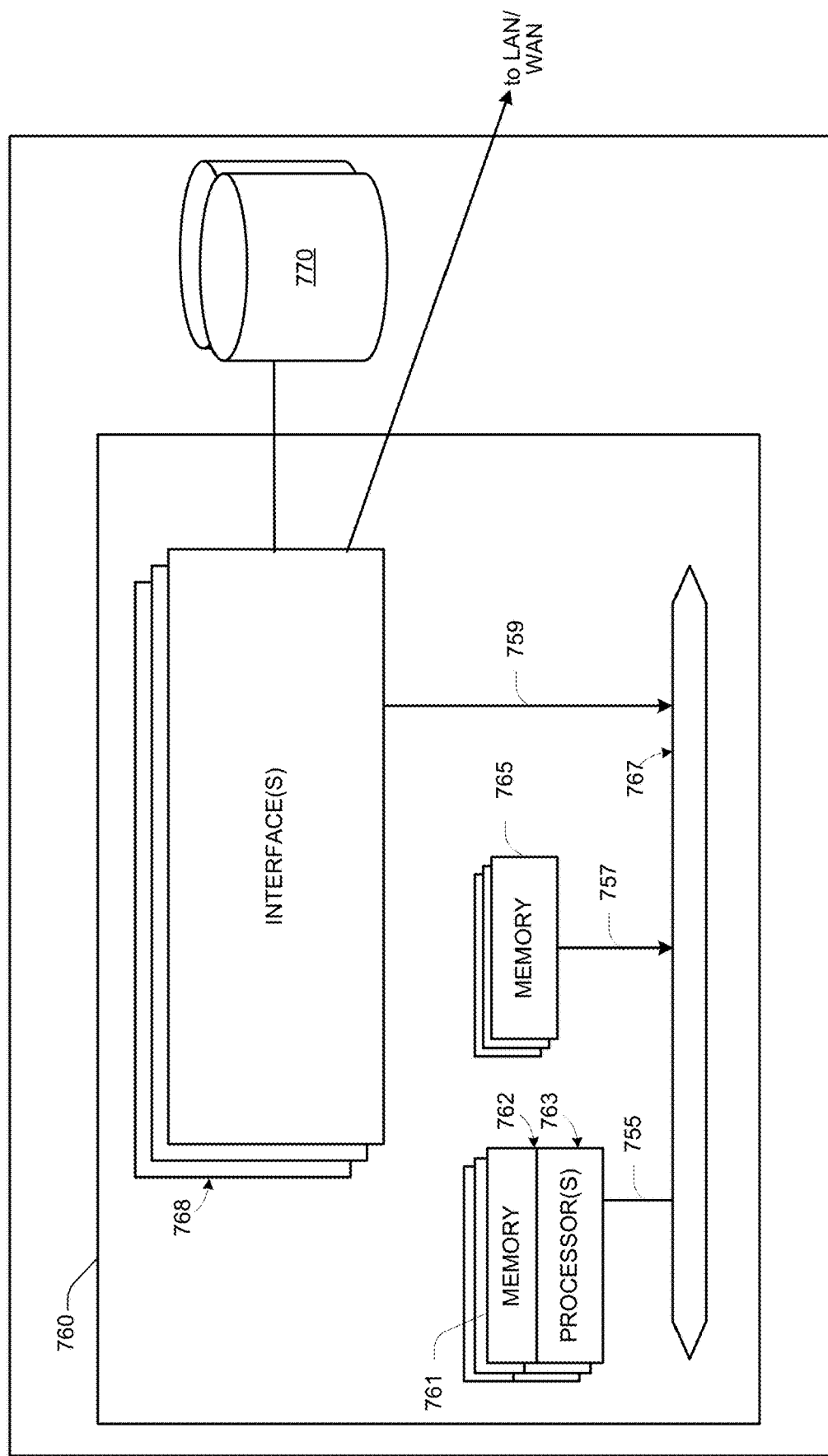
FIG. 7 illustrates an example embodiment of a System Server 780 which may be used for implementing various aspects/features described herein.

FIG. 7 illustrates an example embodiment of a system server 780 which may be used for implementing various aspects/features described herein. In at least one embodiment, the system server 780 includes at least one network device 760, and at least one storage device 770 (e.g., such as, for example, a direct attached storage device). In one embodiment, system server 780 may be suitable for implementing at least some of the hybrid arcade/wager-based game techniques described herein.

In according to one embodiment, network device 760 may include a master central processing unit (e.g., CPU) 762, interfaces 768, and a bus 767 (e.g., a PCI bus). When acting under the control of appropriate software or firmware, the CPU 762 may be responsible for implementing specific functions associated with the functions of a desired network device. For example, when configured as a server, the CPU 762 may be responsible for analyzing packets; encapsulating packets; forwarding packets to appropriate network devices; instantiating various types of virtual machines, virtual interfaces, virtual storage volumes, virtual appliances; etc. The CPU 762 preferably accomplishes at least a portion of these functions under the control of software including an operating system (e.g., Linux), and any appropriate system software (e.g., such as, for example, AppLogic (e.g., TM) software).

CPU 762 may include one or more processors 763 such as, for example, one or more processors from the AMD, Motorola, Intel and/or MIPS families of microprocessors. In an alternative embodiment, processor 763 may be specially designed hardware for controlling the operations of system server 780. In a specific embodiment, a memory 761 (e.g., such as non-volatile RAM and/or ROM) also forms part of CPU 762. However, there may be many different ways in which memory could be coupled to the system. Memory block 761 may be used for a variety of purposes such as, for example, caching and/or storing data, programming instructions, etc.

The interfaces 768 may be typically provided as interface cards (e.g., sometimes referred to as "line cards"). Alternatively, one or more of the interfaces 768 may be provided as on-board interface controllers built into the system motherboard. Generally, they control the sending and receiving of data packets over the network and sometimes support other peripherals used with the system server 780. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (e.g., WiFi) interfaces, 802.15 interfaces (e.g., including Bluetooth™), 802.16 (e.g., WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

In at least one embodiment, some interfaces may be configured or designed to allow the system server 780 to communicate with other network devices associated with various local area network (e.g., LANs) and/or wide area networks (e.g., WANs). Other interfaces may be configured or designed to allow network device 760 to communicate with one or more direct attached storage device(s) 770.

Although the system shown in FIG. 7 illustrates one specific network device described herein, it is by no means the only network device architecture on which one or more embodiments can be implemented. For example, an architecture having a single processor that handles communications as well as routing computations, etc. may be used. Further, other types of interfaces and media could also be used with the network device.

Regardless of network device's configuration, it may employ one or more memories or memory modules (e.g., such as, for example, memory block 765, which, for example, may include random access memory (e.g., RAM)) configured to store data, program instructions for the general-purpose network operations and/or other information relating to the functionality of the various hybrid arcade/wager-based game techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (e.g., ROM) and random access memory (e.g., RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
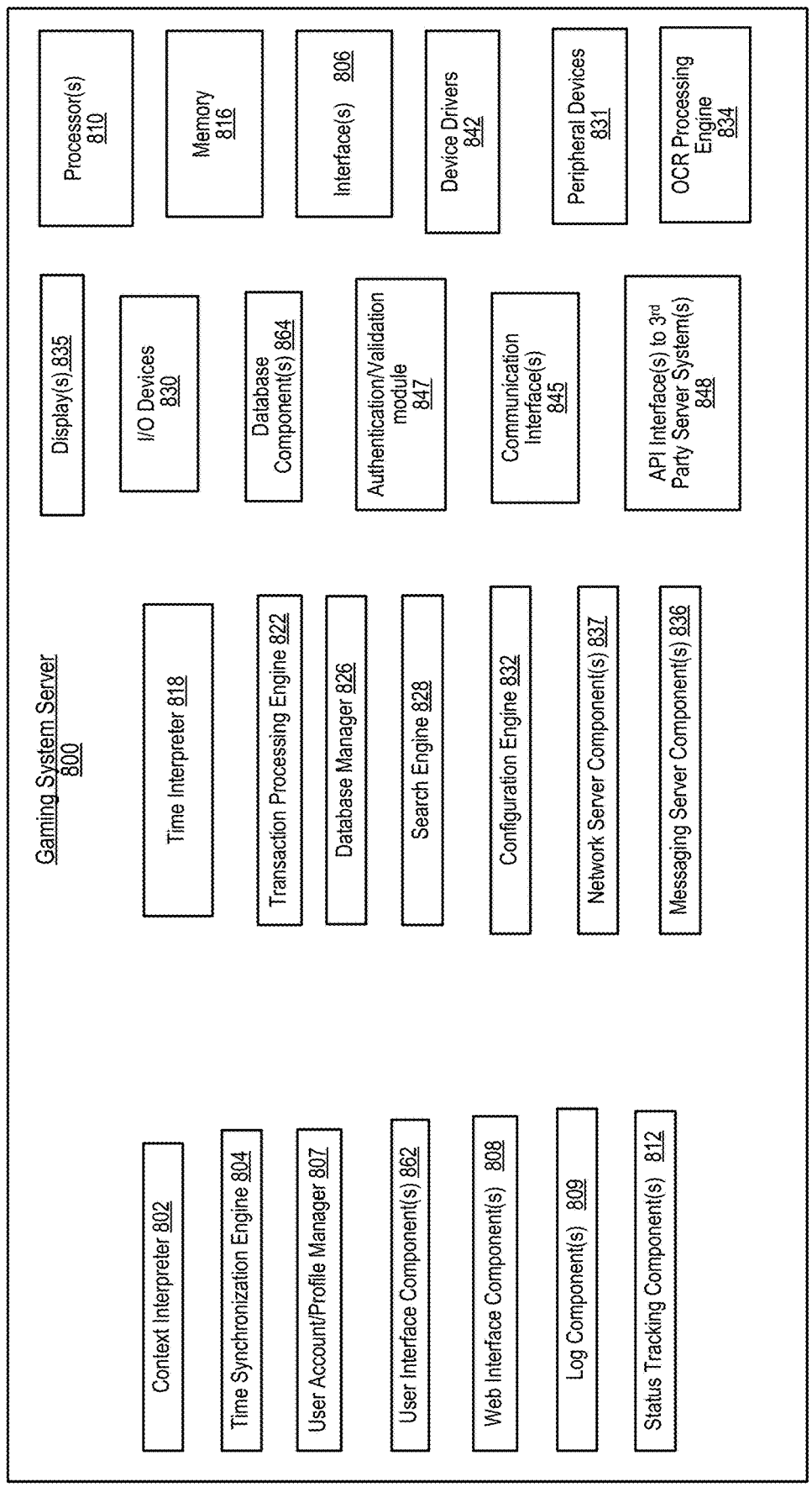
FIG. 8 illustrates an example of a functional block diagram of a Gaming System Server in accordance with a specific embodiment.

FIG. 8 illustrates an example of a functional block diagram of a Gaming System Server in accordance with a specific embodiment. In at least one embodiment, the Virtual Live electronic gaming device System Server may be operable to perform and/or implement various types of functions, operations, actions, and/or other features, such as, for example, one or more of those described and/or referenced herein.

In at least one embodiment, the Gaming System Server may include a plurality of components operable to perform and/or implement various types of functions, operations, actions, and/or other features such as, for example, one or more of the following (e.g., or combinations thereof):

Context Interpreter (e.g., 802) which, for example, may be operable to automatically and/or dynamically analyze contextual criteria relating to a detected set of event(s) and/or condition(s), and automatically determine or identify one or more contextually appropriate response(s) based on the contextual interpretation of the detected event(s)/condition(s). According to different embodiments, examples of contextual criteria which may be analyzed may include, but are not limited to, one or more of the following (e.g., or combinations thereof):
  location-based criteria (e.g., geolocation of mobile gaming device, geolocation of EGD, etc.)
  time-based criteria
  identity of user(s)
  user profile information
  transaction history information
  recent user activities
  etc.
Time Synchronization Engine (e.g., 804) which, for example, may be operable to manage universal time synchronization (e.g., via NTP and/or GPS)
Search Engine (e.g., 828) which, for example, may be operable to search for transactions, logs, game history information, player information, hybrid arcade/wager-based game information, etc., which may be accessed from one or more local and/or remote databases.
Configuration Engine (e.g., 832) which, for example, may be operable to determine and handle configuration of various customized configuration parameters for one or more devices, component(s), system(s), process(es), etc.
Time Interpreter (e.g., 818) which, for example, may be operable to automatically and/or dynamically modify or change identifier activation and expiration time(s) based on various criteria such as, for example, time, location, transaction status, etc.
Authentication/Validation Component(s) (e.g., 847) (e.g., password, software/hardware info, SSL certificates) which, for example, may be operable to perform various types of authentication/validation tasks such as one or more of those described and/or referenced herein.
Transaction Processing Engine (e.g., 822) which, for example, may be operable to handle various types of transaction processing tasks such as, for example, one or more of those described and/or referenced herein.
OCR Processing Engine (e.g., 834) which, for example, may be operable to perform image processing and optical character recognition of images such as those captured by a gaming device camera, for example.
Database Manager (e.g., 826) which, for example, may be operable to handle various types of tasks relating to database updating, database management, database access, etc. In at least one embodiment, the Database Manager may be operable to manage game history databases, player tracking databases, etc.
Log Component(s) (e.g., 809) which, for example, may be operable to generate and manage transactions history logs, system errors, connections from APIs, etc.
Status Tracking Component(s) (e.g., 812) which, for example, may be operable to automatically and/or dynamically determine, assign, and/or report updated transaction status information based, for example, on the state of the transaction.
Gateway Component(s) which, for example, may be operable to facilitate and manage communications and transactions with external Payment Gateways.
Web Interface Component(s) (e.g., 808) which, for example, may be operable to facilitate and manage communications and transactions with virtual live electronic gaming device web portal(s).
API Interface(s) to Gaming System Server(s) which, for example, may be operable to facilitate and manage communications and transactions with API Interface(s) to Gaming System Server(s)
API Interface(s) to 3rd Party System Server(s) (e.g., 848) which, for example, may be operable to facilitate and manage communications and transactions with API Interface(s) to 3rd Party System Server(s)
At least one processor 810. In at least one embodiment, the processor(s) 810 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of a gaming system. In a specific embodiment, a memory (e.g., such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.
Memory 816, which, for example, may include volatile memory (e.g., RAM), non-volatile memory (e.g., disk memory, FLASH memory, EPROMs, etc.), unalterable memory, and/or other types of memory. In at least one implementation, the memory 816 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile gaming system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein.
Interface(s) 806 which, for example, may include wired interfaces and/or wireless interfaces. In at least one implementation, the interface(s) 806 may include functionality similar to at least a portion of functionality implemented by one or more computer system interfaces such as those described herein and/or generally known to one having ordinary skill in the art.
Device driver(s) 842. In at least one implementation, the device driver(s) 842 may include functionality similar to at least a portion of functionality implemented by one or more computer system driver devices such as those described herein and/or generally known to one having ordinary skill in the art.
One or more display(s) 835.
Messaging Server Component(s) 836, which, for example, may be configured or designed to provide various functions and operations relating to messaging activities and communications.
Network Server Component(s) 837, which, for example, may be configured or designed to provide various functions and operations relating to network server activities and communications.

User Account/Profile Manager component(s) 807.

Etc.

Figure 9:
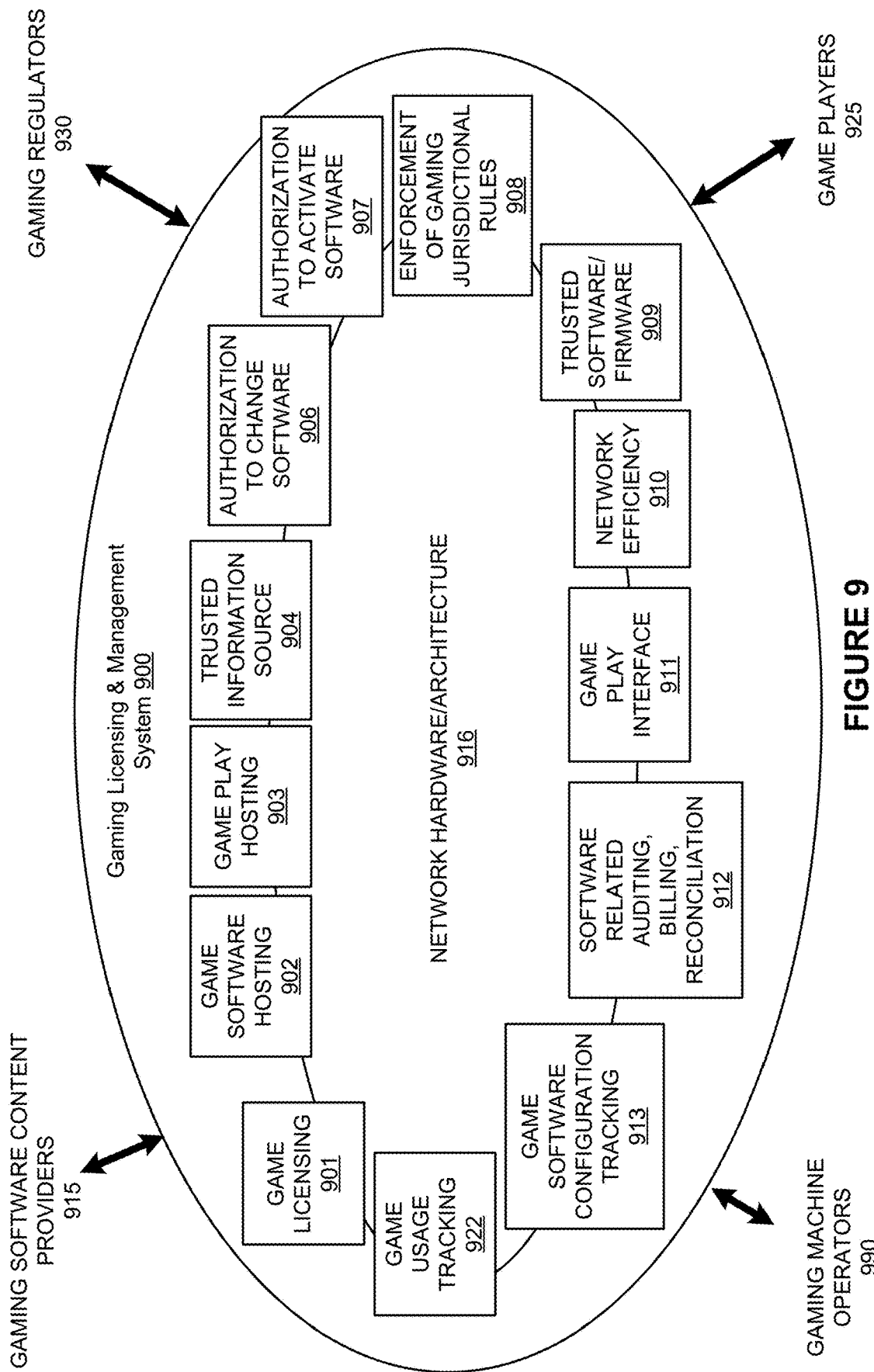
FIG. 9 shows a block diagram illustrating components of a gaming system 900 which may be used for implementing various aspects of example embodiments.

FIG. 9 shows a block diagram illustrating components of a gaming system 900 which may be used for implementing various aspects of example embodiments. In FIG. 9, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 9, only one instance of each function is shown. The functions of the components may be combined. For example, a single device may comprise the game play interface 911 and include trusted memory devices or sources 909.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 9. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 9) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 922 may track the usage of game software on a plurality of devices in communication with the host. The game usage-tracking host 922 may be in communication with a plurality of game play hosts and gaming machines. From the game play hosts and gaming machines, the game usage tracking host 922 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min wagers). Details of a game software host and a game software configuration host that may be used with example embodiments are described in co-pending U.S. Pat. No. 6,645,077, by Rowe, titled, "Gaming Terminal Data Repository and Information System," filed Dec. 91, 9000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to allow the use of software or product activation codes used to activate software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities. In another example of an embodiment, the remote device and the trusted information source may engage in methods using zero knowledge proofs to authenticate each of their respective identities. Details of zero knowledge proofs that may be used with example embodiments are described in US publication no. 9003/0203756, by Jackson, filed on Apr. 95, 9002 and titled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of example embodiments may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with example embodiments is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum wager limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, e.g., game software approved for use on gaming devices by a local gaming jurisdiction may be required on gaming devices on the gaming machine.

In example embodiments, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in example embodiments, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in example embodiments may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 9. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of example embodiments described herein.

Additional Benefits/Features/Embodiments

Different embodiments of the hybrid arcade/wager-based gaming techniques described herein may be adapted and implemented in a variety of environments. For example, the hybrid arcade/wager-based gaming techniques described herein are particularly well suited for deployment in any business establishments that house wager-based gaming devices (e.g., class 3 and/or class 2). Additionally, the hybrid arcade/wager-based gaming techniques described herein may appeal to younger gamblers/gamers who enjoy playing arcade-style video games, middle aged gamblers/gamers who may have played some video games, and possibly even veteran gamblers who may be bored with existing wager-based video gaming technology.

The hybrid arcade/wager-based gaming techniques described herein provide the ability for patrons of casinos and other gaming establishments to experience new and exciting ways of engaging in wager-based video game play with minimized learning curve and intimidation factors. Additionally, using the hybrid arcade/wager-based gaming techniques described herein, casinos and other gaming establishments hosting such hybrid arcade/wager-based gaming devices may increase their revenue by ensuring that the number of wager-based gaming event(s) occurring in a hybrid arcade/wager-based game (e.g., during specified time period) meet minimum specified threshold criteria.

One of the benefits of the hybrid arcade/wager-based gaming techniques described herein is that it provides the ability for traditional video-type wager-based games (such as those deployed at Casino establishments) to be quickly and easily converted to hybrid-type arcade/wager-based games in a manner which is already compliant with existing rules and regulations governing wager-based gaming, and/or in a manner which may avoid or significantly reduce requirements for additional regulatory approval. For example, in some embodiments, the hybrid arcade/wager-based gaming system may include functionality for providing a new display method and interaction thereof for currently approved wager-based games and/or wager-based gaming machines such as, for example, video-style wager-based games/gaming machines which have already been approved (and/or deployed) for player use in one or more gaming jurisdictions.

It may be appreciated that currently existing gaming technology and associated gaming regulations do not allow for "mega title" arcade-type games (e.g., Call Of Duty, Assassin's Creed, etc.) to be directly implemented within gambling gameplay. One reason for this is that any new wager-based game must first obtain various gaming regulatory approvals before being allowed to be deployed in designated gaming jurisdictions.

However, if one were to desire to implement a "Call Of Duty" (COD) hybrid arcade/wager-based game, companies and developers (among other legal and regulatory bodies) may collaborate to create such product (e.g., supply source files and asset libraries, etc.) which may be assembled to conform to desired design/gameplay specifications (such as one or more of those described herein).

In at least some embodiments, it is not possible to simply install and run COD (or other "mega title" arcade-type games) on an existing gaming machine, and have it perform as a hybrid arcade/wager-based game described herein. Some elements of gameplay may need to be altered in order to achieve and/or provide various hybrid arcade/wager-based game (HAWG) functionalities. In some embodiments, the initial process to get a hybrid arcade/wager-based game "on the floor" (e.g., deployed on a casino gaming floor) may take some time (e.g., 4-8 months, including, for example, an amount of time to build the hybrid arcade/wager-based game). However, this timeframe may be significantly shorter than the timeframes typically required for getting traditional wager-based gaming machines deployed "on the floor". One reason for this is that the hybrid arcade/wager-based game technology described herein provides the capability of seamless integration with pre-licensed products, such as, for example, IGT's Ghostbusters Video Slots. For example, in one embodiment, in a relatively short time period, a gaming machine manufacturer/distributor (such as IGT, Bally's, Aristocrat, etc.) could develop a hybrid arcade/wager-based game version that capitalizes on the popularity of an existing licensed game-theme by providing a newer HAWG-type "gamer" version which incorporates a version of the existing licensed game-theme.

With respect to hybrid arcade/wager-based gameplay, in at least some embodiments, HAWG may not require "points" to reach or obtain game levels. Rather, in some embodiments, HAWG allows freedom of play by allowing a player simply "continue on" by purely playing the game. This design allows for player defined gameplay progression.

In at least some embodiments, HAWG may provide a novel slot machine gaming/player interface which does not require the use of "new backend systems". For example, take IGT's "Big Buck Hunter" slot game, which has already obtained regulatory approval in many existing gaming jurisdictions. Using HAWG technology, IGT could build, or have built, a new themed game "Zombies" which could conform to HAWG design, load "Zombies" into the "Big Buck Hunter" EGM memory, and substitute the display of "Zombies" in place of the "Buck" characters (e.g., traditionally displayed in the Big Buck Hunter game). Upon doing so, certification labs such as GLI may have no issues in the approval process for the "Zombies" hybrid arcade/wager-based game, since the functionality and mathematical algorithms driving both the Zombies hybrid arcade/wager-based game and the Big Buck Hunter game have already been reviewed and approved.

In at least some embodiments, HAWG provides a conjoined and seamless entity wherein the act of wagering is based (at least partially) on the players physical ability to press a button and/or pull a trigger while "holding" a device (e.g., HID) and visually understanding the relationship/nature of the style/theme of game in which they are involved and the process(es) thereof needed to play said game.

For example, a standard slot machine may require a player to
 put money in machine;
 select wager;
 initiate wager (via HID);
 be informed of results; and
 repeat wager initiation if desired.

For some HAWG embodiments, the process may involve similar steps, plus one or more additional step(s) involving the player operating a HID in order to interact with (e.g., shoot, grab, touch, avoid, etc.) virtual objects displayed on EGM display screen.

In one embodiment, the only "skills" required are human motor skills (e.g., "fine motor skills") such as hand/eye coordination, to perform various arcade-type game activities such as, for example: point or navigate a reticle onto a NPC (e.g., zombie/alien), pull/press trigger/button, etc. In at least some embodiments, there are no "skillful requirements" needed for participating in a hybrid arcade/wager-based game. Further, in various embodiments, no skill is needed or required for participating in the wager-based game event portion of the hybrid arcade/wager-based game. In fact, in at least some embodiments, it is preferable the wager-based game event portion be implemented as a RNG-based game of chance. In this way, HAWG may be designed to be simple and fun without separation of entertainment and gambling.

Other benefits/features/advantages of the various hybrid arcade/wager-based game embodiments described herein may include, but are not limited to, one or more of the following (or combinations thereof):

- In some embodiments, the triggering event may be caused by the destruction or damage of a NPC.
- In some embodiments, the triggering event may be caused by the collision of a player character with a specific graphic and/or symbol (e.g., which may be clearly defined in paytables (conforms to GLI)).
- In some embodiments, the triggering event may be caused by a "scoring event" such as, for example, making a basket, touchdown, goal, etc.
- In some embodiments, the triggering event may be caused by a "timer and/or distance event" such as, for example, a checkpoint, lap marker, distance meter, etc.
- In some embodiments, the wager initiation triggering rate may be directly controlled by the player and their "choice driven thought processes" which dictate the actual frequency of wager-based events via HID interaction.
- In some embodiments, HAWG may be configured or designed as a seamless design of entertainment and wager-based events structured on current slot machine functionality, design, and regulations approval.
- In some embodiments, hybrid arcade/wager-based games may be configured or designed in a manner which may not use/require the need for additional modules, agents, engines, profiles, or systems for wager determinations.
- In some embodiments, hybrid arcade/wager-based games may be configured or designed in a manner which may not use/require the need for "points" and/or "accrued variables" from "skillful play" to trigger wagers in gambling games.
- In some embodiments, the lack of need for "points" and/or "accrued variables" from "skillful play" to trigger wager-based gaming events allows for no increase or decrease in wagering odds; it may be in turn, controlled by the player.
- In some embodiments, hybrid arcade/wager-based games may be configured or designed in a manner which avoids disruption of game play during execution of wager-based game events. For example, in at least some embodiments, there may be no disruption from game play and/or wager-based events by use and/or display of "pop-ups" or GUI's requiring player to "accept/decline" a wager initiation event.
- In some embodiments, a player "chooses" to wager by playing the game (e.g., like current slot machines). "Odds of wagering events" may be based solely on whether or not the player wants to play and the player's desired frequency of ("spin") button interactions.
- In some embodiments, increasing your wager amount may "increase odds of winning" (or rather "chance of winning"—e.g., 1 line vs max bet, wherein some games grant bonus rounds and/or jackpots based on a max bet wager only), but may not guarantee pay out.
- In some embodiments, "bonus rounds and/or features" may be triggered in the same format as current slot machines wherein a specific set of symbols and/or gameplay scenarios correspond with paytable information (e.g., thereby conforming to GLI).
- In some embodiments, HAWG may not use/require the need or consumption of in-game "points" and/or "accrued variables" to supply player characters with in-game necessities suited for level progression, such as, for example, ammunition. For example, in such cases as say, an RPG HAWG embodiment, there may exist "experience points" (XP) that may be accrued in-game and used with player character attributes and story-line, and do not correspond to the aforementioned "points" and/or "accrued variables" used for "purchasing" in-game items.
- In some embodiments, HAWG games may be not designed to get "shaped" by player skill; one or more player demographic engages in the same experience.
- In some embodiments, HAWG games do not use/require in-game "points, elements and/or variables" which may be associated with actual EGM credits.
- In some embodiments, HAWG games do not use/require in-game "points, elements and/or variables" which may be not associated with actual EGM credits to have the possibility of being "paid out" as cash or monetary valued items (not to be confused with player club card points and/or session based points which may have exclusive pay-outs based on jurisdiction/regulations/property preferences).
- In some embodiments, HAWG may not require the need/use to "stack" or "store" "points, credits, etc." which allow for access to specific/next/continuing gameplay levels. A player may simply play the hybrid arcade/wager-based game, and through the act of playing, one naturally progresses through the levels. If one decides to stop playing, the level and/or gameplay may remain in an "idle state." Should their player character "die" (e.g., killed by zombies), the level and/or gameplay may restart from either beginning of the level and/or level checkpoint (depending on game theme/style) with no bearing on any sort of "accrued variable."
- In some embodiments, HAWG design may not use/require any "exclusively skill based" and/or "skill/chance based" events for determining wager outcome.
- In some embodiments, HAWG games may be not "skill based" nor may be they designed to assess player skill levels and/or calibrate gambling
- In some embodiments, a player's information may be stored (e.g., in the cloud, via use of a player club card, etc.) allowing for continued stats and level placement. For example, player may save and later resume play of an RPG HAWG where a player has reached "level 27" with (x) amount of enhanced characters etc. In some embodiments, the player's data may be in the form of a JSON string, etc.) on game themes designed for extended play. In other embodiments, a player's data may not be not stored.

In some embodiments, there may exist the possibility of "micro-transactions" wherein the transactional item(s) may be based on aesthetics and bare no relevance to wager-based events and/or gameplay functionality necessities (e.g., ammunition etc.).

In some embodiments, the transactional ability to customize character avatars, weapon and armor skins etc. may promote additional sources of house income based on property preferences and jurisdiction and regulatory requirements. An example of such item could be a limited time based promotion such as, for example, a "custom property themed baseball cap" that could be fitted onto a player character and/or player avatar. Micro-transactions may be based on various sources, player club points, monetary value, one time redemption coupons, etc. For example, some casino properties may "give" a specific quantity of money or credits of free play to a patron; in most cases, that monetary value cannot be redeemed, it must be played, wherein the possibility may exist for a patron to "spend" their amount on micro-transactions (e.g., allowing the house to eventually get their "gift" back).

In some embodiments, the theme of a HAWG game may allow the possibility of non-point related gameplay bonuses, such as, for example, the Zombie shooter game may have themed reel symbols such as, brains, chain-saws, ammunition, med-kits etc. which, when lined up with corresponding paytable information, may have an effect on the player character etc. For example, let's say 2 med-kits appear from left to right on a three reel single lined slot game, not only may the player have a winning payout, but the med-kits may offer "medical-aid" to the players health bar.

In some embodiments, hybrid arcade/wager-based games may be configured or designed in a manner which may not use/require any type of "skill-based", "variable-skill based", and/or "chance skill-based" subcomponents, engines, or modules that may alter, dictate, determine, assess, selectively detect, influence, manipulate, change, etc. any of the gameplay, game-layout, game-intensity, ease/difficulty, success/failure, win/loss, RNG, wagers, and/or outcomes etc.

In some embodiments, hybrid arcade/wager-based games may be configured or designed as "interactive games of chance."

In some embodiments, there may be no secondary and/or extra symbols or graphics which get generated via HID interaction that relate to and/or assimilate to wager-based symbols found on slot reels. In HAWG, when the triggering criteria may be met the "reels" spin just like a regular slot machine. There may be no individually triggered reel spins and/or "time-lags" between the reels (e.g., there may be no need for a trigger event that must happen to spin/stop individual reels in order to "stack" or "assess" symbols based on gameplay "prowess" and/or wager-based trigger events), thereby allowing for the wagered outcome to be displayed nearly instant to the player once the conditions have been met.

In some embodiments, "killing" a "zombie" (death of a NPC) may require multiple "shots" to be fired.

In some embodiments, body shots/may require more shots to kill

In some embodiments, "headshot" may be an instant kill (e.g., except for bosses etc.)

In some embodiments, larger bosses may have weak spot indicators (e.g., bright spots or graphical "holograms") which highlight areas for players to destroy.

In some embodiments, events relating to the "destroying specific objects" (e.g., driving through "rings") may be clearly defined within HAWG paytable (and accessible/visible to the player).

In some embodiments, "damaging" NPC's (as in a role playing game scenario where battles take a "turn based" layout) and may require more time in order to kill a NPC.

In some embodiments, different themed gameplay scenarios (e.g., cross a finish line, checkpoint, etc.) may trigger one or more wager event(s).

In some embodiments, HAWG may be implemented as a new display method and interaction thereof for currently approved slot machines and/or other types of approved wager-based games.

In some HAWG embodiments, the triggering of one or more wager-based game events may be pre-defined in the associated HAWG paytable.

In some embodiments, HAWG may not require "objectives and/or "goals" to be reached (e.g., kill 15 out of 30 zombies to make it to the next level) in order to proceed with gameplay." In order for a player to proceed through the game, they simply play (interact), and by doing so, the design and nature of HAWG may progress. Even for a player who's "skill" isn't as equal to others may still be able to achieve similar gameplay results as a "highly skilled" player.

In some embodiments, HAWG may not correlate "rank" and/or "rank data" for determination of any sort of wager outcome or award pooling.

In some embodiments, HAWG may allow players to "choose" wager triggering event frequencies. In other embodiments, HAWG may not allow players to "choose" wager triggering event frequencies.

In some embodiments, HAWG may not require or have at least one triggering events to be selected from groups of various triggering events, such as, for example, a stage in a game, point accumulation, length of time, etc.

In some embodiments, HAWG may not require the "interactive game" be selected from a group such as, for example, "skill, partial skill, and/or pseudo skill".

In some embodiments, HAWG may not "terminate" gameplay when funds may be "too low to wager". For example, in at least one embodiment, HAWG may be configured or designed to allows for "visual enticement screens" (i.e. zombies attacking the screen etc.) more like an animated pause screen, which prompt the same player or perhaps a new/different player to continue by adding funds.

In some embodiments, HAWG design may not implement initiation of wager based event. Rather, in at least some embodiments, HAWG notifies the backend system when specific gamestate criteria have been met (similar to when a spin button may be pressed), whereupon the backend system implements the wager-based game event and subsequently provides the wager-based game event outcome to the HAWG for display at the EGM.

In some embodiments, HAWG may not select from groups of wagering event types and/or interactive games.

In some embodiments, NPC's and/or object which initiate wager based triggering events may be "surrounded" by graphics/animations similar to Wager Triggering objects.

In some embodiments, the player may be able to perform "projectile interaction" wherein the player may be able to (e.g.) "shoot" and/or "hit" a projectile directed toward their position (e.g. an acid spitting zombie may only be killed by "shooting" the projectile acid back at the zombie).

In some embodiments, the player may be able to interact with elements that do not initiate wager based events, such as, for example, "direction arrows or switches" where a player has a choice of left or right, up or down (etc.). In some embodiments, in order to continue in a particular direction (e.g., for rail controlled movement themes) a player may be required to choose a path.

In some HAWG embodiments, the outcome of a wager-based game event may be configured or designed to be dependent on HAWG's gamestate. In some embodiments, the design of gameplay may allow for additional events for both wager initiation and RNG outcome. For example, referring to the previously described Zombie shooter example, a player shoots a zombie in the head (headshot—which kills the zombie). The shot has been fired and upon the instant the zombie death animation begins, a wager triggering event is called which spins the slot reels. The slot reels may continue to spin until the zombie's epic death animation is complete, once so, another event is called which is the "RNG determination outcome" event. The outcome is then presented to the player through the backend system and displayed using HAWG's graphical user interface. One reason for the two events corresponding with a NPC destruction and the ending of a death animation is that it causes the wagered outcome event to dependent on HAWG's gamestate and may require two events to happen in order for a wagering outcome to be displayed.

In some embodiments, hybrid arcade/wager-based games may be configured or designed in a manner which allows for a unique credit display setup wherein, while the player is interacting within a specific level, a clearly defined display of gameplay earnings is shown to the player and once said level is complete, and/or player dies, and/or player no longer has credits, and/or player decides to discontinue play, the interactive game portion is "exited" and a "fun" animated display of tallied earnings as well as possible achievements are shown. This could be as simple as showing animated slot reels quickly spin through the collected earnings (e.g., via display of a fast free spin bonus wherein the reels have minimal or no anticipation). The nature of this configuration enables HAWG to provide for different types of experiential opportunities such as, for example, one or more of the following (or combinations thereof):

1.) Corresponding with previous embodiments wherein toggle-able HUD elements provide a more in depth gaming experience.
2.) Being the "end level points tally" seen in most popular games (even though earnings have already been individually displayed during gameplay) where the player "has a moment" to take it some or all in.
3.) Assuming a player decides to discontinue play before the level ending tally screen, their earnings are still theirs and allow for them to simply collect & leave the gaming machine.

In at least some embodiments, HAWG games may be developed using regulatory (e.g., GLI) approved third party engines such as, for example (Unreal, Unity) accompanied by a complex series of blueprints and code which, when compiled, creates a packaged executable ready for storage on a gaming machine, system, and/or device.

In some embodiments, gameplay achievements may be awarded which are not based on any wager-based and/or wagering outcome. These in-game achievements may be based on the theme and style of gameplay and may result from interaction with said themed game, for "fun." In one example, the very first shot fired on a zombie may provide a GUI/HUD pop-up that may say "Achievement unlocked—'First Blood'" which along with numerous other achievable themed outcomes may be displayed to the player after a level, or gameplay event which, in turn, offer an added sense of accomplishment to the player. This also brings a bit of "re-playability" to game themes, for example, when a list of possible achievements is displayed to a player, the achievements that have not been met may entice the player to replay the game in order to get some or all possible achievements.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A computer implemented method employed in a computer network, the computer network including a first electronic, wager-based gaming device, and a first random number generator engine, the first electronic gaming device including a first display and a first input device, the method comprising causing at least one processor to execute a plurality of instructions stored in at least one non-transient memory to:
    control an interactive, hybrid arcade/wager-based game conducted at a first gaming device, the hybrid arcade/wager-based game including a non-wager based gaming portion and a wager-based gaming portion;
    enable a player to engage in interactive game play of the non-wager based gaming portion of the hybrid arcade/wager-based game via at least one input device;
    provide a first opportunity for the player to cause a first wager-based triggering event to occur during play of the non-wager based gaming portion, the first wager-based triggering event being associated with a first wager-based game event having a first wager-based game event outcome associated therewith;
    automatically retrieve a first batch of predetermined random number generator outcomes from the first random number generator engine;
    determine the first wager-based game event outcome using a first predetermined random number generator outcome of the first batch of predetermined random number generator outcomes prior to the occurrence of the first-wager based triggering event;
    detect the occurrence of the first wager-based triggering event during play of the non-wager based gaming portion;
    automatically cause the wager-based gaming portion to execute the first wager-based game event in response to detecting the occurrence of the first wager-based triggering event;
    wherein the execution of the first wager-based game event includes wagering a first wager amount on the outcome of the first wager-based game event;
    wherein the execution of the first wager-based game event further includes displaying the predetermined first wager-based game event outcome;

wherein the execution of the first wager-based game event further includes determining, using the first wager-based game event outcome, whether any payout amount is due to the player;

and enabling the player to concurrently engage in continuous game play of the non-wager based gaming portion of the hybrid arcade/wager-based game during execution of the first wager-based game event.

2. The computer implemented method of claim 1, further comprising causing at least one processor to execute a plurality of instructions stored in at least one non-transient memory to: enable the player to control a first in-game character during play of the non-wager gaming portion, wherein a first opportunity for the player to cause the first wager-based triggering event corresponds to an action performed by the first in-game character during play of the non-wager based gaming portion.

3. The computer implemented method of claim 2, wherein the first opportunity for the player to cause the first wager-based triggering event corresponds to a spawning of a first non-player character during play of the non-wager based gaming portion; and wherein the first wager-based triggering event relates to an in-game interaction with the first non-player character, the in-game interaction with the first non-player character being caused based on input from the player during play of the non-wager based gaming portion.

4. The computer implemented method of claim 2, wherein predetermination of the first outcome of the first wager-based game event is independent from play of the non-wager based gaming portion.

5. The computer implemented method of claim 1, further comprising a first game graphical user interface including a skill-based game GUI portion configured to enable the player to engage in skill-based game play activities via interaction with the skill-based game GUI portion, the first game graphical user interface further including a wager-based game GUI portion configured to display content relating to wager-based gaming activities.

6. The computer implemented method of claim 5, further comprising causing at least one processor to execute a plurality of instructions stored in at least one non-transient memory to:

provide a second opportunity for the player to cause a second wager-based triggering event to occur during play of the non-wager based gaming portion, the second wager-based triggering event being associated with a second wager-based game event having a second wager-based game event outcome associated therewith;

predetermine the second wager-based game event outcome prior to the occurrence of the second wager-based triggering event;

detect the occurrence of the second wager-based triggering event during play of the non-wager based gaming portion;

automatically cause the wager-based gaming portion to execute the second wager-based game event in response to detecting the occurrence of the second wager-based triggering event;

wherein the execution of the second wager-based game event includes wagering a second wager amount on the outcome of the second wager-based game event;

wherein the execution of the second wager-based game event further includes displaying the predetermined second wager-based game event outcome;

wherein the execution of the second wager-based game event further includes determining, using the second wager-based game event outcome, whether any payout amount is due to the player; and enabling the player to concurrently engage in continuous game play of the non-wager based gaming portion of the hybrid arcade/wager-based game during execution of the second wager-based game event.

7. The computer implemented method of claim 6 further comprising causing the at least one processor to execute instructions stored in the at least one non-transient memory to:

display a representation of the first wager-based event being executed at the wager-based game GUI portion during the wager-based gaming session;

display a representation of the second wager-based event being executed at the wager-based game GUI portion during the wager-based gaming session; and enable the player to concurrently engage in skill-based game play activities at the skill-based game GUI portion during execution of the first and second wager-based events at the wager-based game GUI portion.

8. The computer implemented method of claim 6 further comprising causing the at least one processor to execute instructions stored in the at least one non-transient memory to:

automatically retrieve a first batch of predetermined random number generator outcomes from the first random number generator engine;

select the first wager-based event outcome from the first batch of predetermined wager-based event outcomes; and select the second wager-based event outcome from the first batch of predetermined wager-based event outcomes.

9. The computer implemented method of claim 6 further comprising causing the at least one processor to execute instructions stored in the at least one non-transient memory to:

display a first object in the skill-based GUI portion;

store in the at least one non-transient memory a first data structure including information linking the first predetermined wager-based event outcome with the first object;

detect a first in-game interaction with the first object, the first in-game interaction resulting from player input at the skill-based GUI portion;

identify the first in-game interaction with the first object as corresponding to the first type of wager-based triggering event;

initiate execution the first wager-based event at the wager-based game GUI portion based on the first in-game interaction with the first object; and store in the at least one non-transient memory a second data structure including information linking the outcome of first wager-based event with the first predetermined wager-based event outcome.

10. The computer implemented method of claim 6 further comprising causing the at least one processor to execute instructions stored in the at least one non-transient memory to:

identify a first type of event or condition which may occur at the skill-based game GUI portion during the skill-based game play activities;

store in the at least one non-transient memory a first data structure including information linking the first predetermined wager-based event outcome with the first type of event or condition;

detect an occurrence of the first type of event or condition at the skill-based game GUI portion;

identify the detected first type of event or condition as corresponding to the first type of wager-based triggering event;

initiate execution the first wager-based event at the wager-based game GUI portion based on the occurrence of the first type of event or condition at the skill-based game GUI portion; and store in the at least one non-transient memory a second data structure including information linking the outcome of first wager-based event with the first predetermined wager-based event outcome.

11. The computer implemented method of claim 6 wherein the occurrence of the first type of event or condition at the skill-based game GUI portion is triggered in response to the player's interaction with the skill-based game GUI portion during the wager-based gaming session.

\* \* \* \* \*